United States Patent
Daley, III

(10) Patent No.: US 10,761,568 B2
(45) Date of Patent: Sep. 1, 2020

(54) WEARABLE PROPPING DISPLAY APPARATUS 2

(71) Applicant: Charles Augustus Daley, III, Rawai (TH)

(72) Inventor: Charles Augustus Daley, III, Rawai (TH)

( * ) Notice: Subject to any disclaimer, the term of this patent is extended or adjusted under 35 U.S.C. 154(b) by 143 days.

(21) Appl. No.: 15/932,755

(22) Filed: Apr. 23, 2018

(65) Prior Publication Data

US 2018/0246542 A1 Aug. 30, 2018

Related U.S. Application Data

(63) Continuation of application No. 14/998,517, filed on Jan. 13, 2016, now Pat. No. 9,983,624, which is a
(Continued)

(51) Int. Cl.
*A45F 5/00* (2006.01)
*G06F 1/16* (2006.01)
*H04N 5/64* (2006.01)
*H04N 5/44* (2011.01)

(52) U.S. Cl.
CPC ............... *G06F 1/163* (2013.01); *A45F 5/00* (2013.01); *G06F 1/1616* (2013.01); *G06F 1/1628* (2013.01); *G06F 1/1643* (2013.01); *G06F 1/1675* (2013.01); *G06F 1/1698* (2013.01); *H04N 5/44* (2013.01); *H04N 5/64* (2013.01); *A45F 2005/006* (2013.01); *A45F 2200/0525* (2013.01); *G06F 2200/1632* (2013.01); *G06F 2200/1633* (2013.01)

(58) Field of Classification Search
CPC ...... G06F 1/163; G06F 1/1628; G06F 1/1675; G06F 1/1698; G06F 1/1643; G06F 1/1616; G06F 2200/1632; G06F 2200/1633; H04N 5/64; H04N 5/44; A45F 5/00; A45F 2005/006; A45F 2200/0525
See application file for complete search history.

(56) References Cited

U.S. PATENT DOCUMENTS 5,667,114 A * 9/1997 Bourque .................... A45F 5/00
224/257
5,762,250 A * 6/1998 Carlton ..................... A45C 9/00
108/43

(Continued)

*Primary Examiner* — Michael C Zarroli

(57) ABSTRACT

The disclosed apparatus is a display panel (with electronic display) made wearable by suspending it from an operator's neck (or shoulder) by a strap and including a prop to push the display panel away from the operator's stomach/chest and into his comfortable view without using of his hands. The bottom end of the prop makes contact with the operator using an interface designed to provide lateral tipping stability and sliding stability in all directions. The display distance from the operator's face may be adjusted by adjusting the strap length. The prop may include an adjustable extension to better position the display. The apparatus may include only electromagnetic communication for computer remote control, may receive television, may connection to multiple sources with a separate telecommunication housing, may include various accessory holders, may include display panel back side controls or may include computer equipment.

34 Claims, 28 Drawing Sheets

Related U.S. Application Data continuation-in-part of application No. 14/757,169, filed on Nov. 30, 2015, now abandoned, and a continuation-in-part of application No. 14/121,914, filed on Nov. 3, 2014, now abandoned.

(60) Provisional application No. 62/125,127, filed on Jan. 14, 2015, provisional application No. 62/177,182, filed on Mar. 9, 2015, provisional application No. 62/177,689, filed on Mar. 19, 2015, provisional application No. 62/177,911, filed on Mar. 27, 2015, provisional application No. 62/178,802, filed on Apr. 20, 2015, provisional application No. 62/179,337, filed on May 5, 2015, provisional application No. 62/179,821, filed on May 20, 2015, provisional application No. 62/230,065, filed on May 27, 2015, provisional application No. 62/230,926, filed on Jun. 19, 2015, provisional application No. 62/231,806, filed on Jul. 16, 2015.

(56) References Cited

U.S. PATENT DOCUMENTS

| Patent/Pub No. | Date | Inventor | Classification |
|---|---|---|---|
| 6,354,477 B1 * | 3/2002 | Trummer | A45C 3/02 224/153 |
| 6,381,127 B1 * | 4/2002 | Maddali | G06F 1/163 224/257 |
| 6,659,319 B2 * | 12/2003 | Purpura | A45C 9/00 224/270 |
| 7,780,049 B1 * | 8/2010 | Baranoski | A45F 3/14 211/117 |
| 8,109,421 B2 * | 2/2012 | McLean | A45C 11/00 190/100 |
| 9,103,491 B2 * | 8/2015 | Mak | F16M 13/04 |
| 9,690,327 B2 * | 6/2017 | Kielland | A45F 3/02 |
| 2005/0150432 A1 * | 7/2005 | Wen | A47B 23/002 108/38 |
| 2006/0037987 A1 * | 2/2006 | Lin | A45C 5/00 224/646 |
| 2009/0159630 A1 * | 6/2009 | Ko | A45F 3/14 224/648 |
| 2009/0284908 A1 * | 11/2009 | Daley, III | G06F 1/1628 361/679.17 |
| 2012/0008261 A1 * | 1/2012 | Daley, III | G06F 1/163 361/679.01 |
| 2013/0038995 A1 * | 2/2013 | Fang | F16M 11/10 361/679.03 |
| 2015/0205327 A1 * | 7/2015 | Daley, III | G06F 1/1698 361/679.03 |
| 2019/0125062 A1 * | 5/2019 | Kippen | A45F 3/04 |

* cited by examiner

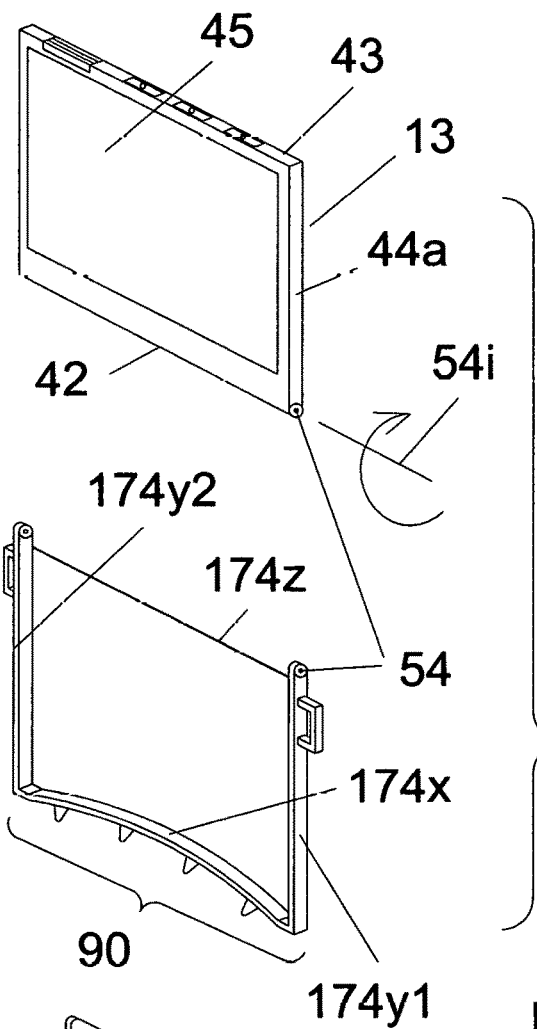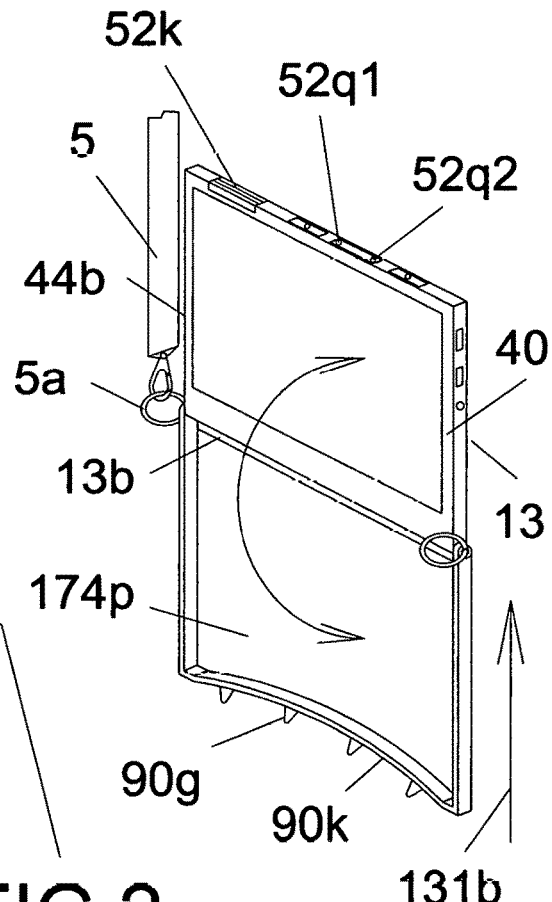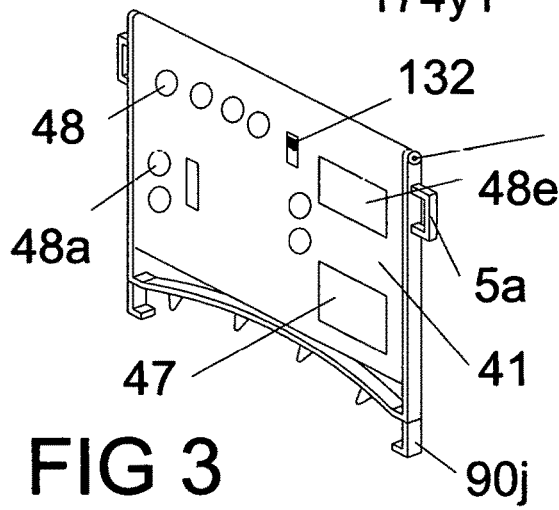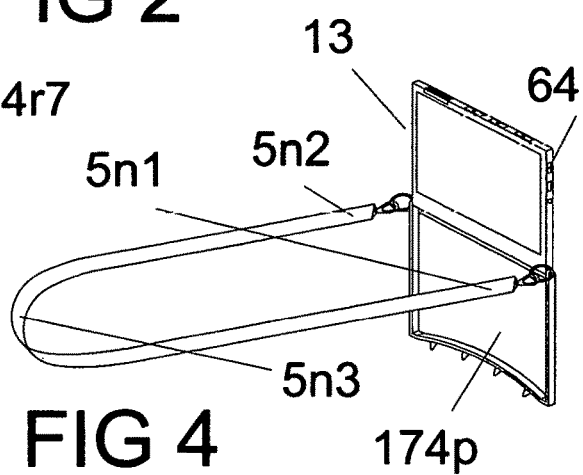

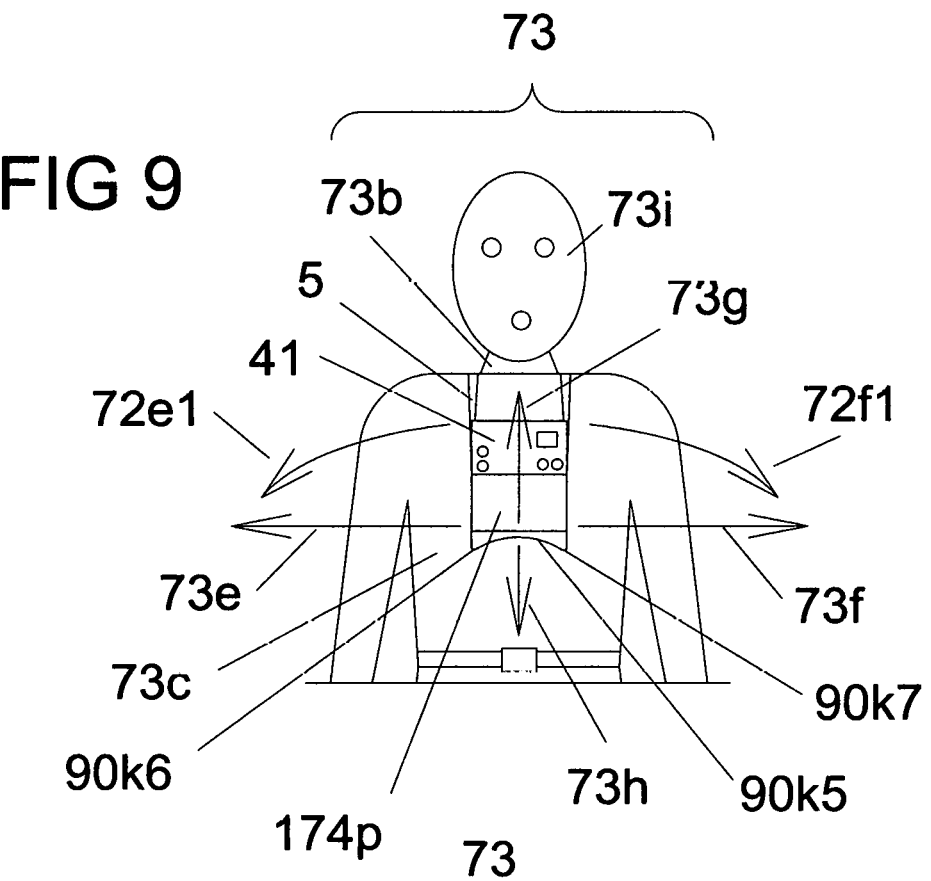
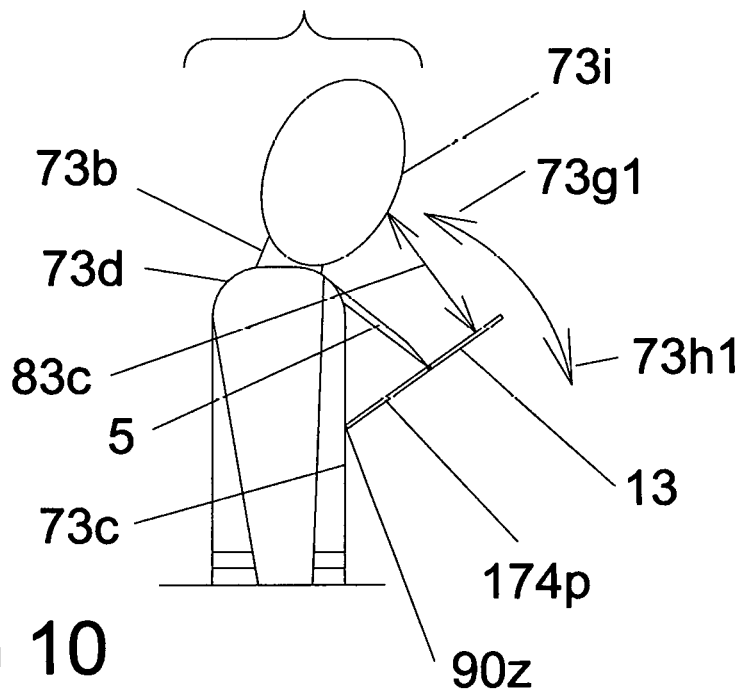

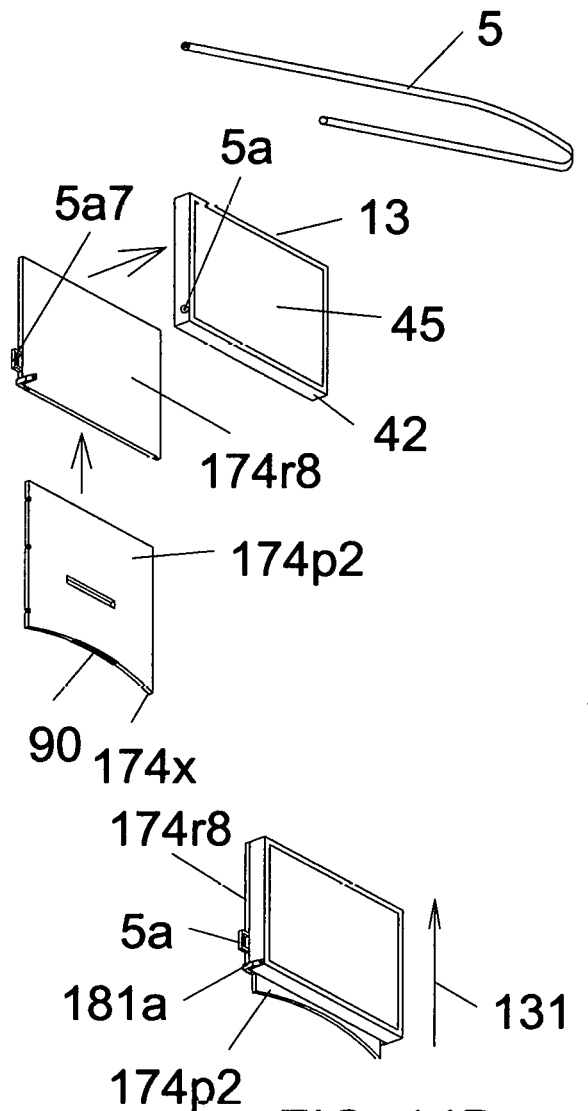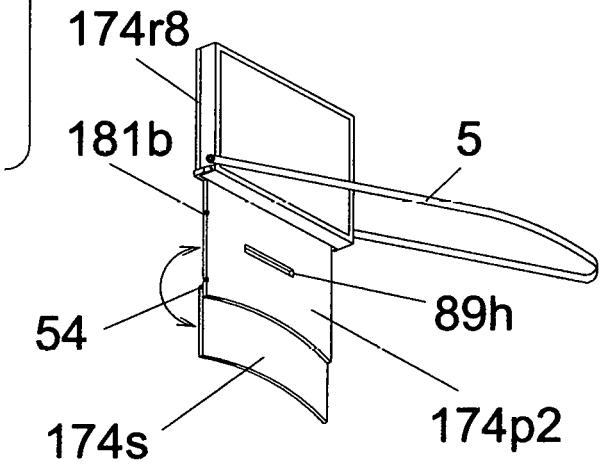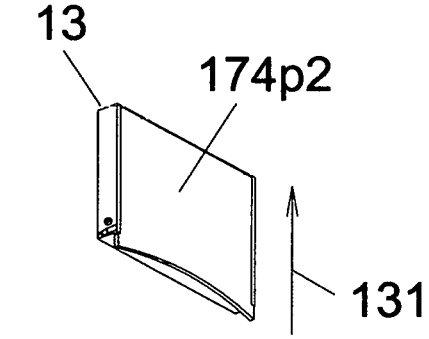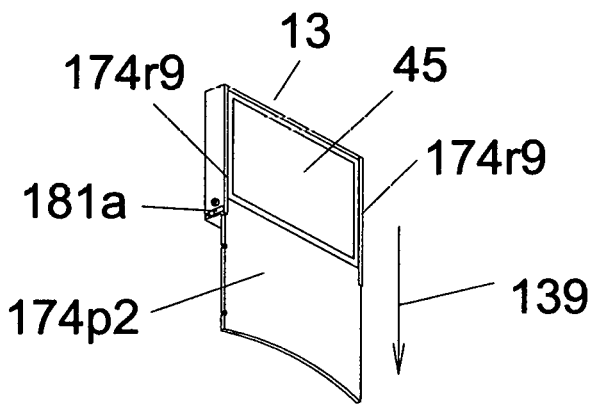

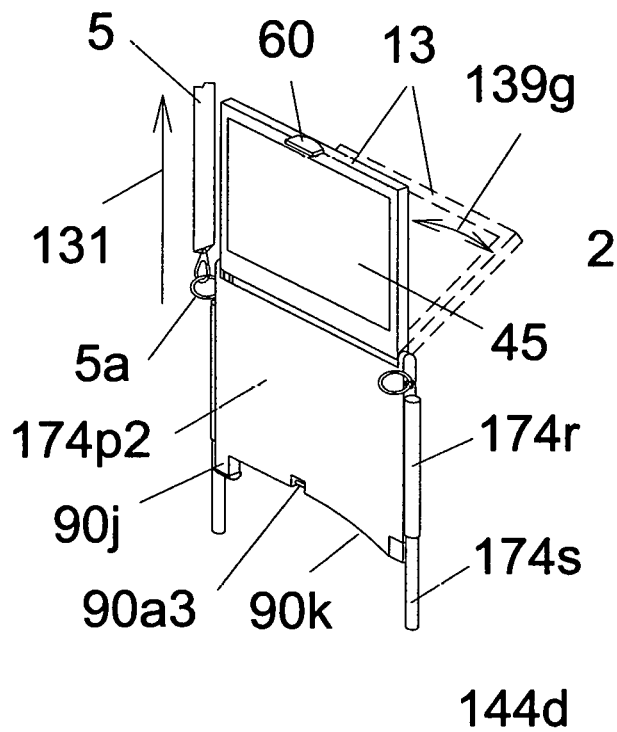
FIG 16
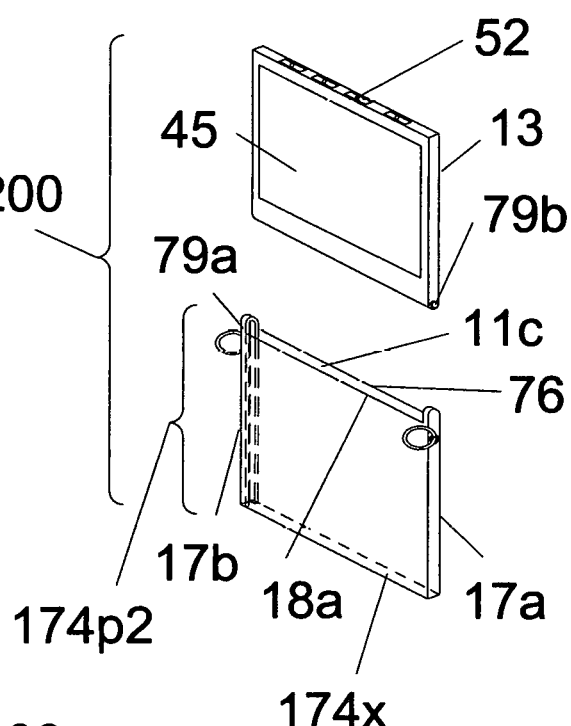
FIG 17A
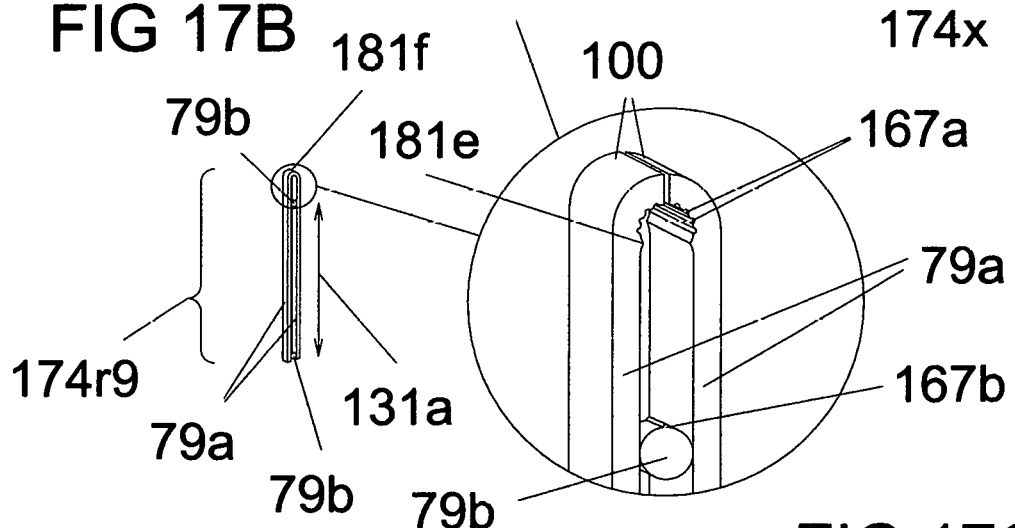
FIG 17B
FIG 17C

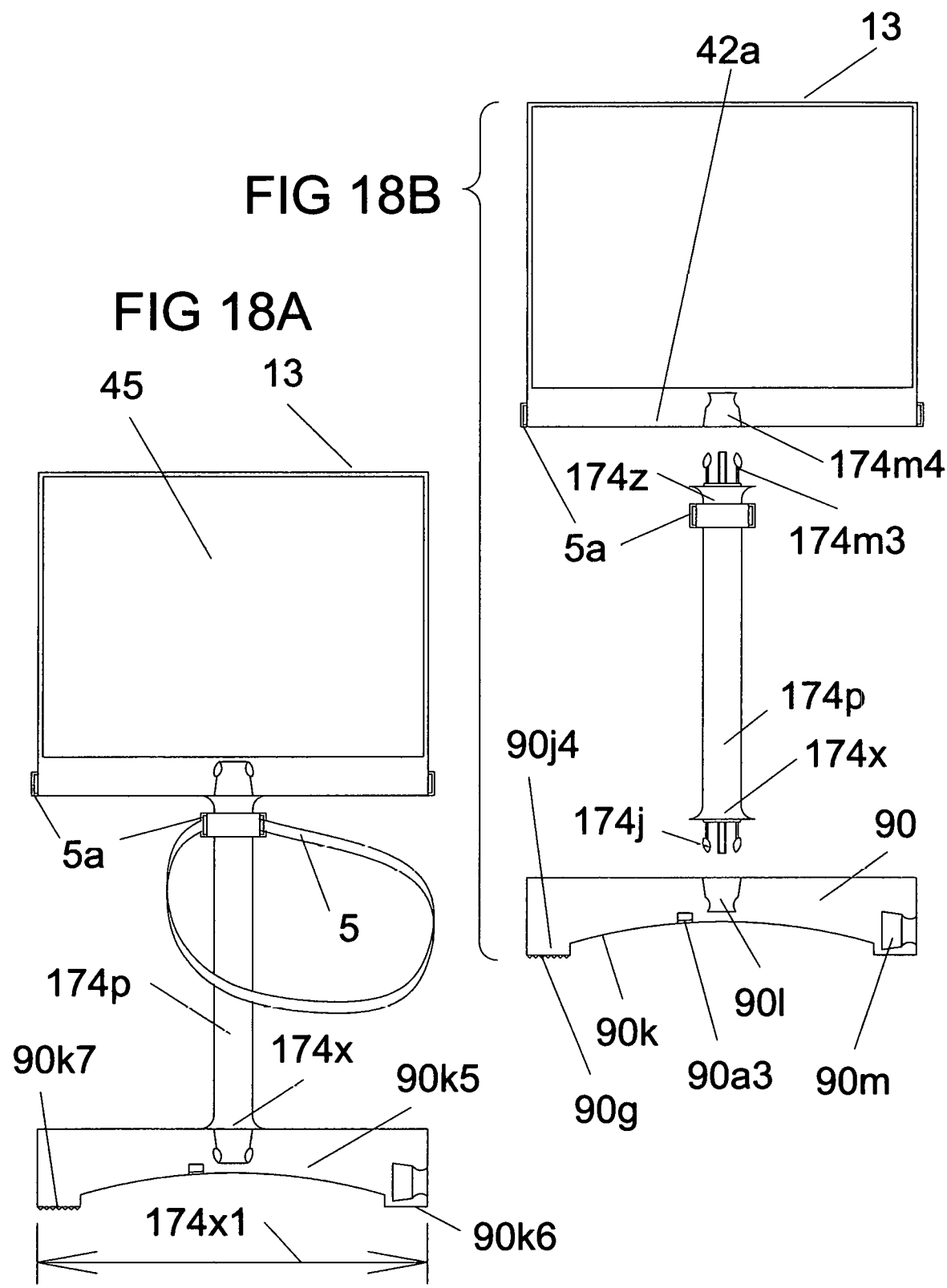

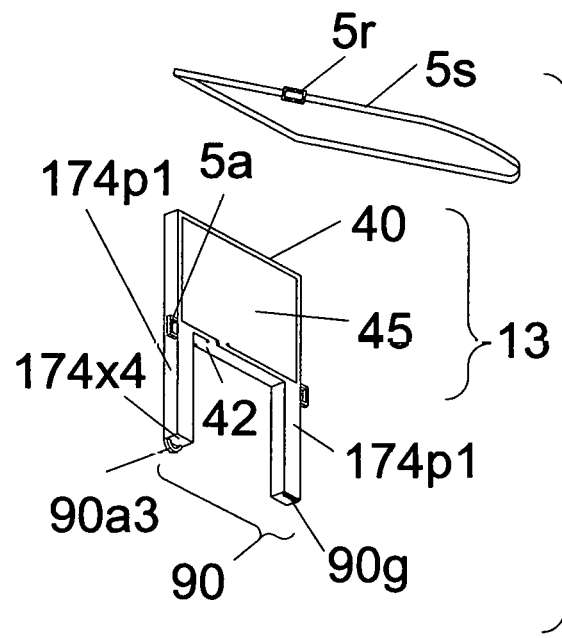
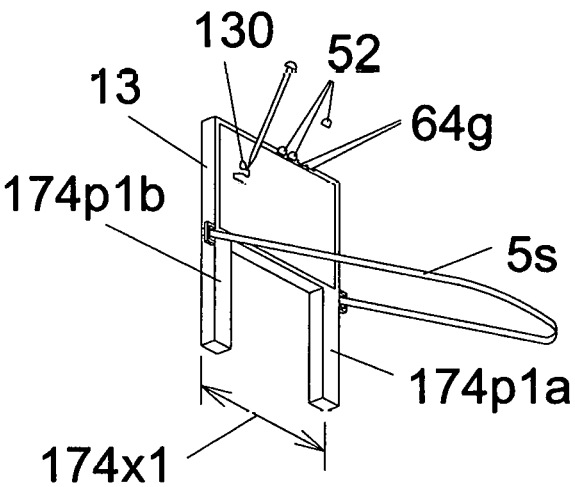
FIG. 19A
FIG. 19B
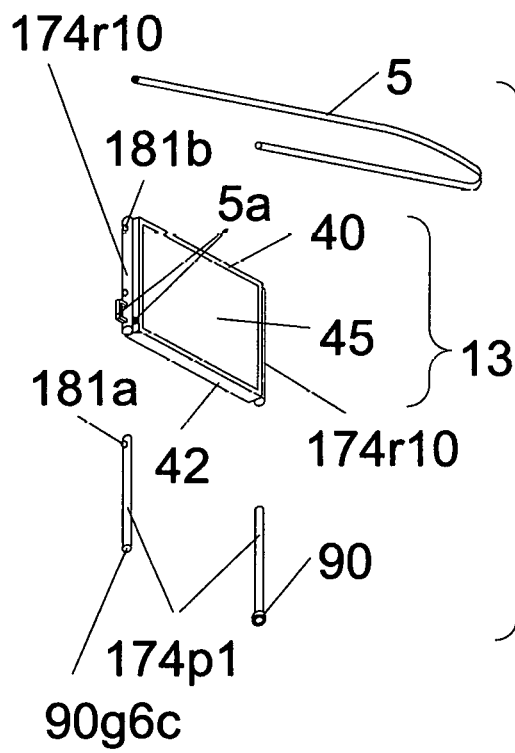
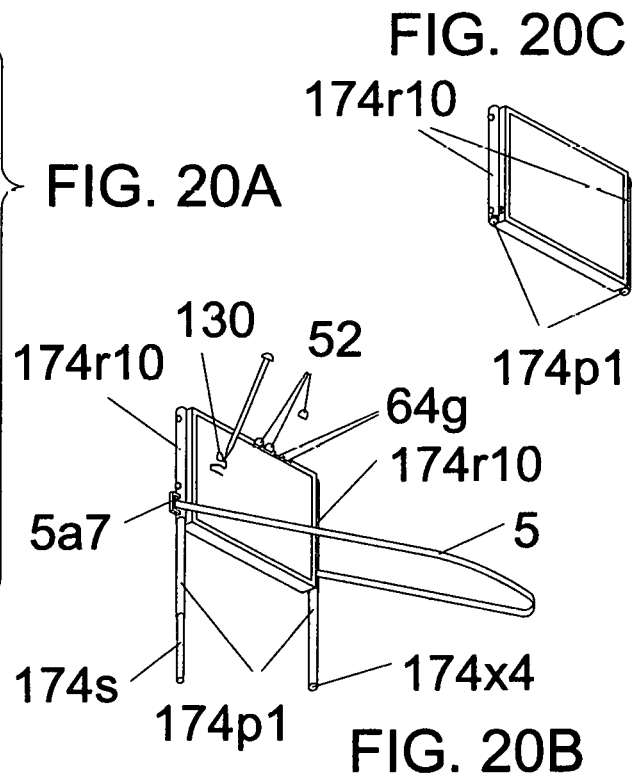
FIG. 20A
FIG. 20C
FIG. 20B

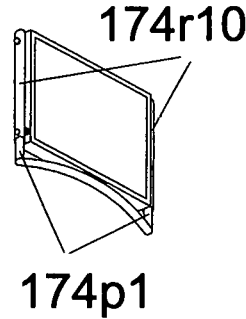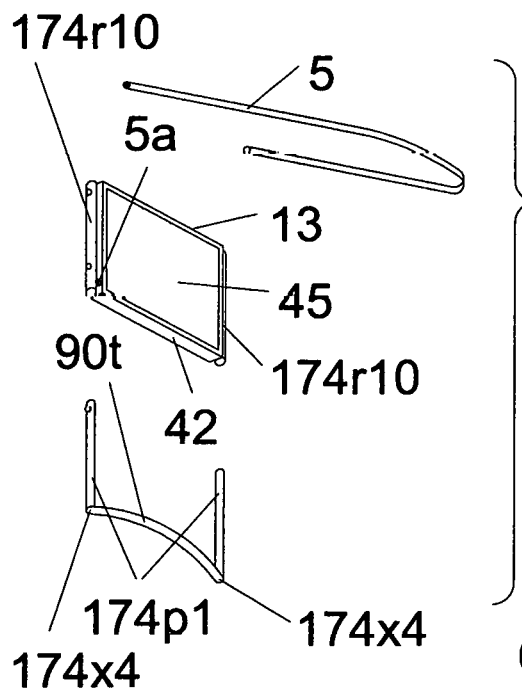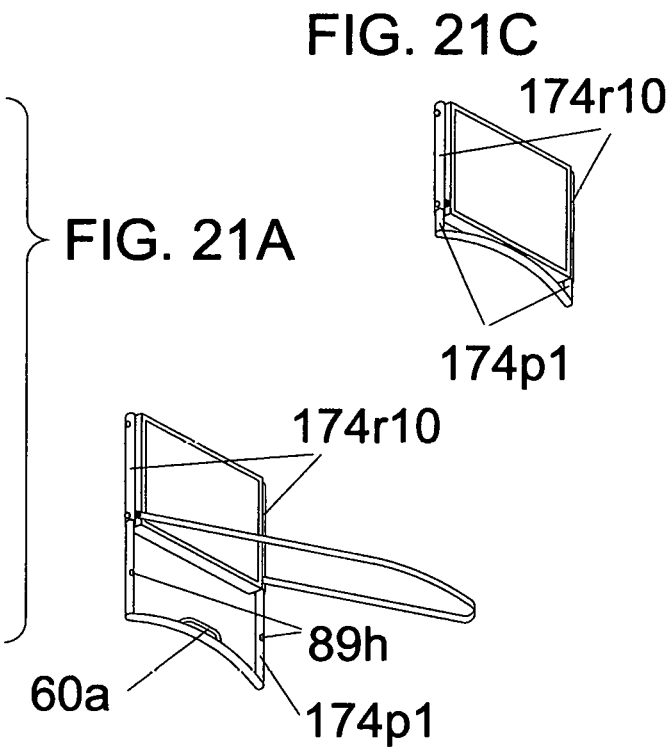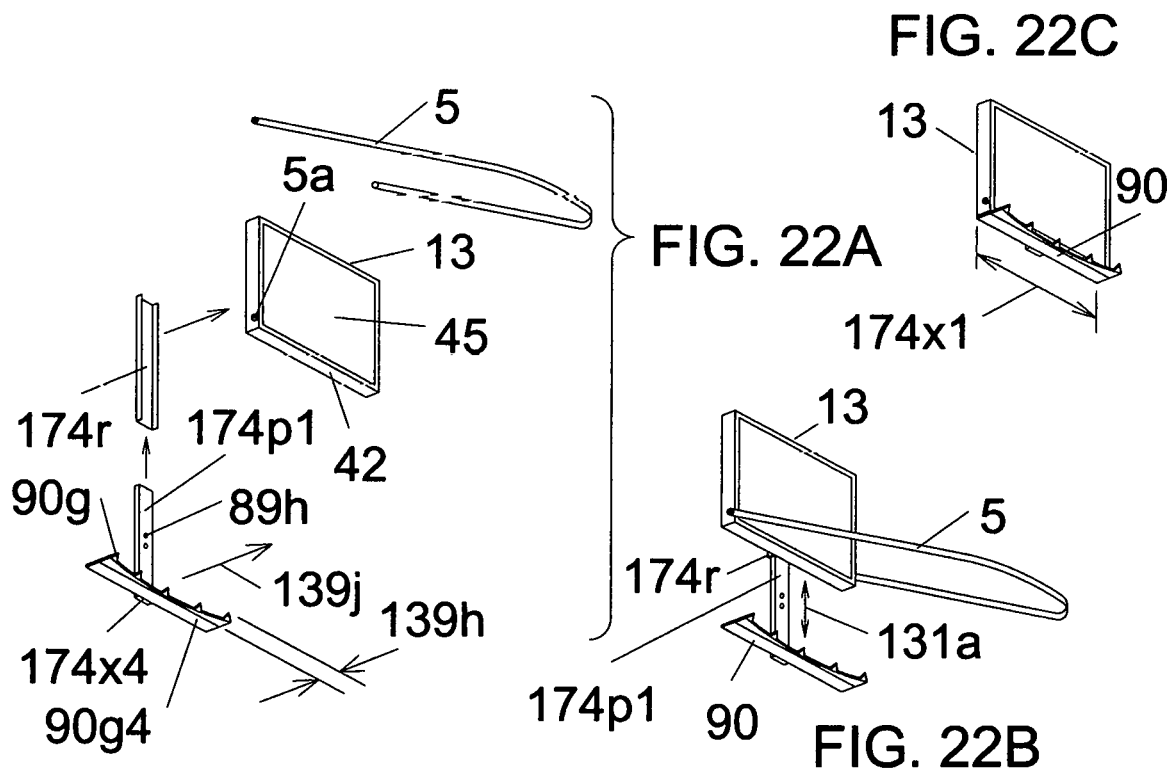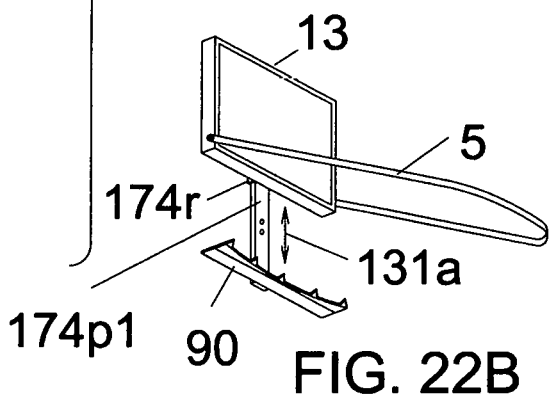

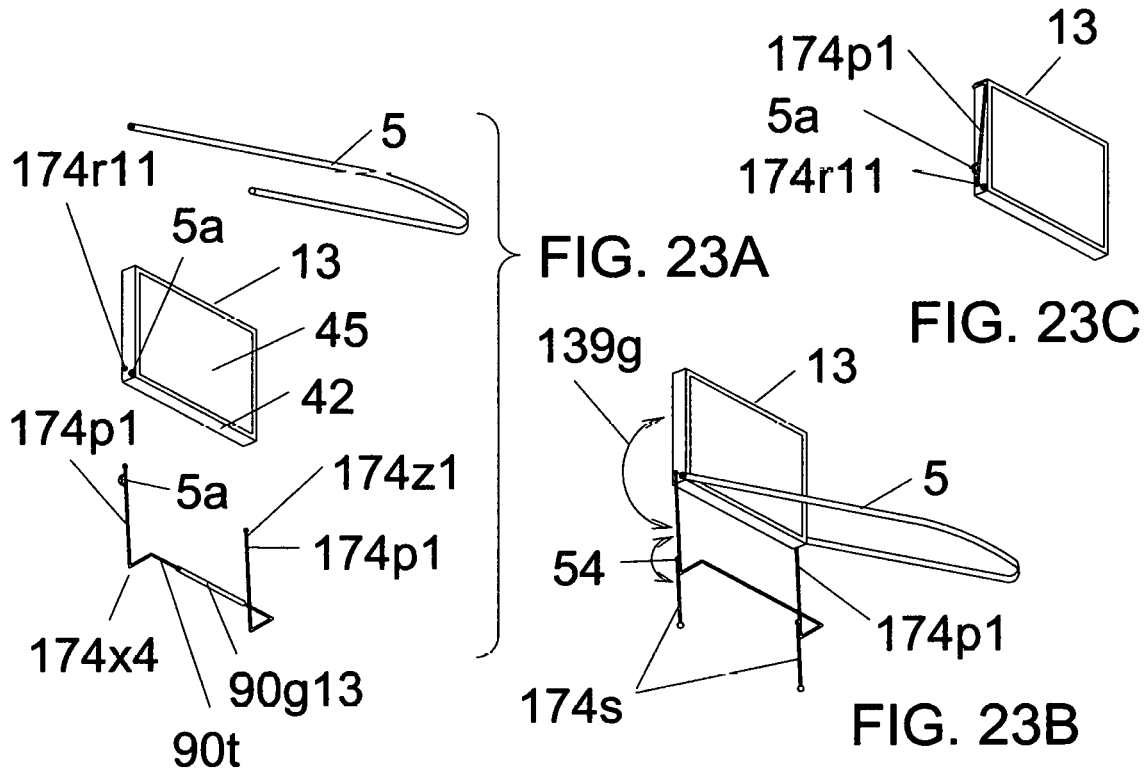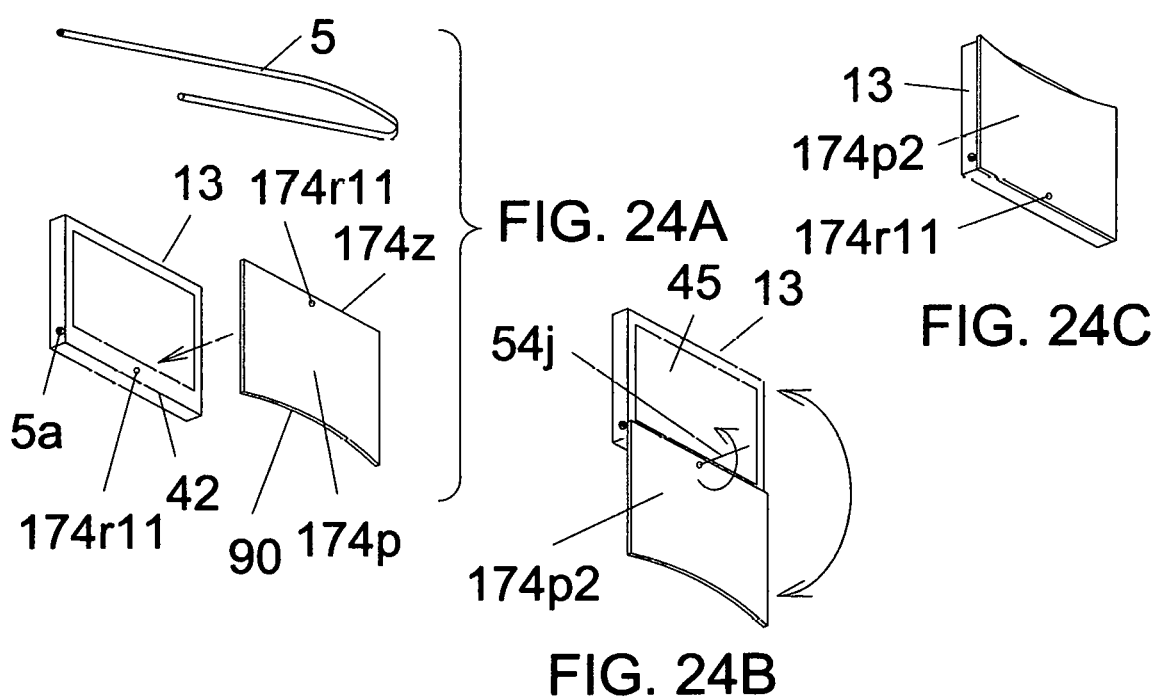

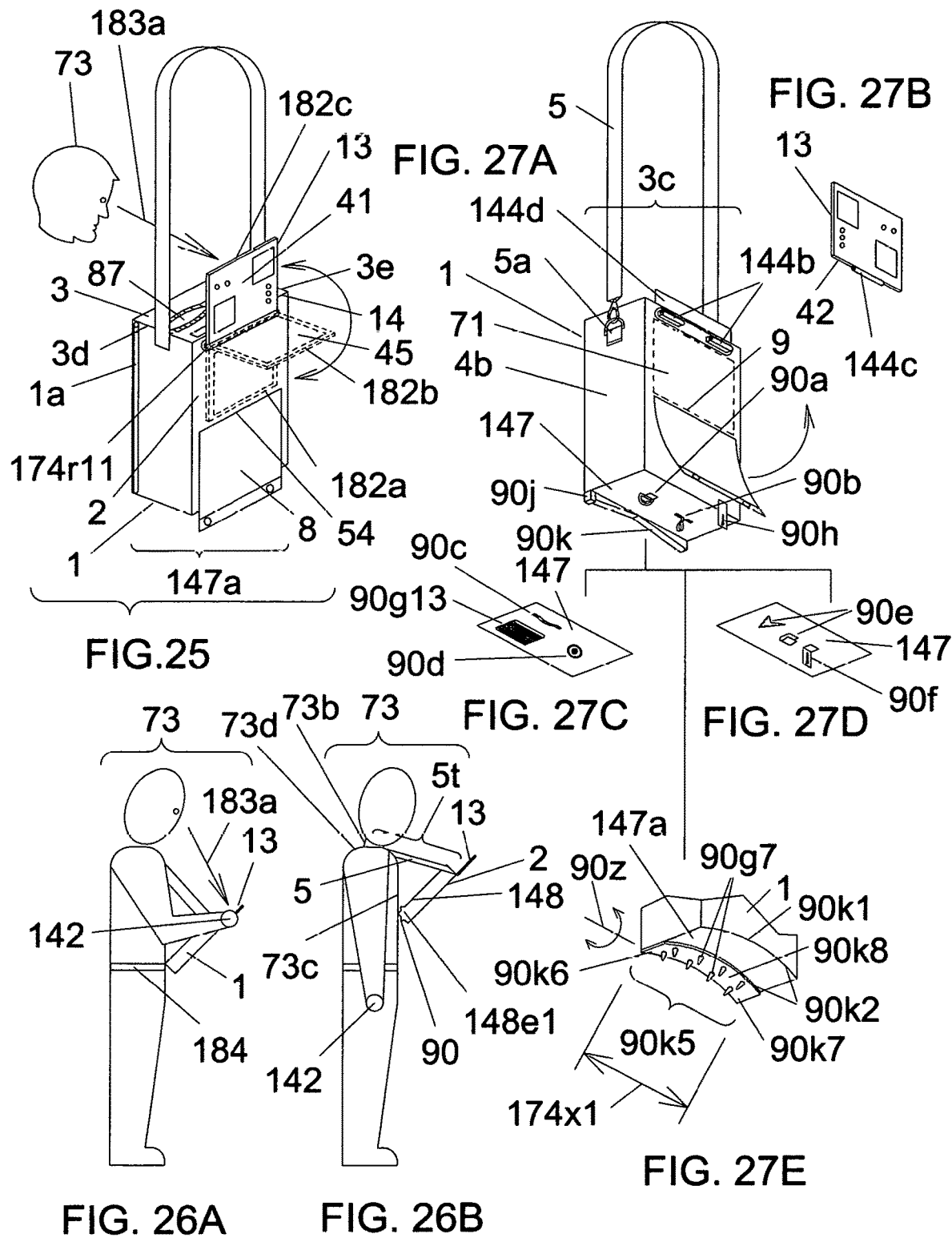

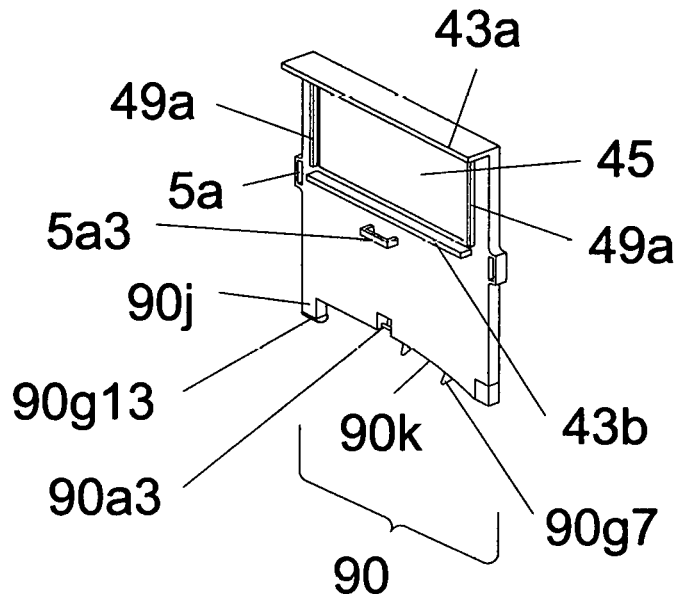
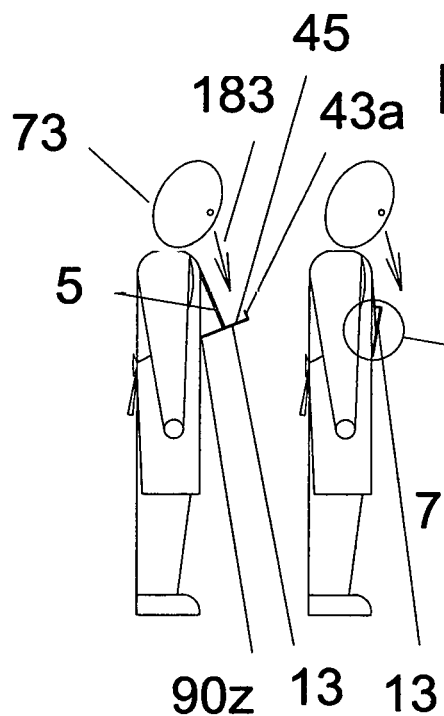
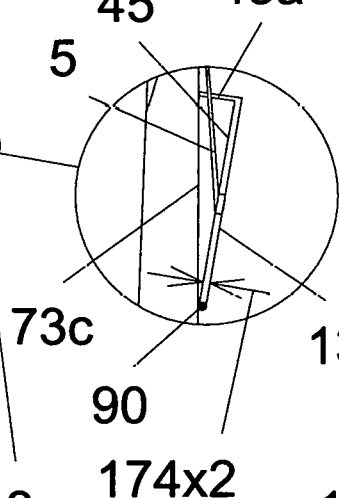
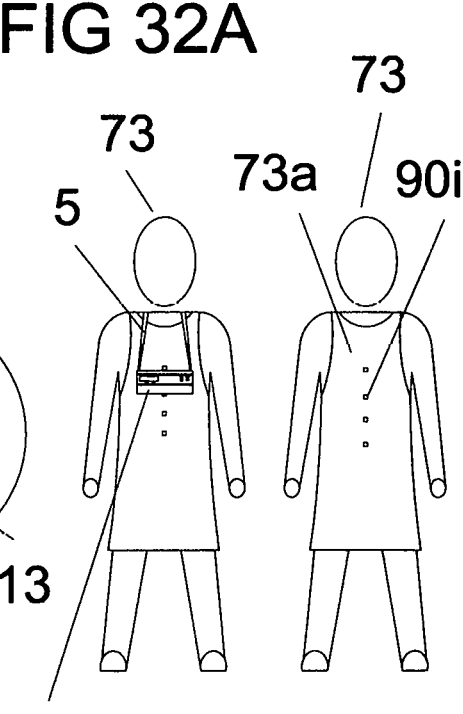

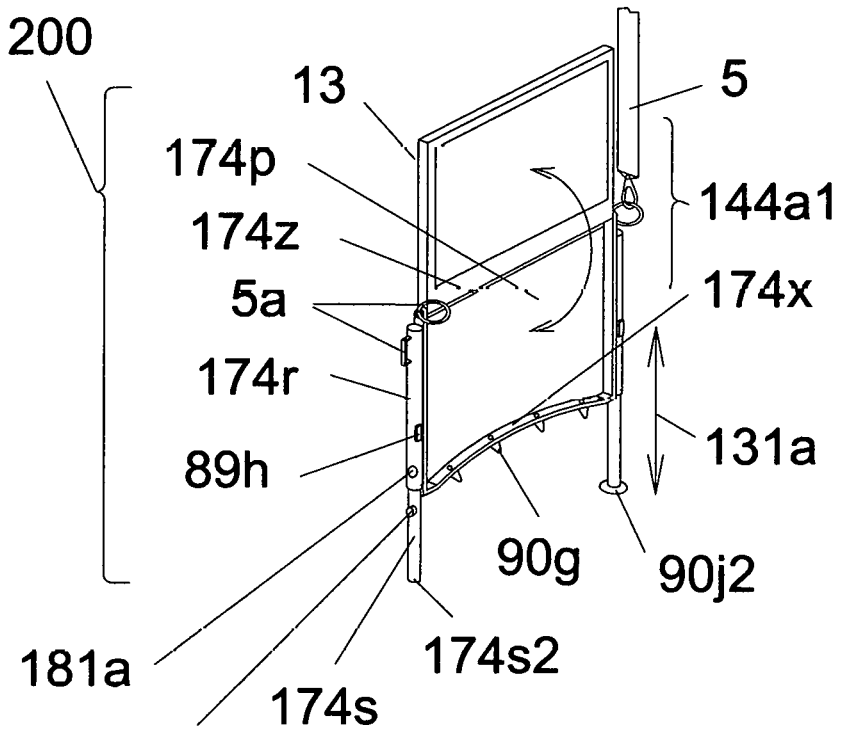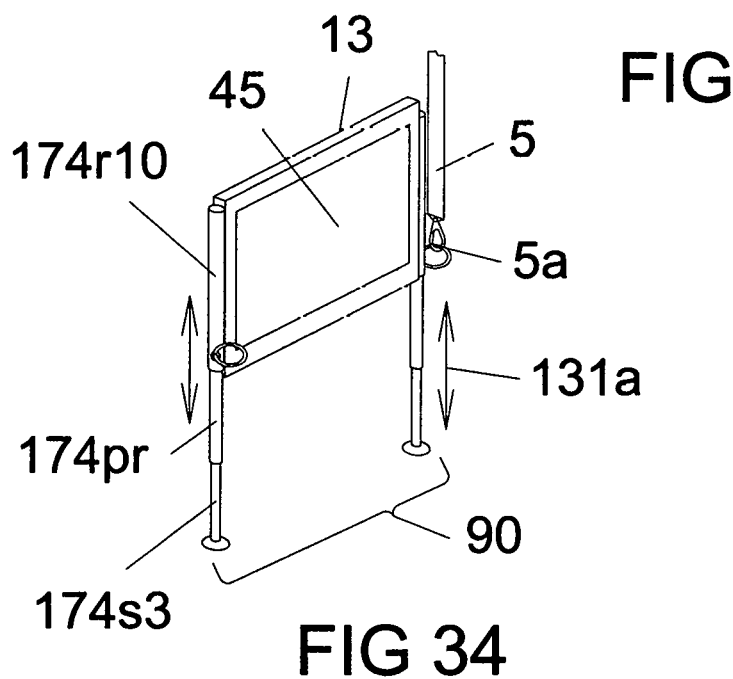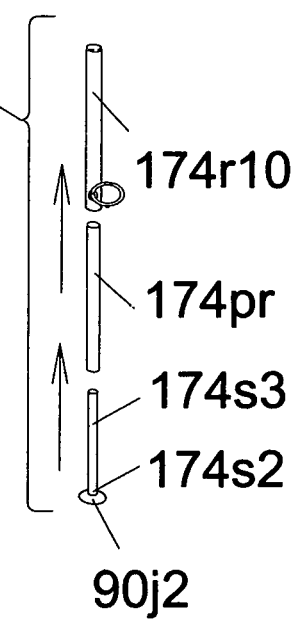

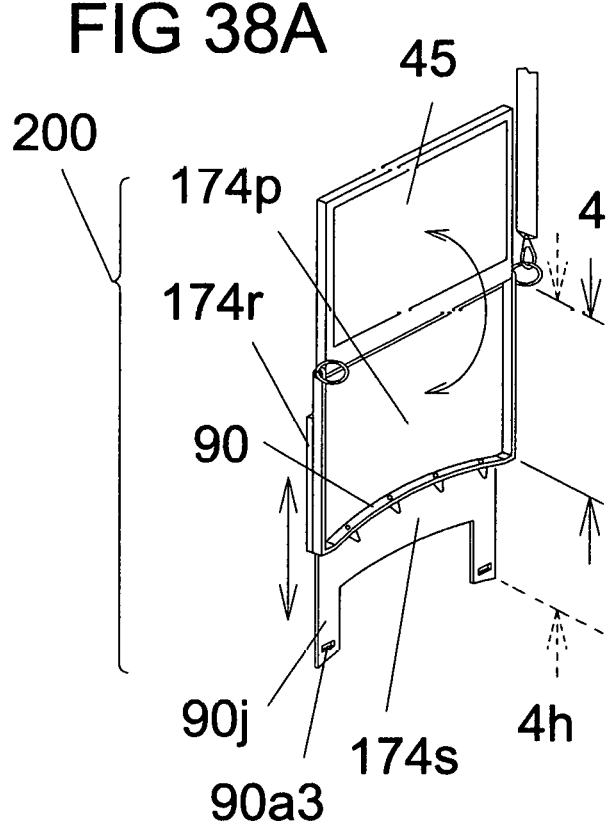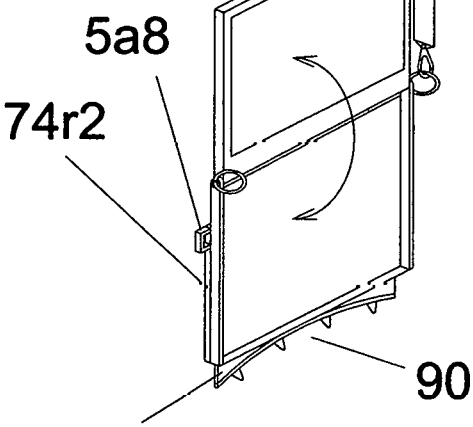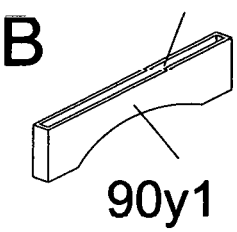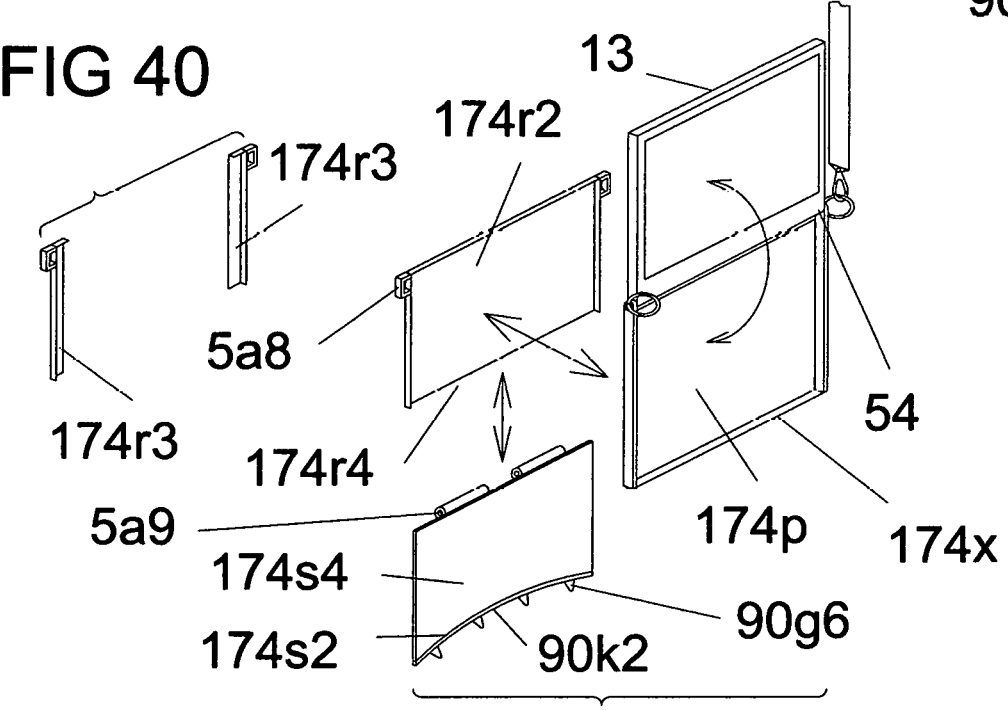

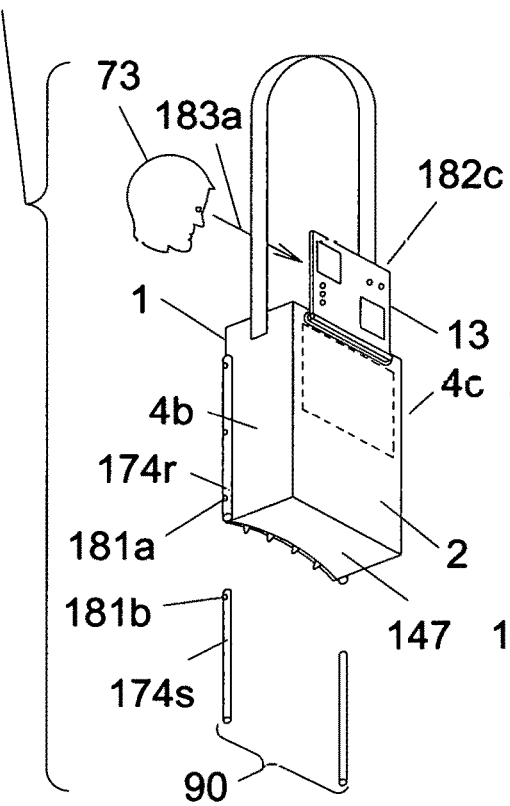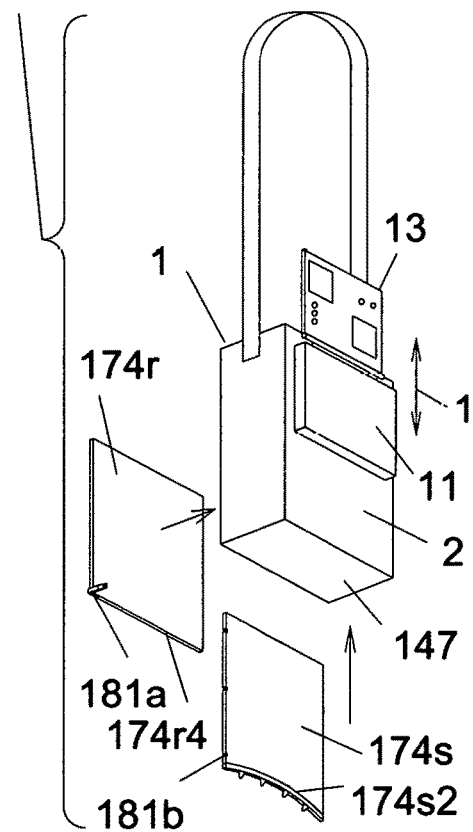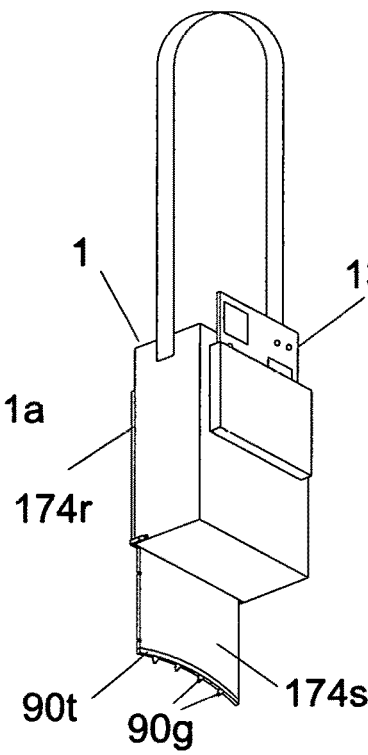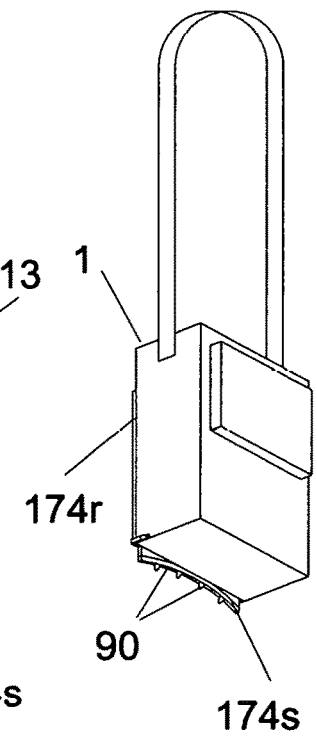
FIG. 42A  FIG. 42B  FIG. 42C
FIG. 43A  FIG. 43B  FIG. 43C

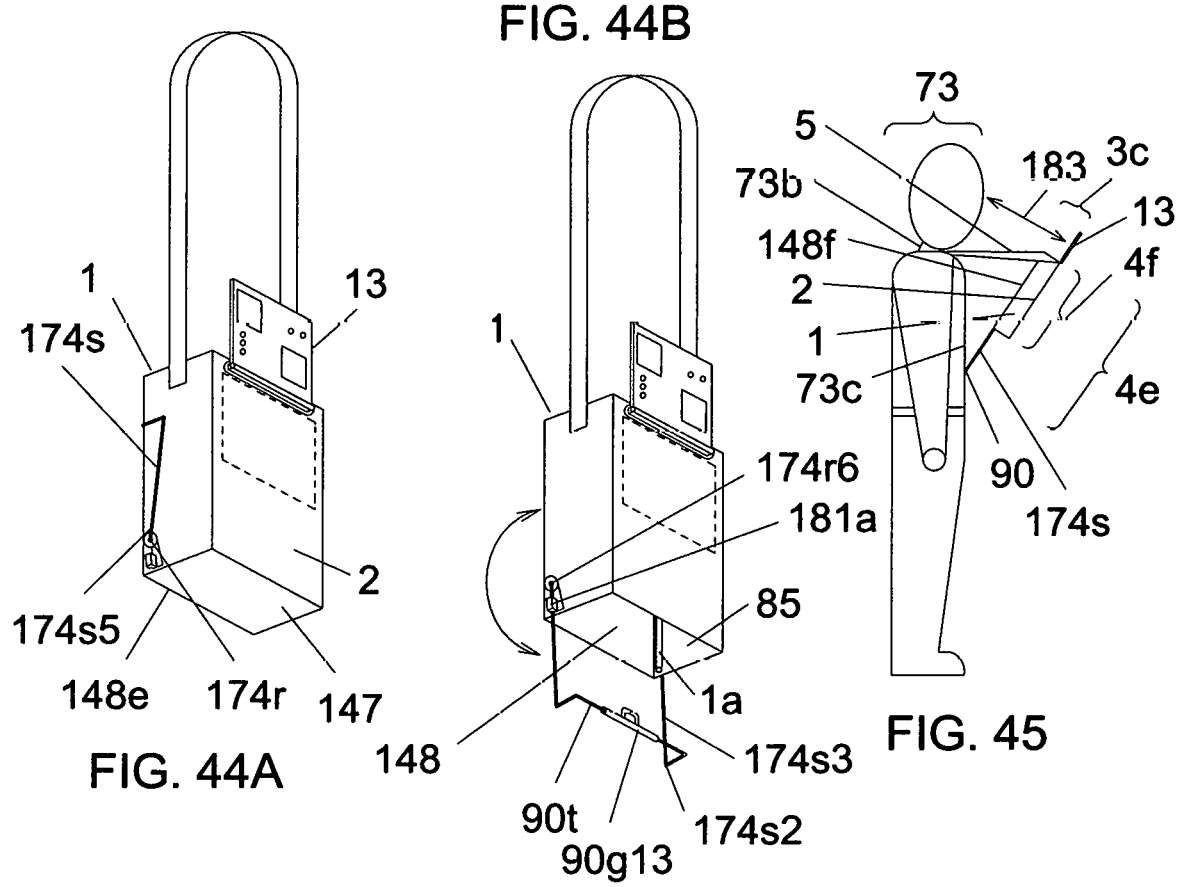
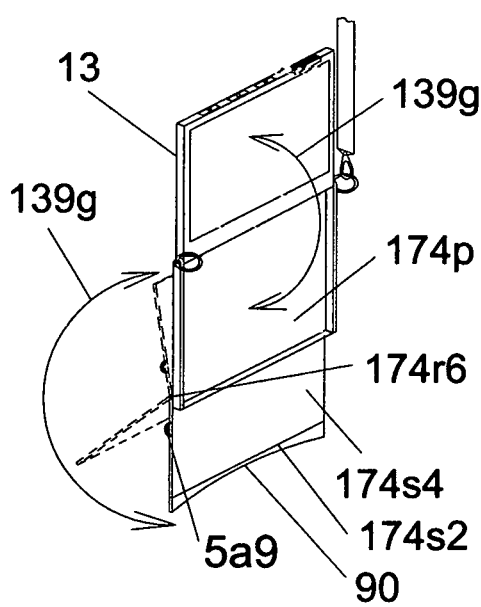
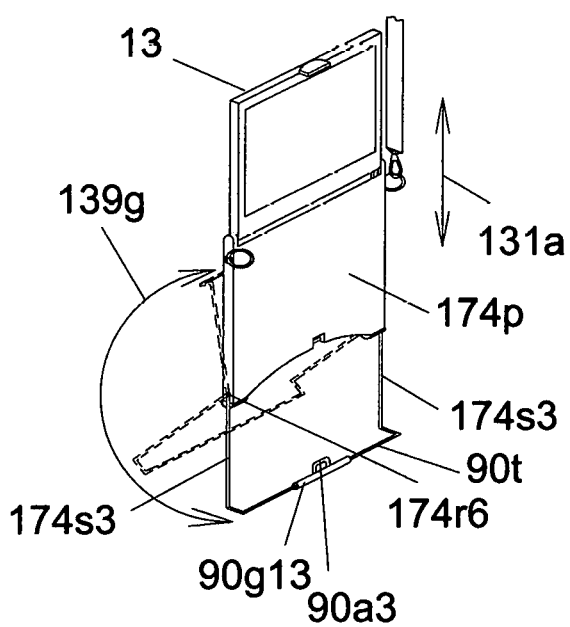

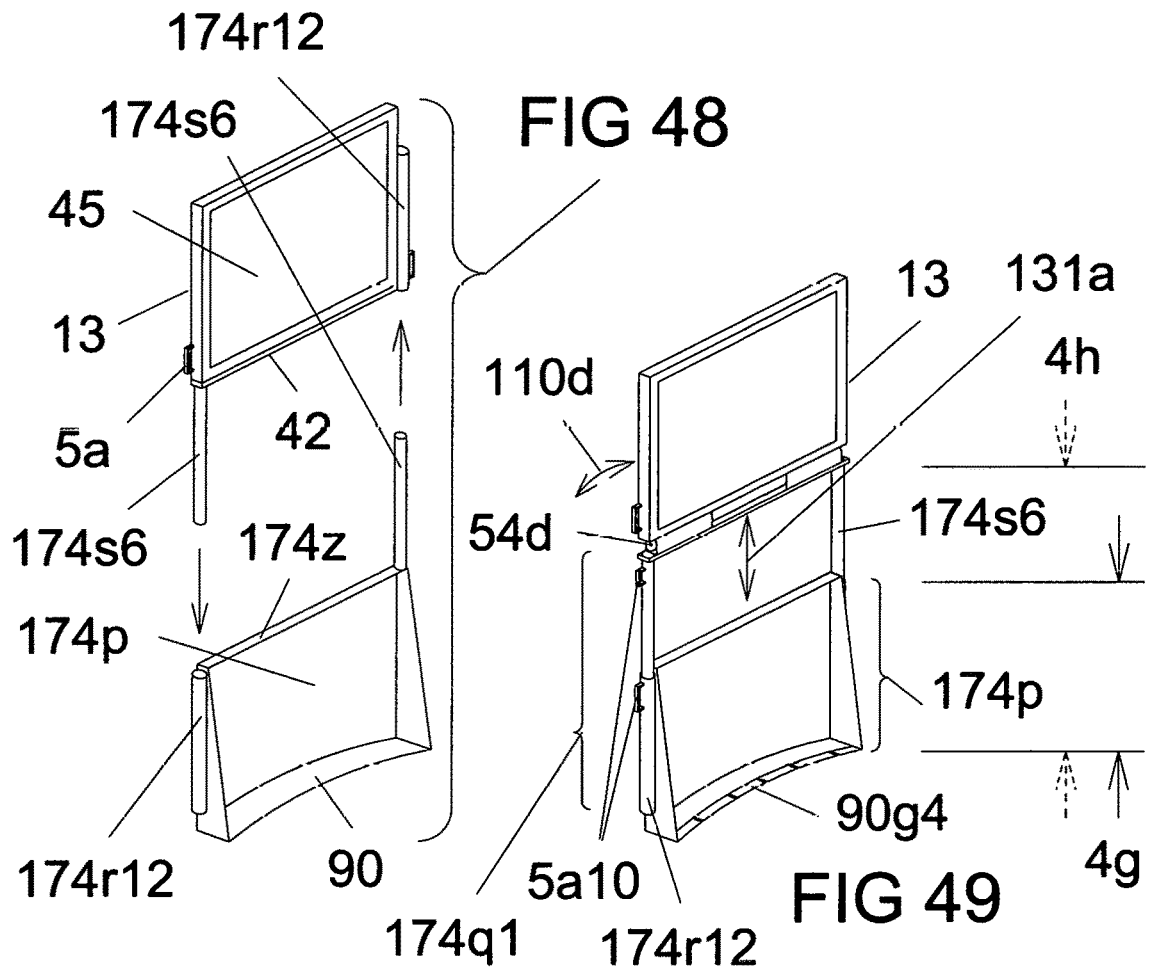
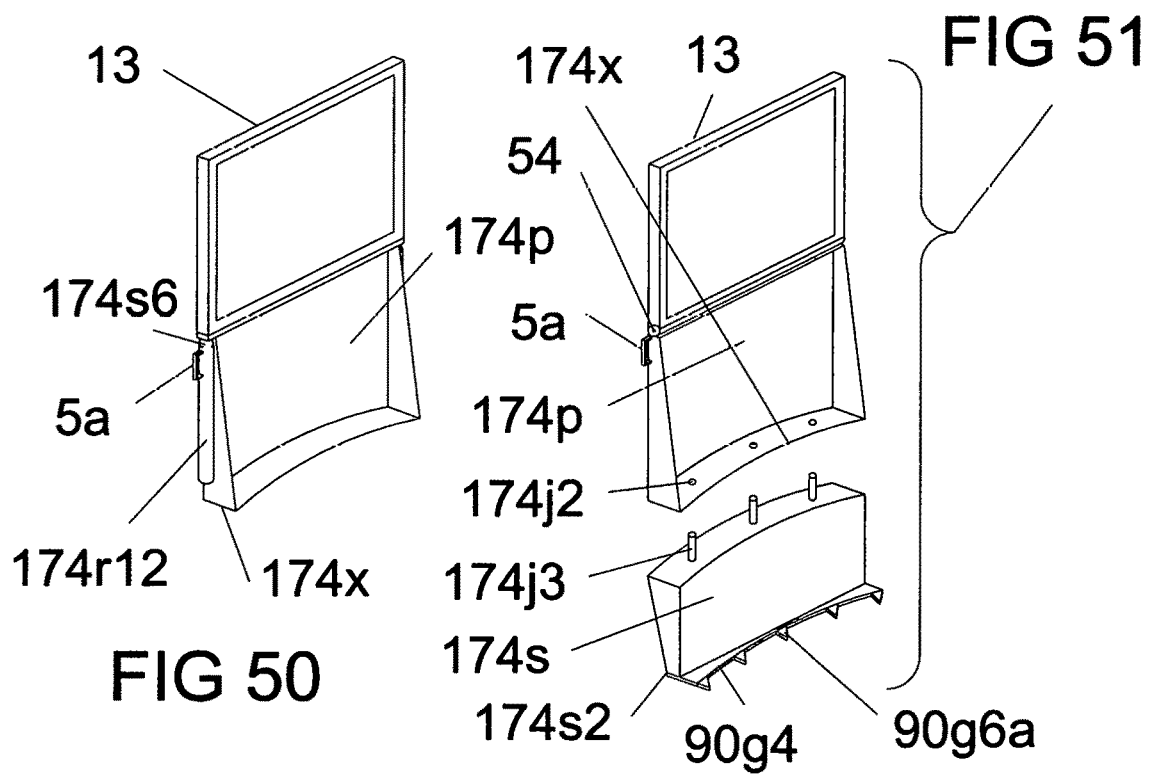

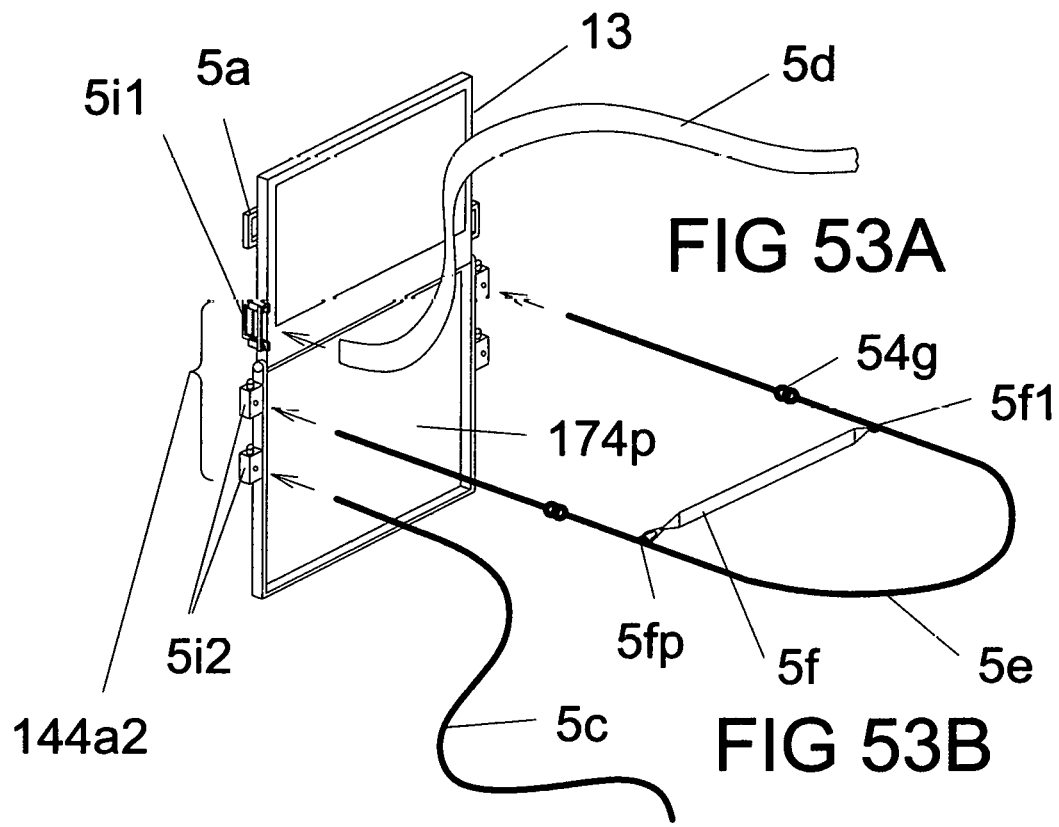
FIG 52
FIG 53A
FIG 53B
FIG 53C
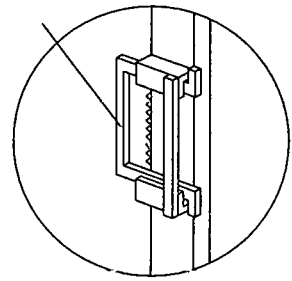
FIG 54
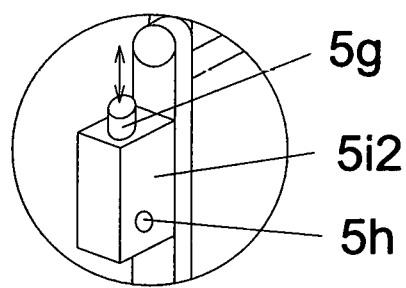
FIG 55
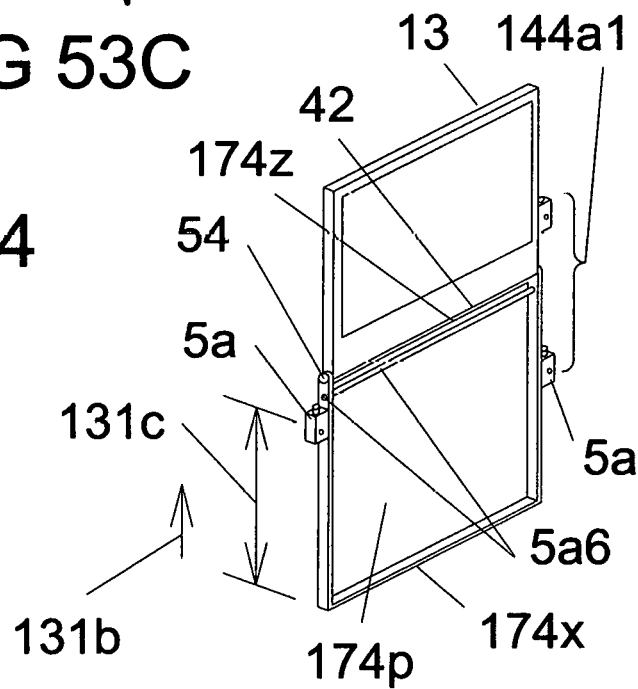
FIG 56

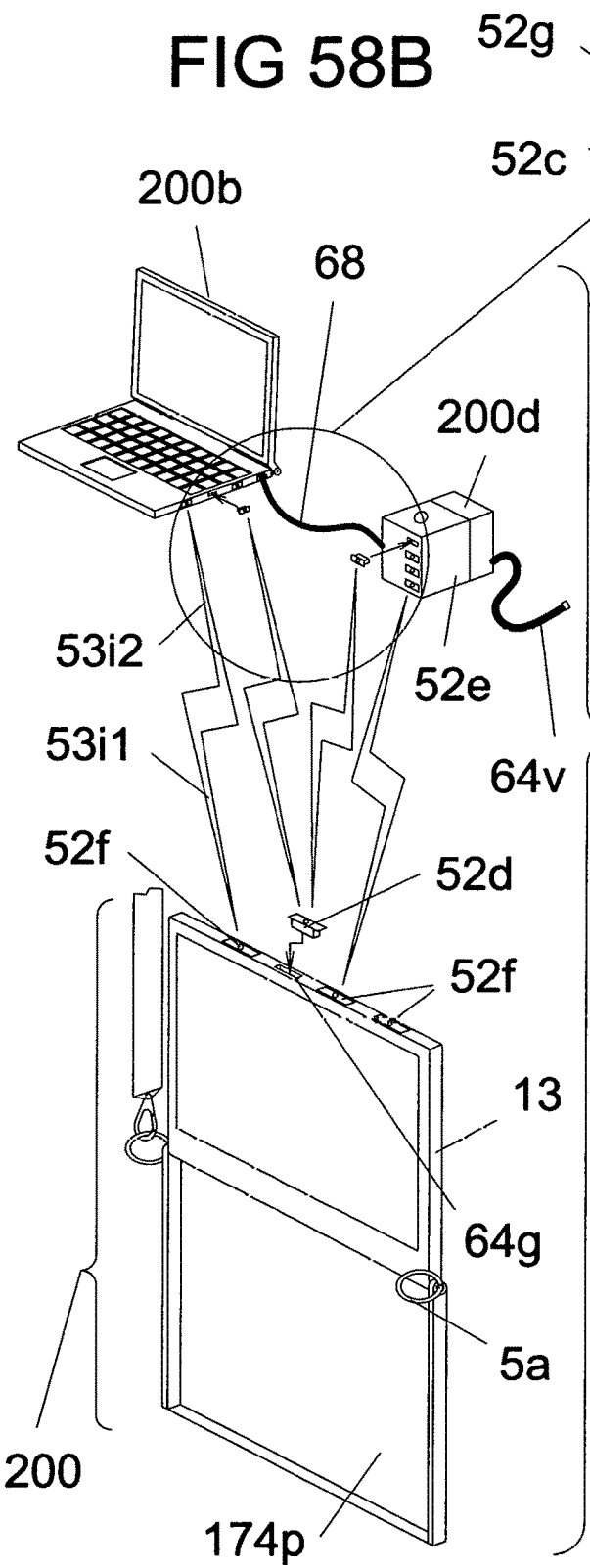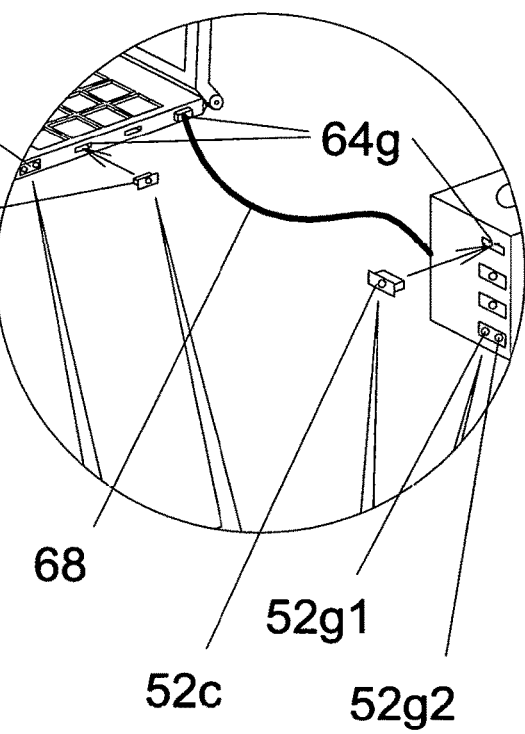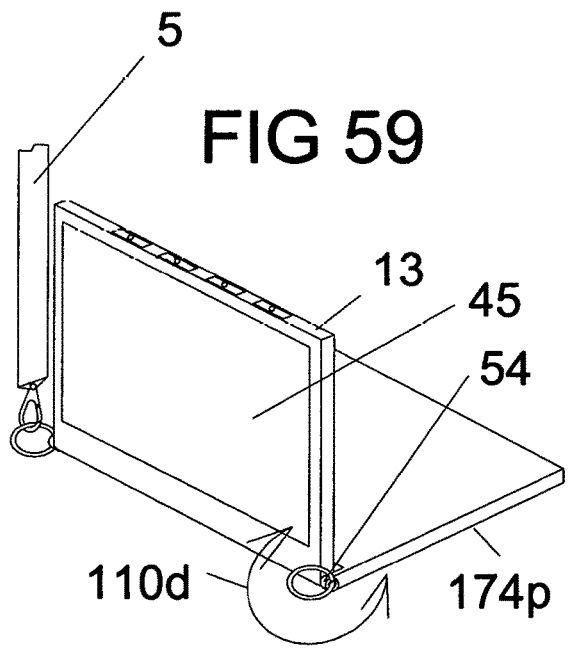

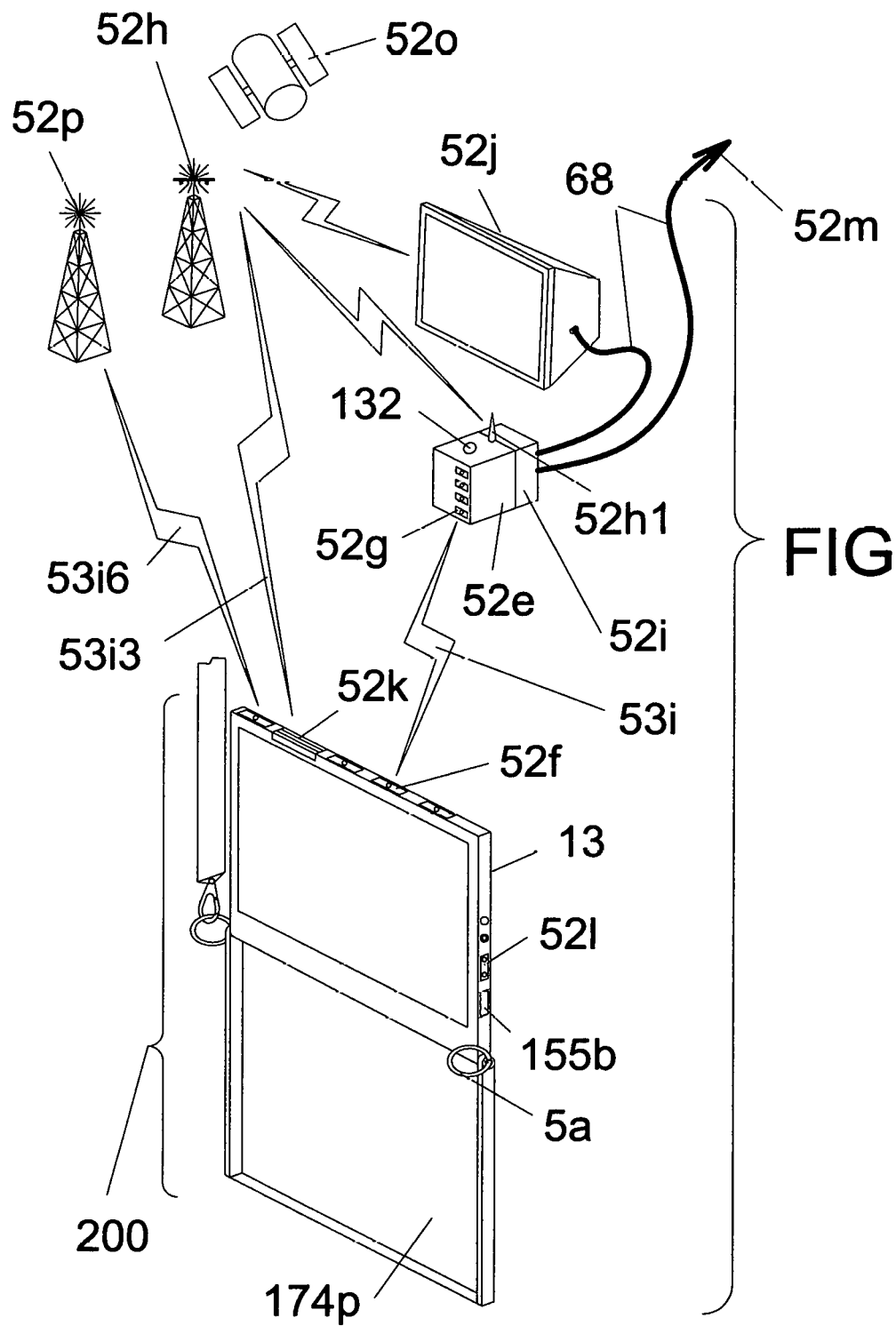

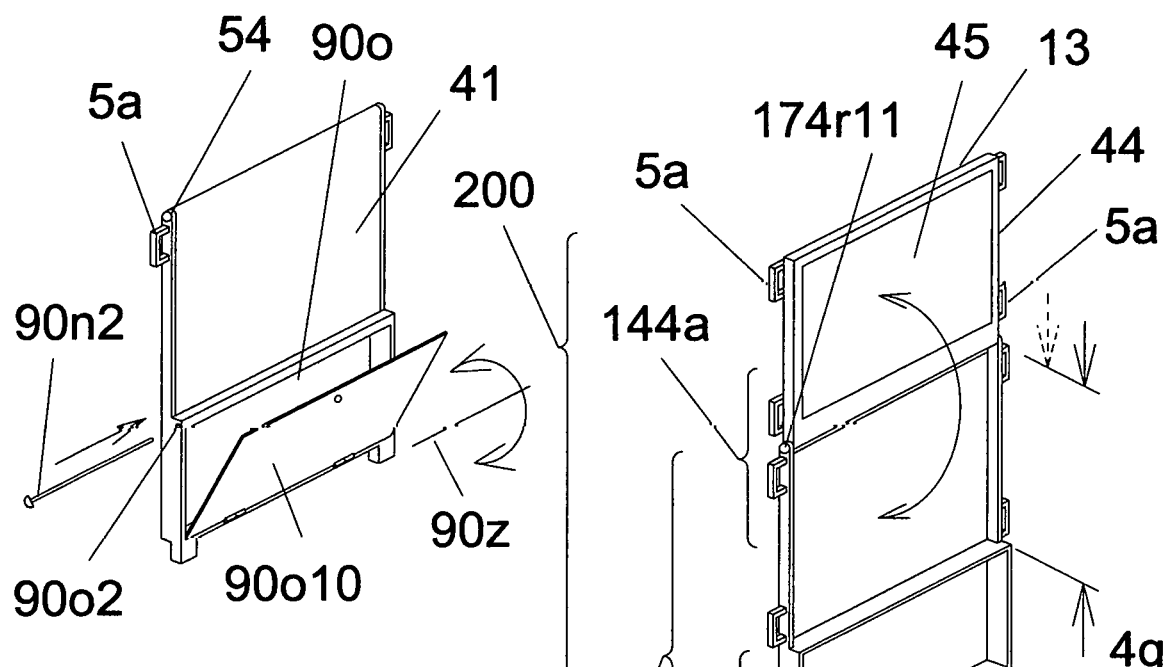
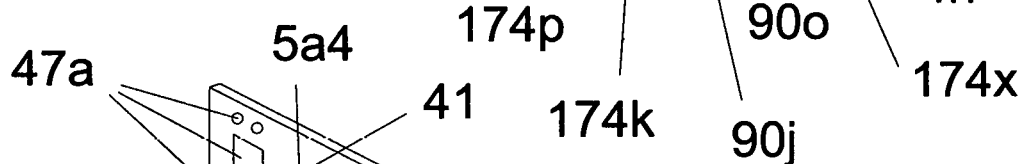
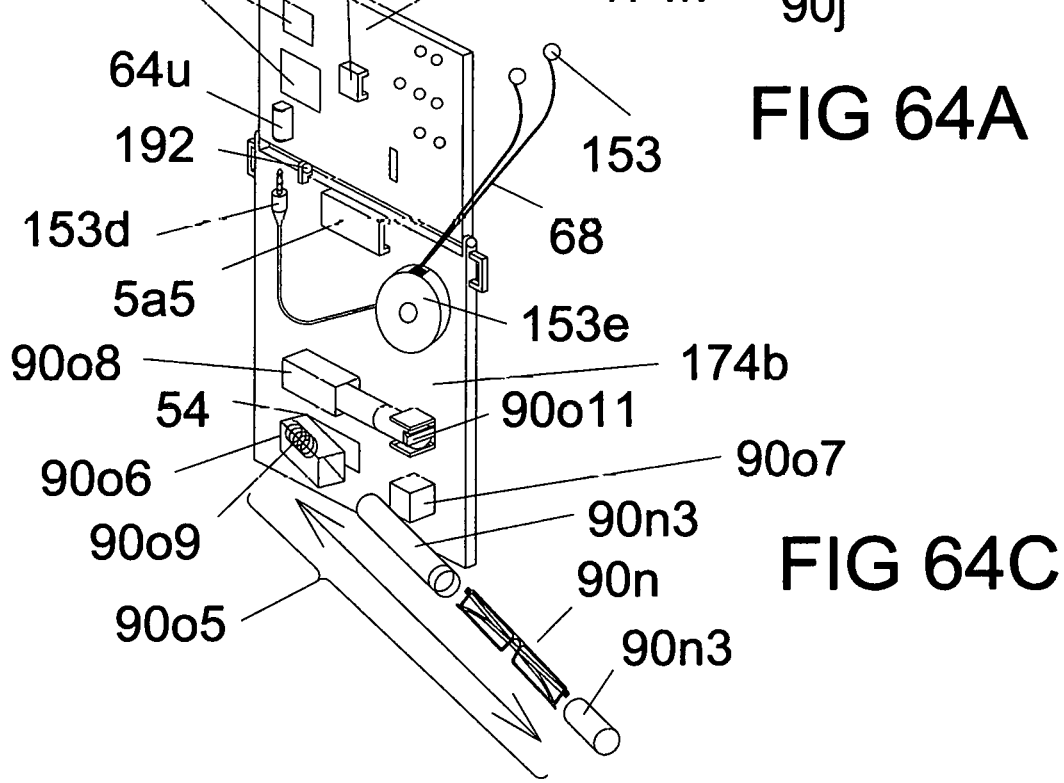
FIG 64B
FIG 64A
FIG 64C

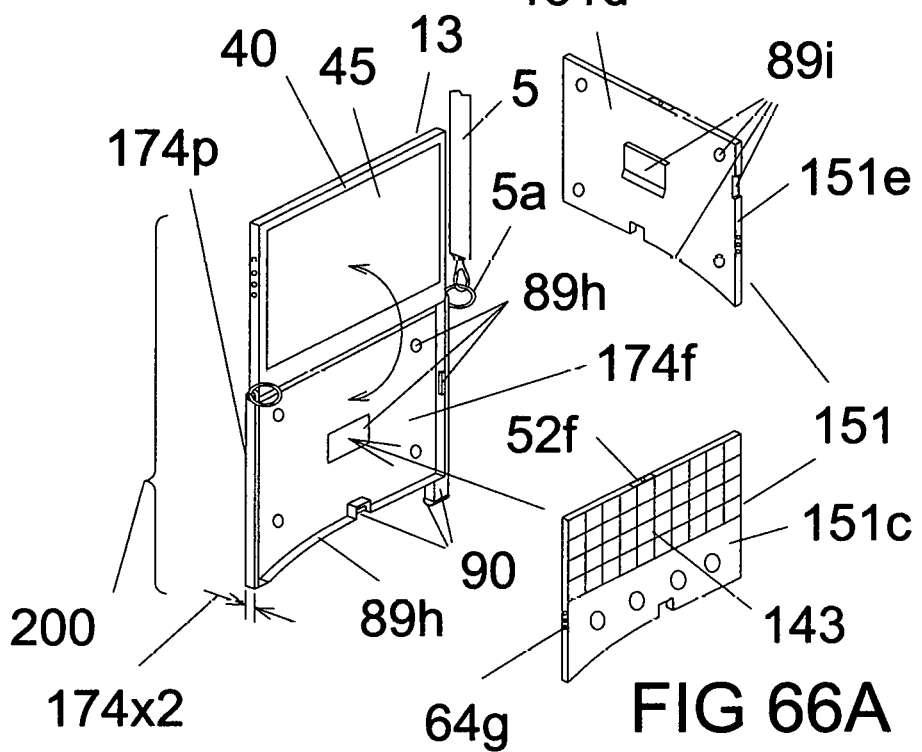

WEARABLE PROPPING DISPLAY APPARATUS 2

CROSS-REFERENCE TO RELATED APPLICATIONS

This application is a Continuation application of copending patent application Ser. No. 14/998,517, filed on Jan. 13, 2016, the entire teachings of which are incorporated herein by reference.

Application Ser. No. 14/998,517 is a Continuation-In-Part of U.S. patent application Ser. No. 14/757,169, filed on Nov. 30, 2015, the entire teachings of which are incorporated herein by reference.

Application Ser. No. 14/998,517 is a Continuation-In-Part of U.S. patent application Ser. No. 14/121,914, filed on Nov. 3, 2014, the entire teachings of which are incorporated herein by reference.

Application Ser. No. 14/998,517 claims the filing benefit under 35 U.S.C. § 119(e) of U.S. Provisional Application No. 62/125,127, filed on Jan. 14, 2015, the entire teachings of which are incorporated herein by reference.

Application Ser. No. 14/998,517 claims the filing benefit under 35 U.S.C. § 119(e) of U.S. Provisional Application No. 62/177,182, filed on Mar. 9, 2015, the entire teachings of which are incorporated herein by reference.

Application Ser. No. 14/998,517 claims the filing benefit under 35 U.S.C. § 119(e) of U.S. Provisional Application No. 62/177,589, filed on Mar. 19, 2015, the entire teachings of which are incorporated herein by reference.

Application Ser. No. 14/998,517 claims the filing benefit under 35 U.S.C. § 119(e) of U.S. Provisional Application No. 62/177,911, filed on Mar. 27, 2015, the entire teachings of which are incorporated herein by reference.

Application Ser. No. 14/998,517 claims the filing benefit under 35 U.S.C. § 119(e) of U.S. Provisional Application No. 62/178,802, filed on Apr. 20, 2015, the entire teachings of which are incorporated herein by reference.

Application Ser. No. 14/998,517 claims the filing benefit under 35 U.S.C. § 119(e) of U.S. Provisional Application No. 62/179,337, filed on May 5, 2015, the entire teachings of which are incorporated herein by reference.

Application Ser. No. 14/998,517 claims the filing benefit under 35 U.S.C. § 119(e) of U.S. Provisional Application No. 62/179,821, filed on May 20, 2015, the entire teachings of which are incorporated herein by reference.

Application Ser. No. 14/998,517 claims the filing benefit under 35 U.S.C. § 119(e) of U.S. Provisional Application No. 62/230,065, filed on May 27, 2015, the entire teachings of which are incorporated herein by reference.

Application Ser. No. 14/998,517 claims the filing benefit under 35 U.S.C. § 119(e) of U.S. Provisional Application No. 62/230,926, filed on Jun. 19, 2015, the entire teachings of which are incorporated herein by reference.

Application Ser. No. 14/998,517 claims the filing benefit under 35 U.S.C. § 119(e) of U.S. Provisional Application No. 62/231,806, filed on Jul. 16, 2015, the entire teachings of which are incorporated herein by reference.

The disclosures of all of these U.S. patent applications are incorporated herein by reference.

TECHNICAL FIELD

The present invention relates to a wearable electronic display designed for mobile use.

BACKGROUND OF THE INVENTION

Currently, computer manufacturers have chosen to limit consumer computers to 1) desk tops, 2) lap tops (notebooks, two panel folding computers), 3) hand held telephone/computers. Desk tops have become products locally assembled from components and are not portable even in the home environment. Hand held computers are dominated by pocket size units not capable of standard Windows, business applications or typing. So, lap tops have become the only option for travelers wanting a "real" computer or people wanting a portable around-the-house computer. Lap tops are ill suited for these uses. For travel use it is difficult: Because of packing and unpacking the unit discourages its own use: While using it, two hand typing is Impossible and one hand use is a balancing act that may easily result in dropping. For around-the-house use, even with the routers replacing wire connections, they are too big and awkward for users freely changing position, lounging, sitting, and walking.

Two new options are available for these lap top users. For the traveler there is the bag computer in a durable package with zero setup time and capable of mobile (on the move) standard applications, business computing and two hand typing.

For the around the house usage, the wearable propping computer remote control solves the problem of freedom of movement. Although many embodiments and options are possible, as a remote control of about 200 gm in weight it may be carried around the neck and, in a couple of seconds, be propped with the full size display (apparent view) in plain view using no hands. It does everything a desk top or lap top does at a small fraction of the cost.

For this inventor, the origin of this idea is the bag computer. For example, U.S. Pat. No. 7,978,464 (FIGS. 2 and 3) shows an operator with a bag used as a prop pressed against his body (lap or stomach) while the strap stabilizes it in an operating position with the display in the view of the operator. Generalizing this arrangement, the prop (bag) may be of a different form and include an interface to stabilize the prop on the operator's body (for example, to stop tipping or sliding while standing). The prop may be a panel or legs and may slide or pivot or be fixed in an operating position pushing the display away from the operator's body for better viewing.

Of course, a lap top with two panels outward resembles the wearable propping display apparatus and includes wireless communication. However, it does not include the strap and the interface and is not made to serve the wearable function. The prop interface includes stability characteristics that make it different; slipping resistance in all directions, lateral tipping resistance but tip adjustability in a direction toward or away from the operator's face for positioning of the display.

Related patents include devices aimed at holding a separate computer in an operating position on the operator's body. For example, U.S. Pat. No. 5,639,004 shows a box with roll up cover meant to hold a computer. Straps suspend it from his shoulders/neck while the box is propped against his stomach. The rolled cover may be a cushion between the box and operator's body.

U.S. Pat. No. 6,659,319 shows a carrying case for computer with arms and props for chair mounting. It collapses into a compact case.

U.S. Pat. No. 6,381,127 shows a platform for a lap top computer. Included straps suspend the platform from the operator's shoulders.

U.S. Pat. No. 5,639,004 shows a box to hold computer. It includes a pivoting cover that becomes a platform for holding the computer while in operation. It may be suspended with straps from the operator.

U.S. Pat. No. 5,887,777 shows a wearable bag for holding and using a tablet computer.

The problem with these holders is that their adaptability to a variety of computers adds size, weight and complexity in construction and use. This is demonstrated by their lack of general acceptance by consumers. Instead, a simple display panel with a prop adapted to interfacing with the operator (non-slip, lateral non-tip) is better, especially when coupled with light-weight remote wireless control instead of including a computer. As a wearable, the display is always close to the operator's face making a 10 inch diagonal display appear at least as big as the 15 inch display of a lap top. This size reduction further reduces weight and makes the product more acceptable.

As explained in the description and drawings, the advantages of this display panel, prop, interface and strap combination may be found in many arrangements.

BRIEF DESCRIPTION OF THE INVENTION

Sheet 1—

The wearable propping display apparatus is comprised of a display panel, an operator body prop, an operator body interface and a suspension device. The display panel and operator body prop may be panels hinged together (display panel attachment edge to operator body prop top edge) with the operator body interface located on the bottom edge of the operator body prop. The suspension device is attached in a distal direction from the operator body prop bottom edge and may be a length of line or belt which may be attached to the right and left side edges of either the display panel or operator body prop.

Sheet 2—

The wearable propping display apparatus is worn by the operator with the suspension device (e.g. a strap) around the operator's neck and suspending the apparatus with the operator body prop bottom edge (with interface) pressing against operator's front stomach/chest area. The operator body prop pushes the display panel away from the operator's body and into his comfortable view.

Sheet 3—

The operator body interface stabilizes the apparatus while in an operating position. It resists slipping in all directions on the operator's body. It resists lateral tipping. The operator body interface allows tipping in the toward/away direction from the operator's face so that the suspension device can be used to adjust the distance of the display from the operator's face.

Sheet 4—

The display panel may have a display on the front side. The display or the display panel back side may include manual controls. The display panel may be adapted to movably attach to the operator body prop, such as by pivoting or sliding. The display panel may include electronics for computing, wireless communication and communication interfaces such as those needed to change a received wireless signal into a video image or to change manual control inputs into a wireless transmission signal.

Sheet 5-Sheet 6—

The operator body interface may take many forms to serve to enhance friction, inhibit lateral tipping or to attach to the operator. Examples include; one or more fixed or removable features, rigid or rubber-like features, projections, points, bumps, blades, serrations, cushions, ribbing, legs, shaping to fit an operator, hooks, rings, pivoting features, bag bottom features or shape and strap or strap attachments.

Sheet 7—

The operator body prop may be slidably attached to the display panel and may be used as a cover for the display.

Sheet 8—

The operator body prop may be a box-like container adapted to slidably hold the display panel. The display panel may pivot once slidably removed from the container.

Sheet 9—

The display panel and operator body interface may be rigidly fixed together and the operator body prop may be rod-like or bar-like. The parts may be removably fixed.

Sheet 10—

The operator body prop may be one or more legs. There may be two legs and the legs may serve the second purpose of an operator body interface stabilizing the apparatus by resisting lateral tipping and resisting sliding in any direction. The legs may be fixed to the display panel or may be movable for storage, for example, by slidably retracting to holders on the display panel.

Sheet 11—

Operator body prop legs may be connected with a band or other connector. There may be one operator body prop legs with a wide operator body interface suitable for lateral stability as well as resistance to sliding.

Sheet 12—

Operator body prop legs may be pivotally attached to the display panel so they can pivot from a storage position to an operating position. The prop may be a panel pivoting on the same plane as the display panel using a hinge with an axis perpendicular to the display panel front side.

Sheet 13—

The operator body prop may be a bag connecting a display panel near the top of the bag to the operator body interface located near the bottom of the bag. The display panel may pivot or slide from an operating position viewable by the wearer over the top end of the bag to a storage position next to the bag. The bag may have one or more stiffeners.

Sheet 14-Sheet 15—

The operator body prop may be fixed to the display panel. The apparatus may be adapted for specialty use such as for use in dirty environments. Using the prop part the display panel may be located for best viewing away from the operator's body and the display part may include guards to protect the display against smudging in use or in storage.

Sheet 16—

The wearable propping display apparatus may include an operator body prop length adjuster, a part of the operator body interface. The operator body prop length adjuster may be attached to the operator body prop (of any type, for example panel or legs). The operator body prop length adjuster may be legs attached to the operator body prop and these may be movably deployed and may be stored by, for example, sliding.

Sheet 17—

The operator body prop length adjuster is designed to lengthen the operator body prop for better positioning of the display panel relative to the operator's face. It may be used to position a supplemental electrical device (e.g. keyboard) attached to the operator body prop in a better position for use.

Sheet 18—

The operator body prop length adjuster may be a panel and this panel may be deployed for storage by sliding by using an operator body prop length adjuster holder, attached to and part of the operator body prop.

Sheet 19—

The operator body prop length adjuster may be a panel or legs slidably attached to a bag used as an operator body prop. An operator body prop length adjuster holder, such as a box or guides, may be used to facilitate this sliding attachment. The operator body prop length adjuster is a part of the operator body interface.

Sheet 20—

The operator body prop length adjuster may be a panel or legs pivotally attached to a bag used as an operator body prop. An operator body prop length adjuster holder, such as a pivoting attachment, may be used to facilitate this attachment. Alternatively, the operator body prop length adjuster sliding panel or pivoting legs may be used on a panel operator body prop to extend its length for better viewing.

Sheet 21—

The wearable propping display apparatus may include an operator body prop length expansion mechanism which is a part of the operator body prop and may be used to extend the total length of the prop. An operator body prop length expander (and operator body prop length expander holder) may be located anywhere on the operator body prop (here shown between the display panel and the operator body prop). The operator body prop length expander may be a removable piece held to the operator body prop with attachments.

Sheet 22—

The suspension device may be a length of belt or length of line with two ends attached to the apparatus to form a loop to suspend the apparatus from the operator's neck. These lengths may include a mechanism for adjusting the length of the line or belt. The suspension device may be a rigid, shaped, length of wire or plastic adapted to fit the operator's neck and apparatus to provide suspension (tensile) and compression strength for unusual positioning of the display. The suspension device attachments may be adapted to be adjustable and to adjust the distance of the display from the operators face. The suspension device or attachments may be attached to the operator body prop or display panel distal to the operator body prop bottom edge.

Sheet 23—

The wearable propping display apparatus may include computer equipment such as a computing unit, memory, keyboard, graphic user interface, electrical connections or other computer equipment to form a computer. These electronics may be located in either or both of the display panel or the operator body prop.

Sheet 24—

The wearable propping display apparatus may include wireless transmission and/or reception equipment to be, for example, a wireless receiver (e.g. television) or wireless remote control transmitter for a remote computer, internet connected equipment or other equipment with telecommunication capability.

Sheet 25—

One or more wearable propping display apparatuses, including wireless transmission and/or reception equipment, may be part of a system further including a housing that intermediates wire or wireless communication with one or more external telecommunication sources. The housing may include a router, a computer and/or one or more transmitters and/or receivers.

Sheet 26—

The wearable propping display apparatus may include accessories such as an eyeglass holder, a sound electrical connection or a sound wire storage device. A removable operator body interface may be included to attach to the operator body prop length adjuster.

Sheet 27—

The apparatus may be extended near its bottom edge for better positioning of the display and may include a storage container. The wire storage device may include an automatic winding mechanism. The eyeglass holder may be adapted to hold eyeglasses normally stored in a tube.

Sheet 28—

The operator body prop may include one or more attachments or shaping matching a supplementary electrical device which has matching shaping and/or attachments. The supplementary electrical device, which may be a keyboard, write pad or other device, may be removably attached to the operator body prop for temporary use. The electrical device may be large than the operator body prop in some dimension.

BRIEF DESCRIPTION OF THE SEVERAL VIEWS OF THE DRAWINGS

FIG. 1 This is a view of the wearable propping display apparatus with a display panel and prop hinged together and in an open operating position.

FIG. 2 This is the wearable propping display apparatus with the display panel and prop separated.

FIG. 3 This is a view of the wearable propping display apparatus with a display panel and prop hinged together and in a closed storage position.

FIG. 4 This is a view of the wearable propping display apparatus showing the attachment and positioning of the suspension device.

FIG. 9 This shows an operator facing front with the wearable propping display apparatus attached to him and in an operating position. Lateral tipping and sliding stability is shown.

FIG. 10 This shows an operator in side view (profile), with the wearable propping display apparatus attached to him and in an operating position. Stability toward and away from the operator's face is shown.

FIG. 14A This is an exploded view showing the parts of a wearable propping display apparatus with a prop deployed using a sliding motion. The prop stores on the display panel back side.

FIG. 14B This figure illustrates a plane parallel to the plane of the display panel and the plane of movement of a sliding operator body prop.

FIG. 14C This is a view of a wearable propping display apparatus with a prop deployable using a sliding motion and with the prop deployed (operating position).

FIG. 14D This is a view of a wearable propping display apparatus with the prop deployable using a sliding motion and with the prop stored (storage position).

FIG. 15A This is a view of a wearable propping display apparatus with a prop deployable using a sliding motion and with the prop deployed (operating position). The prop stores on the display panel front side.

FIG. 15B This is a view of a wearable propping display apparatus with the prop deployable using a sliding motion and with the prop stored (storage position). The prop stores on the display panel front side and is covering and protecting the display.

FIG. 16 This is a wearable propping display apparatus with a prop deployable using a sliding motion and with the prop deployed (operating position). Once deployed, the display panel is also pivotable. The operator body prop includes operator body prop length adjuster legs.

FIG. 17A This is the wearable propping display apparatus of FIG. 16 with the display panel and operator body prop separated.

FIG. 17B This is details of the sliding display panel track of the operator body prop shown in FIG. 17A.

FIG. 17C This is a magnification of the circled area on FIG. 17B showing details of the sliding display panel track of the operator body prop shown in FIG. 17A.

FIG. 18A This is a view of a wearable propping display apparatus where the operator body prop is a bar including an operator body interface fixed to the display panel.

FIG. 18B This is a view of detachable components of the wearable propping display apparatus of FIG. 18A where the operator body prop is a bar attached to an operator body interface and attached to the display panel.

FIG. 19A This is a view of the components of a wearable propping display apparatus where the operator body prop and the operator body interface are both formed by a pair of legs.

FIG. 19B This is the assembled wearable propping display apparatus of FIG. 19A.

FIG. 20A This is a view of the components of a wearable propping display apparatus where the operator body prop and the operator body interface are both formed by a pair of legs and these legs are retractable with a sliding motion into holders on the display panel sides.

FIG. 20B This is the assembled wearable propping display apparatus of FIG. 20A with the legs deployed in an operating position.

FIG. 20C This is the assembled wearable propping display apparatus of FIG. 20A with the legs stored in their holders in a storage position.

FIG. 21A This is a view of the components of a wearable propping display apparatus where the operator body prop is pair of legs and these legs are retractable with a sliding motion into holders on the display panel sides. The legs are connected with a connecting band which serves as a part of the operator body interface.

FIG. 21B This is the assembled wearable propping display apparatus of FIG. 21A with the legs deployed in an operating position.

FIG. 21C This is the assembled wearable propping display apparatus of FIG. 21A with the legs stored in their holders in a storage position.

FIG. 22A This is a view of the components of a wearable propping display apparatus where the operator body prop is a single leg retractable with a sliding motion into a holder on the display panel back side. An operator body interface is included at the bottom end of the operator body prop to provide sliding and tipping stability.

FIG. 22B This is the assembled wearable propping display apparatus of FIG. 22A with the leg deployed into an operating position.

FIG. 22C This is the assembled wearable propping display apparatus of FIG. 22A with the leg stored in its holder in a storage position.

FIG. 23A This is a view of the components of a wearable propping display apparatus where the operator body prop is two legs deployable with a pivoting motion with the axis of pivot on the display panel. An operator body interface is included between the bottom ends of the operator body prop to provide sliding and tipping stability.

FIG. 23B This is the assembled wearable propping display apparatus of FIG. 23A with the legs deployed into an operating position.

FIG. 23C This is the assembled wearable propping display apparatus of FIG. 23A with the legs pivoted into a storage position alongside the display panel.

FIG. 24A This shows the disassembled part of an embodiment of the apparatus where the operator body prop pivots on an axis perpendicular to the display panel front side.

FIG. 24B This is the apparatus of FIG. 24A with the parts assembled and in an operating position (suspension device left out).

FIG. 24C This is the apparatus of FIG. 24B with the operator body prop pivoted into a storage position covering the display.

FIG. 25 This wearable propping display apparatus is a bag with a suspension device to suspending from an operator. The bag is intended to hold a display panel in the top end area for viewing by the operator (bag wearer) at the top end of the bag.

FIG. 26A This is a profile view of an operator wearing the bag, operating it and viewing it while it is worn.

FIG. 26B This is a profile view of an operator wearing the bag and viewing it while it is worn.

FIG. 27A This is the bag of FIG. 25 turned so the bottom end area is visible. This bag is adapted to attach a display panel to the top end area for viewing by an operator wearing the bag. Various operator body interfaces are shown.

FIG. 27B This is a display panel suitable for attaching to the top end area of the bag in FIG. 27A.

FIG. 27C This is the bottom wall of the bag in FIG. 27A showing various alternative operator body interfaces.

FIG. 27D This is the bottom wall of the bag in FIG. 27A showing various alternative operator body interfaces.

FIG. 27E This is a bag section showing the bottom end area of the bag in FIG. 26A and showing various alternative operator body interfaces.

FIG. 30 This shows the front side of the wearable propping display apparatus with fixed prop. The display is located and protected by guards to avoid smudging while being worn and used by the operator.

FIG. 31A This is a profile (side) view of the operator wearing the wearable propping display apparatus with fixed prop. It is in an operating position in the view of the operator.

FIG. 31B This is a profile (side) view of the operator wearing the wearable propping display apparatus with fixed prop. It is in a temporary storage position, worn by the operator and with the display protected by guards from smudging against the operator's front.

FIG. 31C This is a magnified view of the display being protected by guards from smudging against the operator's front.

FIG. 32A This is a front view of the operator wearing the wearable propping display apparatus in an operating position and the display in the view of the operator.

FIG. 32B This is a front view of the operator with the wearable propping display apparatus removed and showing that the operator's apparel (here an apron) may include attachments matching the operator body interface on the apparatus.

FIG. 33A This shows the wearable propping display apparatus including a display panel and operator body prop hinged together. The apparatus includes an operator body prop length adjuster, here two slidably retractable legs attached to the prop.

FIG. 33B This figure illustrates a plane parallel to the plane of the operator body prop and the plane of movement of a sliding operator body prop length adjuster.

FIG. 34 This shows the wearable propping display apparatus including a display panel and operator body prop comprised of two legs. The apparatus includes an operator body prop length adjuster, here two legs slidably retractable into the prop legs in a telescoping manner.

FIG. 35 This is a detail of the telescoping legs of the operator body prop and the operator body prop length adjuster.

FIG. 38A This shows the wearable propping display apparatus including a display panel and operator body prop hinged together. The apparatus includes an operator body prop length adjuster, here a slidably retractable panel attached to the prop.

FIG. 38B This shows a supplementary or removable operator body interface made for removable attachment to either the operator body prop or to the operator body prop length adjuster (e.g. the apparatus of FIG. 38A).

FIG. 39 This is the wearable propping display apparatus of FIG. 38A with the operator body prop length adjuster separated from the display panel and prop.

FIG. 40 This shows an operator body prop length adjuster holder alternative to the adjuster holder in FIG. 39.

FIG. 41 This is the wearable propping display apparatus of FIG. 39 with the operator body prop length adjuster panel in a retracted position in the operator body prop length adjuster holder. Note the operator body interface is now on the operator body prop length adjuster panel contact end (instead of the operator body prop bottom edge).

FIG. 42A This is a wearable propping display apparatus with a bag as the operator body prop and including an operator body prop length adjuster comprised of two retractable legs. The legs are removed from their adjuster holders.

FIG. 42B This is a wearable propping display apparatus of FIG. 42A with the operator body prop length adjuster legs attached to their adjuster holders on the bag sides and in an operating position. An operator body interface is shown as an option.

FIG. 42C This is a wearable propping display apparatus of FIG. 42B with the operator body prop length adjuster legs retracted into their adjuster holders for storage on the bag sides.

FIG. 43A This is a wearable propping display apparatus with a bag as the operator body prop and including an operator body prop length adjuster comprised of a retractable panel. The panel is removed from its adjuster holder and the adjuster holder is removed from the bag's back wall.

FIG. 43B This is a wearable propping display apparatus of FIG. 43A with the operator body prop length adjuster panel attached to its adjuster holder on the bag back side (back wall) and in an operating position.

FIG. 43C This is a wearable propping display apparatus of FIG. 43B with the operator body prop length adjuster panel retracted into its adjuster holder for storage on the bag back wall.

FIG. 44A This is a wearable propping display apparatus with a bag as the operator body prop and including an operator body prop length adjuster comprised of two pivotable legs. The legs are shown pivoted into their retracted position alongside the bag.

FIG. 44B This is a wearable propping display apparatus with a bag as the operator body prop and including an operator body prop length adjuster comprised of two pivotable legs. The legs are shown pivoted into their operating position extending the length of the bag (operator body prop).

FIG. 45 This is a profile (side) view of an operator wearing the wearable propping display apparatus with the operator body prop length adjuster extending the bag (prop) length to better position the display panel in the view of the operator.

FIG. 46 This is a wearable propping display apparatus including a display panel pivotally attached to an operator body prop. The operator body prop length adjuster panel is pivotally deployed and to increase the length of the prop and better position the display.

FIG. 47 This is a wearable propping display apparatus including a display panel slidably attached to an operator body prop. A two leg operator body prop length adjuster is pivotally deployed and to increase the length of the prop and better position the display.

FIG. 48 This shows wearable propping display apparatus separated into a display panel and an operator body prop with the operator body prop length expansion mechanism between them.

FIG. 49 This shows the display panel and the operator body prop of FIG. 48 assembled and with the operator body prop length expansion mechanism deployed and extending the length of the operator body prop.

FIG. 50 This shows the display panel and the operator body prop of FIG. 48 assembled and with the operator body prop length expansion mechanism retracted into a retracted position.

FIG. 51 This shows a wearable propping display apparatus including a display panel and an operator body prop attached together (fixed or pivotally, for example). A separate removable length adjuster may be attached to the bottom edge of the operator body prop.

FIG. 52 This is a wearable propping display apparatus with a display panel and operator body prop pivotally attached together. It includes several different suspension device attachments.

FIG. 53A This is a length of strap or belt to show a possible attachment to a suspension device attachment meant for belting.

FIG. 53B This is a rigid suspension device attachable to suspension device attachments on the apparatus.

FIG. 53C This is a length of line or rope to show a possible attachment to a suspension device attachment meant for line or rope.

FIG. 54 This is an example of an adjustable suspension device adapted to hold a strap or belt.

FIG. 55 This is an example of an adjustable suspension device adapted to hold a line or rope.

FIG. 56 This is a wearable propping display apparatus with a display panel and operator body prop attached together. The figure shows the positioning of the suspension device relative to the junction of the display panel bottom edge and the operator body prop top edge.

FIG. 58A This shows the parts of a system designed for wireless communication between the wearable propping display apparatus and a remote computer.

FIG. 58B This is a magnification of some details of FIG. 58A showing the remote computer and communications connection housing and their wireless and wire connections FIG. 59 This shows that the operator body prop can also serve as a table stand.

FIG. 60 This shows more parts of a system designed for wireless communication between the wearable propping display apparatus and remote communication broadcasts and networks.

FIG. 64A This is a wearable propping display apparatus with a display panel and operator body prop pivotally attached together and in an operating position. The prop includes an extension usable as a storage box.

FIG. 64B This is the wearable propping display apparatus of FIG. 64A in a closed storage position.

FIG. 64C This shows the back side of the wearable propping display apparatus on FIG. 64A and shows that the sound wire storage device as an automatic reel and a different type of eyeglass holder.

Figure 5:
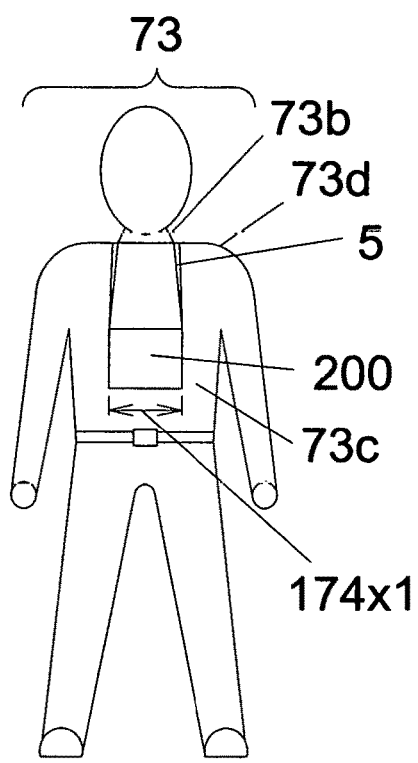
FIG. 5 This shows an operator facing front with the wearable propping display apparatus (storage position) attached to his neck by the suspension device.

FIG. 65 This is a wearable propping display apparatus with a display panel and operator body prop pivotally attached together and in an operating position. The operator body prop includes shaping and/or attachments matching a supplementary electrical device made for it.

FIG. 66A This is the front side of a supplementary electrical device (keyboard) for attachment to the operator body prop.

FIG. 66B This is the back side of a supplementary electrical device (keyboard) of FIG. 66A. The matching attachments are visible.

FIG. 67A This is the front side of a supplementary electrical device (keyboard) for attachment to the operator body prop. It is larger than the operator body prop in some dimension.

FIG. 67B This is the back side of a supplementary electrical device (keyboard) of FIG. 67A. The matching attachments are visible.

DETAILED DESCRIPTION OF THE INVENTION

The wearable propping display apparatus may be arranged in many different embodiments, arrangements or variations of a single theme. The general theme includes; 1) a display panel; 2) an operator body prop to push the display panel away from the operator/wearer and into a comfortable viewing position; 3) an operator body interface to stabilize the operator body prop on the operator's front stomach chest surface area and; 4) a suspension device (or attachments to attach this device) to suspend the display panel from the operator's neck/shoulder area and in his view. In this way the operator may enjoy long term no hand viewing of the display while in many different operator setting and position.

FIG. 1, FIG. 2, FIG. 3 and FIG. 4 show an exemplary embodiment of the wearable propping display apparatus. In FIG. 1, with the apparatus in an open operating position (operator body prop deployed from a storage position to an operating position), the display panel 13 may be pivotally attached to an operator body prop 174p. The operator body prop may come in a variety of forms including a prop panel (shown) and a prop rod (designated elsewhere as 174p1 and 174p2 respectively). The prop rod, in this context, may include (but not limited to) a rod, a bar, a leg, a pole, a rod-like or bar-like tube or pipe or other columnar structure capable of acting as a prop and supporting the display panel.

In FIG. 2, the display panel and operator body prop of FIG. 1 have been separated to show them more distinctly. These two figures show that the display panel may have an proximal edge 42 (defined as at or near the boundary of the display panel indicated in FIG. 2), a distal edge 43, a front side 40 including an electronic display 45 and right side edge 44a, a left side edge 44b and a pivot point 54 to match the operator body prop and form the hinge between the display panel proximal edge and the operator body prop top end. For telecommunication by electromagnetic radiation, the wearable propping display apparatus may include television reception electronics 52k and/or remote communication/control wireless electromagnetic radiation first transmitter 52q1 equipment and/or wireless electromagnetic radiation first receiver 52q2 equipment and this equipment may be found on the display panel. The operator body prop may be a panel (as shown in this figure) and may include a right side edge 174y1, a left side edge 174y2, a bottom end 174x (defined as at or near the boundary of the operator body prop indicated in FIG. 2) and a top end 174z (defined as at or near the boundary of the operator body prop indicated in FIG. 2). The operator body prop may include a pivot point 54 on or near its top end to match and pivotally attach to a pivot point 54 on or near the display panel proximal edge. The pivot points on the display panel and operator body prop are theoretical locations of pivoting by, for example but not limited to, a hinge, axis or flexible fabric which may include necessary accessories such as (but not limited to) an axle, bearing, flange, clamp, jaws or other ways to pivotally attach the two panels together. The pivoting attachment of the operator body prop to the display panel may alternatively be called the operator body prop pivoting holder (see 174r11, FIG. 63A) because it pivotally holds the operator body prop to the display panel. The operator body prop pivoting holder may be oriented to pivot on an axis 54i parallel to the display panel proximal edge. An operator body prop holder of any type may be designated 174r7 (see FIG. 3). Other specific types of holders joining the operator body prop and display panel are designated (but not limited to) 174r8, 174r9, 174r10 and 174r11. Attached to operator body prop and positioned at or near the operator body prop bottom end is an operator body interface 90 which may include shaping 90k and/or friction enhancing feature 90g such as (but not limited to) points or knobs which may be made of rigid material or rubber-like (elastomeric) material such as (but not limited to) rubber, synthetic rubber or silicon.

The apparatus includes a suspension device 5 (just a section is shown) and/or a suspension device attachment 5a for suspending the apparatus from the operator. The suspension device or suspension device attachment may be attached to the display panel or the operator body prop in a distal direction 131b from the operator body prop bottom end. The suspension device attachment to the display panel or operator body prop may be located in a central attachment zone (see 144a1, FIG. 32) or in the area near the junction 13b of the display panel proximal edge and the operator body prop top end when in an operating position. The suspension device or suspension device attachment may attach to the display panel right side edge or left side edge or to the operator body prop right side edge or left side edge.

The purpose of the operator body interface is to temporarily hold the apparatus to the operator's front stomach/chest surface area and to provide stability to the apparatus in terms of lateral tipping stability and operator body surface sliding (slipping) stability in any direction. The operator body prop may provide for tipping instability in the direction toward/away from the operator's face. This stability is provided for with the suspension device which serves to provide adjustability in terms of distance between the display and the operator's face.

The operator body interface may be or include one or more friction enhancing feature (for example but not limited to 90g, 90g2, 90g3, 90g4, 90g5, 90g6, 90g6a, 90g6b, 90g7, 90g8, 90g9, 90g10, 90g11, 90g12, 90g13, 90j, 90j2, 90t, 90k) and may be coupled with shaping (e.g. 90k) to inhibiting sliding and tipping of the apparatus while in an operating position. Alternatively, the operator body interface may be or include one or more operator linking attachment between the operator and the bottom end of the operator body prop.

The operator body interface may be or include one or more friction enhancing features configured to enhance the friction between the operator body prop and the operator's body front stomach/chest surface area to temporarily adhere the prop to the operator body front stomach/chest surface area without the use of an attachment. The enhanced friction keeps the operator body prop from slipping in an up/down motion (or direction) or slipping in a lateral (right/left) direction on the operator's body front stomach/chest surface area and allows the prop to push and hold the display panel away from the operator's body and into the comfortable operator's view. The comfortable operator's view may be defined as slightly below or at a person's natural line of sight when, for example, driving a car or looking at a distant object. This comfortable operator's view (or line of sight) reduces neck strain and allows the operator to continue on another task while still having the display easily viewable without using his hands. To this purpose, the operator body interface may be shaped to compliment an operator's front body stomach/chest surface area, may include features such as (but not limited to) points, legs, rods, cups, blades serrations or other features, or may be made of material suited to enhancing friction such as (but not limited to) flexible, rigid, rubber-like (elastomeric) or sticky-like material.

Using the weight of the wearable propping display apparatus, the operator body interface causes the operator body prop bottom end to adhere to the operator's body front surface the same way the sole of a boot causes the boot to adhere to a slope. The operator body interface also stabilizes the display panel and operator body prop in a lateral direction (right/left, see FIG. 9). The suspension device suspends or stays the display panel and operator body prop from the operator while stabilizing them in a toward/away direction from the operator's face. The operator body prop pushes and holds the display panel away from the operator's body front surface and into the line of sight (the view) of the operator (wearer) in front of his face. The suspension device, operator body prop and operator body interface work together to position the display panel in a comfortable and stable operator viewing position without the operator using his hands and without using any attachment (other than the suspension device extending to or around his neck). This arrangement is simple and easily adjusted to a wide variety positions coordinating with the operator's physical positions such as (but not limited to) standing, sitting, leaning, lounging and even laying down. The display panel may be easily repositioned to be in the operator's center view or a bit below center view so the operator may view other objects ahead of him while still be able to view the display.

The wearable propping display apparatus may include computer equipment and may include much of the same the equipment found on a notebook (lap top) portable computer. The wearable propping display apparatus instead may be a very light, inexpensive, around-the-house, remote control with no computer equipment and be arranged to receive wireless display video and/or sound and may be arranged to transmit manual inputs (via apparatus controls) to a remotely controlled notebook (lap top), desk top or specialized radio controlled computer no local user interfaces (no display or controls).

The display panel and body operator prop of FIG. 1 may pivotally fold together so that the display is covered and protected by the body operator prop. FIG. 3 shows the wearable propping display apparatus of FIG. 1 and FIG. 2 but now in a closed storage position. The display panel and operator body prop are pivotally held together using an operator body prop holder 174r7 in this case formed by the joining their pivot points. Other types of operator body prop holders may be used in other embodiments. The back side 41 of the display panel (opposite the display panel front side) may include manually operated controls (a manual control) such as (but not limited to) a pointing device (touch pad part) 47, pointing device (clicking part) 48a, joystick touchpad 48e, on/off switch 132 or other buttons 48 (e.g. function buttons) to mention a few. Controls on the back side of the display panel may more accurately mimic the actions of a computer mouse and may be more suitable for use with standard personal computer programming commonly used on desk top and notebook (lap top) computers. FIG. 3 shows that the operator body prop may include one or more legs 90j and these may be considered either part of the body operator pro, part of the body operator interface or part of both depending on their purpose.

FIG. 4 shows the wearable propping display apparatus with the display panel 13 and body operator prop 174p in an operating position and including the suspension device (see 5, FIG. 1, 14A, 14C, 10 and many others). The suspension device may be a length of flexible line or strap or maybe rigid in some circumstances. The suspension device may include a right end 5n1 and a left end 5n2 attachable to the display panel or operator body prop and include a middle section 5n3 between the ends intended to extend to or around the operator's neck and/or shoulder area. Because a suspension device attachment may be of the adjustable type, the right or left end of the suspension device is defined by its attachment to the display panel or operator body prop (the actual end of the suspension device may hang lose as excess). Alternatively, the suspension device may be a loop of flexible line or strap surrounding both the operator (neck) and the apparatus. The purpose of the suspension device is to suspend or stay the wearable propping display apparatus from the operator while the operator body prop pushes the display panel into the view of the operator (apparatus wearer) without the need to use his hands.

As described later, there may be more than one operator body prop and it may be (but not limited to) a rod, bar, a leg, a shape, a tube or a panel and may be deployable using (but not limited to) sliding, twisting or pivoting. Alternatively, the operator body prop may be immovably fixed to the display panel. The display panel may include one or more electrical connections 64.

FIG. 5, FIG. 6, FIG. 7 and FIG. 8 show an operator (apparatus wearer) wearing and operating the wearable propping display apparatus. In FIG. 5, the operator 73 (wearer) is facing front (toward the application reader) and the wearable propping display apparatus 200 is in a storage position with the display panel and operator body prop folded closed and hanging against the operator's front stomach/chest surface area 73c by the suspension device 5. The suspension device extends to or passes around the operator's neck 73b and/or shoulder 73d area. The operator body interface includes lateral (right/left) width. This operator body interface width 174x1 forms a lateral stability member which provides lateral (right/left) tipping stability to the apparatus so it does not tip to the right or to the left.

Figure 6:
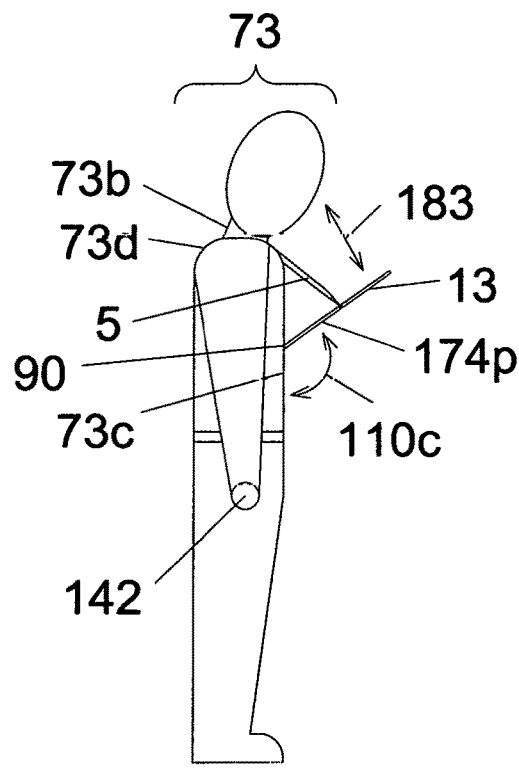
FIG. 6 This shows an operator in side view (profile), standing and viewing the wearable propping display apparatus in an operating position.

In FIG. 6, the operator 73 has turned 90 degrees so he is visible from the side (profile view). The wearable propping display apparatus is opened into an operating position with the display panel 13 and operator body prop 174p both visible in the figure. The suspension device 5 is extending from the operator's neck 73b and/or shoulder 73d area to the wearable propping display apparatus (attached to the display panel or operator body prop) while the operator body interface 90 presses against and clings to the operator's front stomach/chest surface 73c area while the operator body prop pushes and holds the display into the operator's view 183 without using the operator's hands 142. The operator body interface (esp. the friction enhancing type) allows the operator body prop to cling to the operator's body in a variety of locations on the operator's body front and (with the suspension device) to hold a variety of angles 110c relative to the operator's body front stomach/chest surface. It can be seen in this figure that the operator body interface 90 (and, in this case, operator body prop and its bottom end) is relatively thin in a front to back (profile) direction (see also 174x2, FIG. 30C and FIG. 64). This reduces the apparatus size for storage and allows the operator body interface and prop to pivot on the operator's body in a toward/away direction (see 73g1, 73h1, FIG. 10) from the operator's face so the display can be adjusted to the desired distance from the operator's face.

Figure 7:
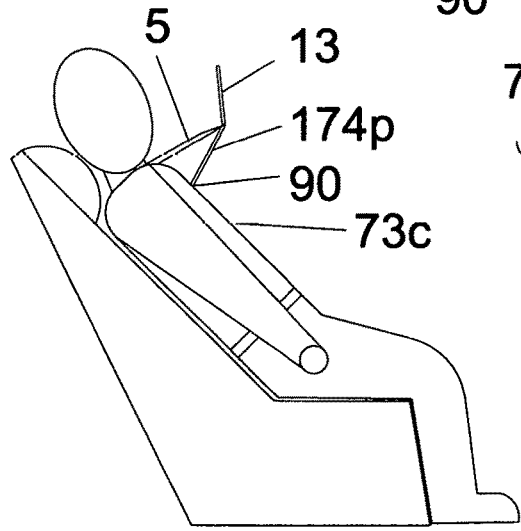
FIG. 7 This shows an operator in side view (profile), half reclined and viewing the wearable propping display apparatus in an operating position.

FIG. 7 is also a side view (profile) of the operator but in this case the operator is in a semi-reclined sitting position. The operator body prop 174p has been shifted on the body front stomach/chest surface area 73c to a position nearer the operator's head and the display panel 13 has been pivoted to be directed into the operator's view. The suspension device 5 stays (or suspends) the display panel and operator body prop in its position while the operator body interface 90 temporarily clings to the operator's body using, in this figure, enhanced friction.

Figure 8:
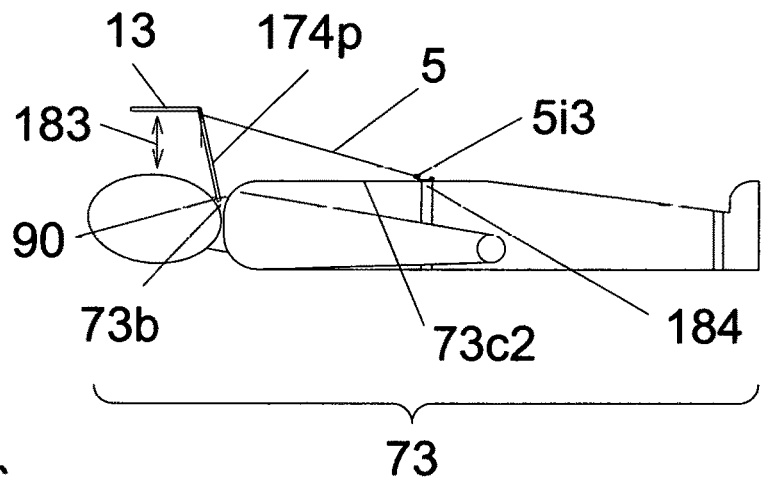
FIG. 8 This shows an operator in side view (profile), fully reclined and viewing the wearable propping display apparatus in an operating position.

In FIG. 8 the operator 73 is fully reclined and viewing 183 the display on the front side of the display panel 13. The operator body prop 174p operator body interface 90 now rests on the operators neck 73b while the suspension device 5 extends to attach to the operator's belt 184 (or other clothing, body part or object attached to the operator) on the operator's front area 73c2 and stays (or suspends) the display panel in the view of the operator. A reclining belt hook 5i3 may be used to attach the suspension device to the clothing, body part or object on the operator.

FIG. 9 and FIG. 10 show the stability characteristics of the wearable propping display apparatus. In FIG. 9, the wearer's 73 (operators) face 73i is facing forward (toward the application reader) with the wearable propping display apparatus in an open operating position with the suspension device 5 suspending the apparatus from his neck 73b. Visible is the display panel back side 41 including one or more manual controls and the operator body prop 174p. The operator is viewing the display on the front side of the display panel opposite the display panel back side. The operator body interface 90 is pushing against the operator's front stomach/chest area 73c. It can be seen that the operator body interface includes a width (see 174x1, FIG. 5) in a lateral direction (right/left) from the operator's body center front in a direction toward the operator's left side 73f and toward the operator's right side 73e. This lateral direction width of the operator body interface forms a lateral stability member 90k5 and includes a right laterally separated surface 90k6 and a left laterally separated surface 90k7, each of these two surfaces being contactable (engageable) with the operator's body (front stomach/chest area) to block tipping and provide lateral stability. Hence, the operator body interface width along with the downward direction distance of the laterally separated surfaces (as measured along the prop's vertical centerline) provides lateral direction (right/left) tipping stability because of the lateral direction width of the lateral stability member where it contacts (engages) the operator's body. This lateral direction tipping stability may be in terms of resisting or preventing the operator body prop with display panel from tipping to the right 73e1 or tipping to the left 73f1. For this purpose, the lateral stability member may include or be tipping stability components such as (but not limited to) right and left interface legs, right and left prop rods, extended right and left operator body prop panel side edges, concave shaping or shaping to compliment the operator's body (see also 90k, FIGS. 1, 12B and 18B).

Lateral direction stability may alternatively or additionally be provided by the operator body interface providing sliding stability in terms of the operator body prop bottom end resisting sliding on the operator's body to the right 73e or sliding to the left 73f. On the other hand, the operator body interface may provide sliding stability in an upward/downward direction in terms of the operator body prop bottom end resisting sliding on the operator's body upward 73g toward or sliding downward 73h away from the operator's face. As sliding stability components, one or more friction enhancing features or surfaces (see, for example, but not limited to, 90g, 90g2, 90g3, 90g4, 90g5, 90g6, 90g6a, 90g6b, 90g7, 90g8, 90g9, 90g10, 90g11, 90g12, 90g13) may be included on the operator body interface to provide this sliding stability that resists sliding of the operator body prop in all directions on the operator's body surface.

FIG. 10 shows the operator 73 of FIG. 9 turned 90 degrees to the side (profile view). The display panel 13 is in front of the operator and pushed away from the operator's front stomach/chest surface area 73c by the operator body prop 174p. At or near the contact place between the operator body interface and the operator's front stomach/chest surface area the operator body interface may include, create or be comprised of a lateral pivot axis 90z. This lateral pivot axis allows the operator body prop and display panel to pivot in a toward/away direction (73g1 and 73h1) on the operator's front stomach/chest surface area as regulated by the suspension device length (see FIG. 256) and to adjust the distance between the display and the operator's face. The suspension device 5 extends to or around the operator's neck 73b and/or shoulder 73d area to suspend the wearable propping display apparatus and to provide stability in a toward/away direction in terms of the display panel with operator body prop tipping toward 73g1 or tipping away 73h1 from the operator's face 73i. In this sense, the suspension device also provides a way to adjust the viewing distance 83c of the display toward 73g1 or away 73h1 from the operator's face.

The wearable propping display apparatus along with the way it is used (FIGS. 5 to 8) and its stability characteristics (FIGS. 9 to 10) represents a method of use for a display panel propped by an operator body prop against an operator's stomach/chest area and suspended by a suspension device from the operator's neck/shoulder area.

Figures 11A, 11B, 11C:
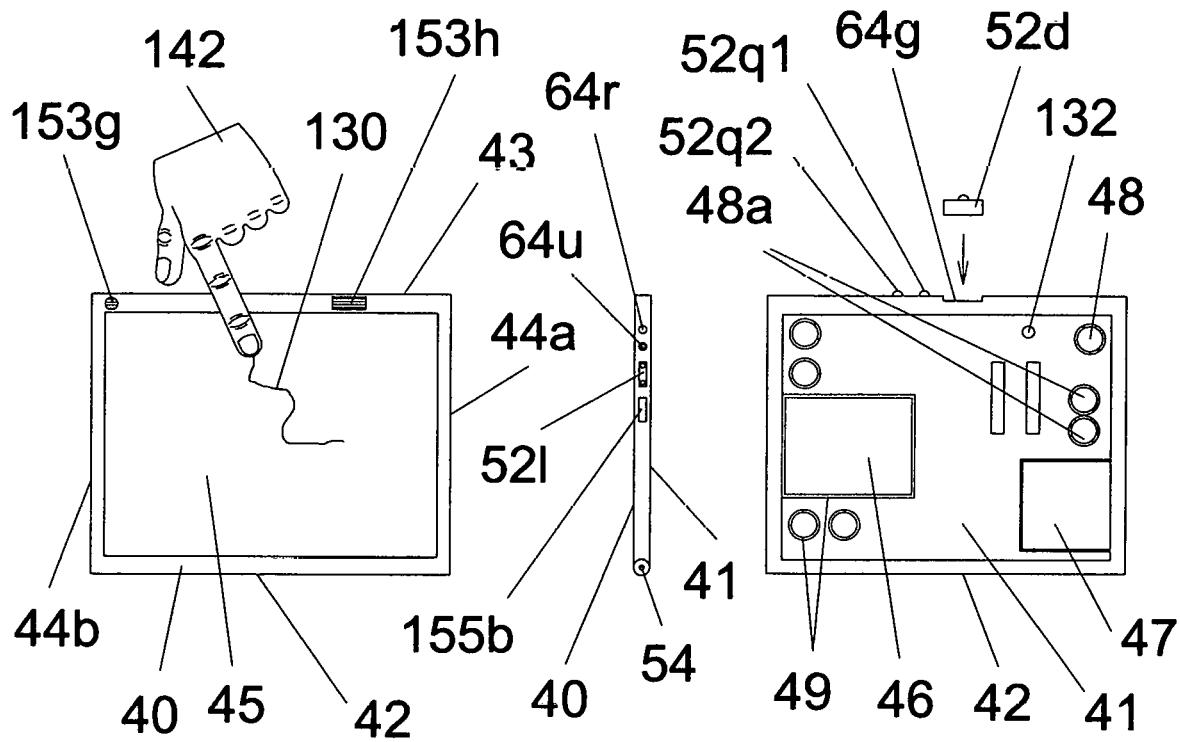
FIG. 11A This is the display panel front side and its characteristics.
FIG. 11B This is the display panel side edge and its characteristics.
FIG. 11C This is the display panel back side and its characteristics.

FIG. 11A, FIG. 11B and FIG. 11C show the display panel and more detail about it. FIG. 11A is the display panel front side 40 including an electronic display 45, a right side edge 44a, a left side edge 44b and proximal edge 42 and a distal edge 43. The display panel may include a manual touch screen control 130 (finger of hand 142 touching-manual control) on the display and this may provide a pointing device control. The display panel may also include a sound output device 153g (speaker) and/or sound input device 153h (microphone).

FIG. 11B is a right side view of the display panel of FIG. 11A and shows that the display panel may include an attachment to pivotably attach it to the operator body prop, such as a pivot point 54 for the hinging to the operator body prop. The pivot point may be or include (but not limited to) a hinge, a bearing, an axle, multiple hinges, a flexible fabric hinge, a clamp or a jaws to accommodate a fabric hinge or other way to pivot or facilitate the hinged attachment of the display panel to the operator body prop. Alternatively, the display panel may be adapted to slidably attach to the operator body prop using, for example, proximal edge, back side or (left or right) side edge mounted holders, tubes, rings, fabric pocket, mounting box, guides or other way to slidably attach the display panel to the operator body prop. The display panel may include one or more controls for functions such as (but not limited to) sound volume adjustment 155b and wireless electromagnetic frequency channel selector 521. The display panel may include one or more electrical connection for functions such as (but not limited to) battery charging 64r, sound input/output 64u. These controls or connections may be located on (but not limited to) the display panel right side edge, left side edge or distal edge. The display panel front side 40 and display panel back side 41 are shown on opposite sides of the display panel.

FIG. 11C shows the back side 41 of the display panel of FIG. 11A which may include operator manually operated controls (also called a manual control or computer user interface) such as (but not limited to) a pointing device touch pad 47, an auxiliary touch pad 46, pointing device clickers 48a (activation buttons), on/off switch 132 and/or other control or function buttons 48. Manual buttons may be of the touch pad type to simplify construction and increase durability. The display panel back side, control area or manual controls may include one or more manual control finger guides 49 associated with the control (near the control) such as (but not limited to) ridges, shaping, reference points or recessing to protect the controls from inadvertent activation and/or to guide the operator's fingers to the proper control. The manual controls may be suitable for controlling a computer. The manual controls may be suitable for accepting manual input information from the operator (apparatus wearer) for wireless transmission of control information to an external telecommunication source. The controls may be suitable for adjusting received wireless information. The display panel may include electronics capable of interpreting received wireless (electromagnetic radiation) signals for video and sound and to prepare manual control inputs from the operator for transmission of (electromagnetic radiation) signals to an external telecommunication source. The display panel may include one or more wireless first transmitters 52*q*1 or first receivers 52*q*2 which may be fixed to the display panel. The display panel may include one or more electrical connections 64*g* to receive removable wireless transmitters or receivers 52*d*.

Figure 11D:
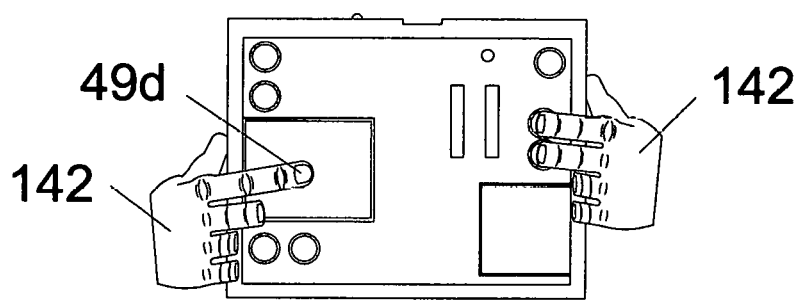
FIG. 11D This is the display panel back side as shown in FIG. 11C and including images of the operator's hands as he might use the manually operated controls.

FIG. 11D shows the back side of the display panel with an operator's hands 142 holding the panel and manipulating the back side manual controls with his fingers 49*d*.

The display panel may include other electronic components, such as (but not limited to) video or sound processing electronics or a computing unit and electronics commonly associated it.

Figure 12A:
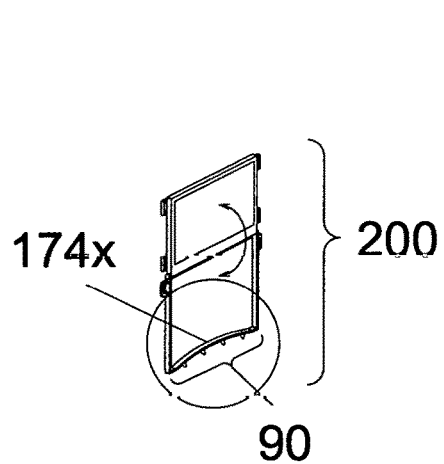
FIG. 12A This is a view of the wearable propping display apparatus with a display panel and prop hinged together and in an open operating position. The circle shows the operator body interface area and the position of the magnifications shown in FIG. 12B to 12F.

FIG. 12A is the wearable propping display apparatus 200 (suspension device not shown) of FIG. 1 with a circle indicating the portion to be shown in magnified views (FIG. 12B through FIG. 12F) of some examples of alternative body operator interfaces 90 and interface stability components located on the operator body prop and positioned near its bottom end 174*x*. The display panel 13 is shown pivotally attached to the top end of the operator body prop. The features of the operator body interface attached near the operator body prop bottom end may be several features individually attached or may be a single monolithic features combining a variety of features. Some features may be combined in one drawing for compactness of presentation rather than their necessary functional association.

Figure 12B:
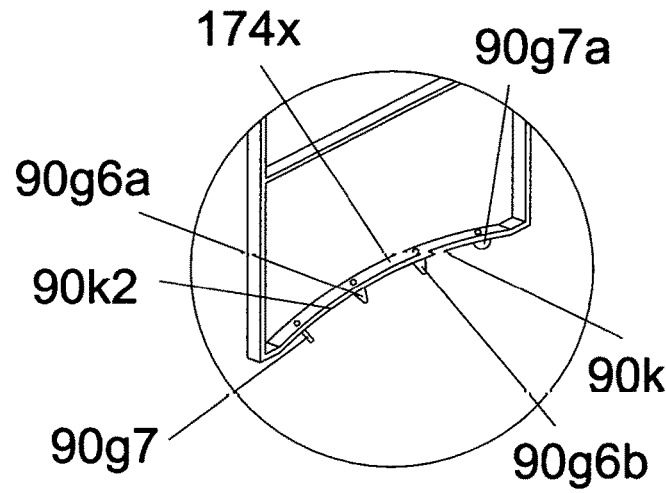
FIG. 12B This is a magnification of the operator body interface area of FIG. 12A showing details of an operator body interface (projections).

FIG. 12B, a magnified view of the circled area of FIG. 12A, shows the operator body prop bottom end 174*x* with friction enhancing features (structures shown here) such as (but not limited to) gripping projections 90*g*7 such as points, fingers, knobs, bumps 90*g*7*a* or lugs attached to it to enhance the friction holding ability of the operator body interface. These projecting features may serve to engage the apparatus to the operator's body front stomach/chest surface area. The gripping projections may be made of a rubber-like (elastomeric) material 90*g*6*a* or may be made of a rigid material 90*g*6*b*. The operator body interface may include shaping 90*k* to compliment the operator's body front to assist with lateral stability and sliding stability on the operator's front stomach/chest area. This shaping may be concave 90*k*2 to provide right and left laterally separated surfaces.

Figure 12C:
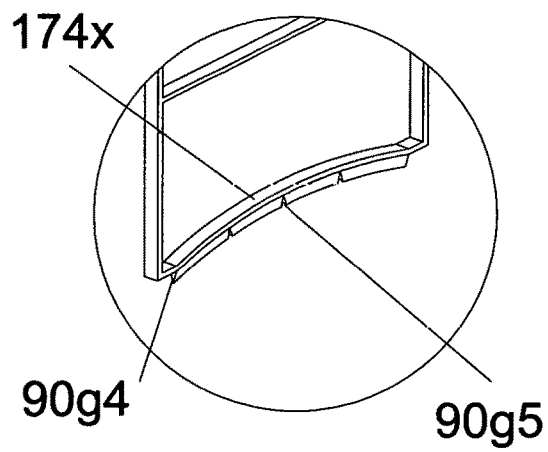
FIG. 12C This is a magnification of the operator body interface area of FIG. 12A showing details of an operator body interface (blade).

FIG. 12C, a magnified view of the circled area of FIG. 12A, shows that the operator body prop bottom end 174*x* may include an operator body interface including structures such as one or more ridges or blades 90*g*4 which may be rubber-like (elastomeric) or rigid. The blade may include serrations 90*g*5.

Figure 12D:
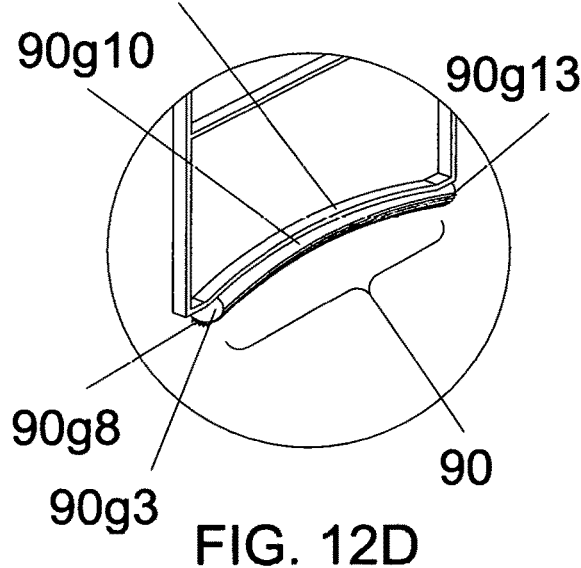
FIG. 12D This is a magnification of the operator body interface area of FIG. 12A showing details of an operator body interface (cushion).

FIG. 12D, a magnified view of the circled area of FIG. 12A, shows that the operator body prop bottom end 174*x* may include an operator body interface 90 made of a cushion 90*g*3 which may include a gripping surface 90*g*13, in this case a one or more ridges 90*g*8 or ribs. Adhering structures and materials may be combined. A gripping surface may include sticking materials (such as (but not limited to) some sticky materials, elastomeric sticking material 90*g*10, sandpaper-like or abrasive coated materials (see 90*g*12, FIG. 13E)), sticking patterns (such as (but not limited to) knurling, knobs, ridges, ribs, lugs, a grid (see 90*g*11, FIG. 13E) and the like), rubber, elastomeric projections or rigid projections. Shaping, legs or rods may be especially good at resisting lateral (right/left) sliding. Shaping may be in a concave way (see FIGS. 12*b* and 12E) to help fit the operator body interface to the operator's front body surface and facilitate the contact of the friction enhancing feature to the operator. A cushion may serve to assist in shaping the operator body interface to the operator's body. Some features or characteristics of the operator body prop may both increase tipping stability and increase sliding stability.

Figure 12E:
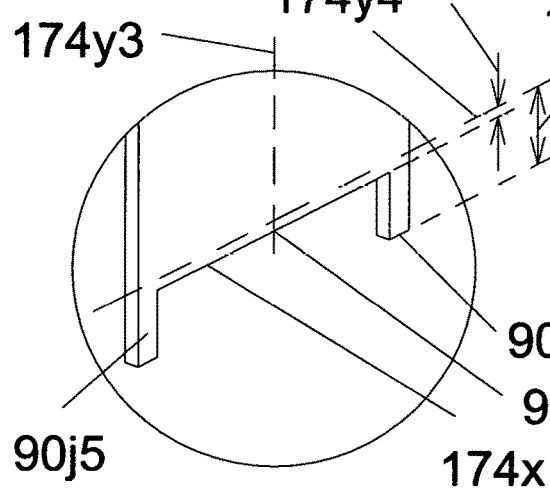
FIG. 12E This is a magnification of the operator body interface area of FIG. 12A showing details of an operator body interface (legs).

FIG. 12E, a magnified view of the circled area of FIG. 12A, shows that the operator body prop bottom end 174*x* may include an operator body interface 90 made of or including one or more legs (for example, a right interface leg 90*j*4 and a left interface leg 90*j*5) which may be short or long. The two legs shown here form an operator body interface by extending the right and left laterally separated surfaces. The tipping stability of the lateral stability member may be illustrated by the difference in projection of the parts of the operator body interface. This difference may be measured from a horizontal reference line 174*y*4 drawn on the plane of the operator body prop front side and extending across the prop about parallel to the prop top and bottom ends a perpendicular to the prop's vertical centerline 174*y*3 also on the plane of the operator body prop front side. The laterally separated surfaces 90*k*6 (only one surface indicated) projection distance 139*h* as measured from the reference line is greater than the interface center 90*r* projection distance 139*i* as measured from the reference line. The laterally separated surface projection distance and the central projection distance may be directed in a downward direction or may be directed in some other direction such as (but not limited to) a direction away from the operator body prop front side (see FIG. 22A). Because of this shape and distance, the lateral stability member's laterally separated surfaces touch the operator and support the apparatus at the right and left of the prop's centerline and provide lateral tipping stability for the apparatus while in an operating position on the operator.

The ends of the legs may also provide grip and sliding stability and resist sliding in any direction. One or more friction enhancing features may be added where they contact the operator. In other cases, the one or more legs may be considered an operator body prop by extending the distance between the display panel and the operator's body. In some arrangements the one or more legs serve as both an operator body prop and an operator body interface.

Figure 12F:
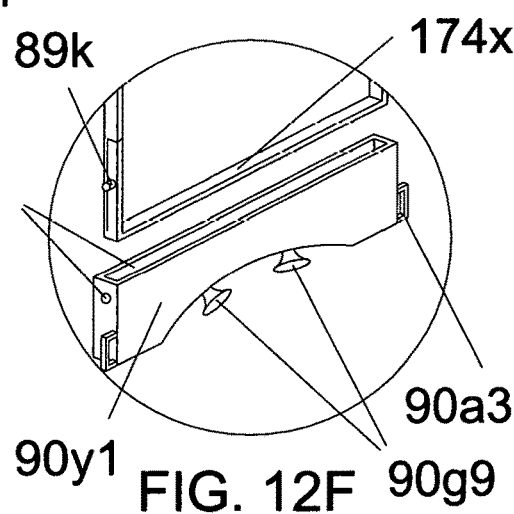
FIG. 12F This is a magnification of the operator body interface area of FIG. 12A showing details of an operator body interface (removable interface).

FIG. 12F, a magnified view of the circled area of FIG. 12A, shows that the operator body prop may include an operator body interface on its bottom end 174*x* that is a supplementary or removable operator body interface 90*y*1 made to fit the operator body prop and/or any operator body interface attached to it. The removable interface may include removable interface attachment 89*j* adapted to attach the removable interface to the prop or interface found there. The removable interface attachment may be adapted to fit a variety of prop types (for example, but not limited to a prop panel, a leg, a shape or a prop rod). For attachment to the prop (or to an operator body prop length adjuster) the removable interface attachment may use fitted parts, friction fitting parts, shaping, clipping, tying, strapping, an attachment intended to match an attachment on the prop or interface or other way of attachment found anywhere on the operator body prop. The operator body prop or operator body prop length adjuster may include a removable interface prop attachment $89k$ matching the removable interface attachment. Any operator body interface may be or include one or more friction enhancing cups $90g9$, for example, suction cups.

The removable operator body interface may be (but not limited to) rigid or flexible, may be made of material, such as cloth or cushioning, to comfort the wearer (operator) especially when the apparatus is worn in a reclining position or near the neck area. For providing comfort or stability to the apparatus while on the operator in an operating position, the removable interface may include (but not limited to) shaping, cushioning, friction enhancing features or operator linking attachments $90a3$. The removable operator body interface may include a lateral stability member with two laterally separated surfaces and/or any other operator body interface characteristics.

Multiple alternative supplementary or removable interfaces may come with a variety of shapes or features so the operator may choose the removable interface that suites him best. The removable operator body interface may fit an operator body prop bottom end without any operator body interface and serve as a substitute for any permanently attached operator body interface. The supplementary or removable operator body interface is also suitable to attaching to an operator body prop length adjuster.

Figure 13A:
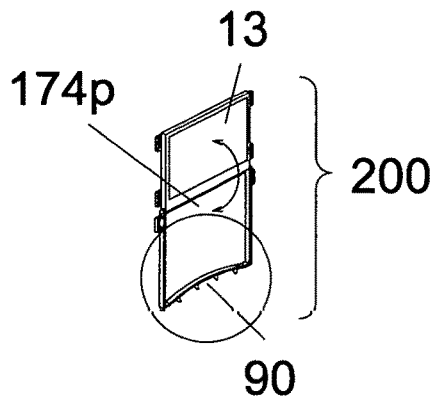
FIG. 13A This is a view of the wearable propping display apparatus with a display panel and prop hinged together and in an open operating position. The circle shows the operator body interface area and the position of the magnifications shown in FIG. 13B to 13F.

FIG. 13A is the wearable propping display apparatus 200 (suspension device not shown) of FIG. 1 with a circle indicating the portion to be shown in magnified views (FIG. 12B through FIG. 12F) of some examples of alternative body operator interfaces 90 and interface stability components located on the operator body prop and positioned near its bottom end 174$x$. The display panel 13 is shown pivotally attached to the top end of the operator body prop. The features of the operator body interface attached near the operator body prop bottom end may be several features individually attached or may be a single monolithic features combining a variety of features. Some features may be combined in one drawing for compactness of presentation rather than their necessary functional association.

Figure 13B:
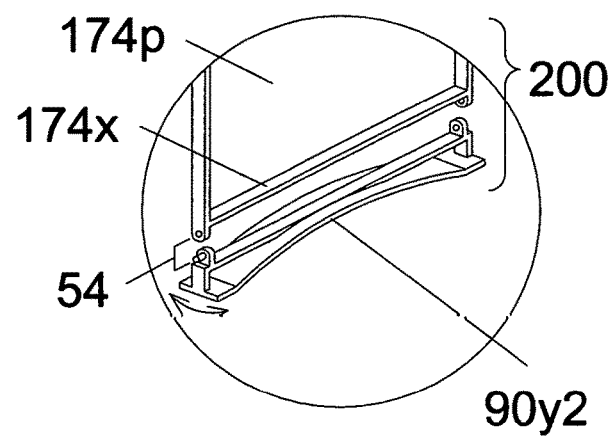
FIG. 13B This is a magnification of the operator body interface of FIG. 13A showing details of an operator body interface pivoting interface.

FIG. 13B, a magnified view of the circled area of FIG. 13A, shows that the operator body interface of the apparatus 200 (partially shown) may be a piece configured to attach to the operator body prop 174$p$, especially to its bottom end 174$x$. The interface may be a pivoting interface $90y2$ pivotally attached to the operator body prop by a pivot point 54 (shown here separated with a matching bearing/axle unit) which may be (but not limited to) a bearing and axle, flexible fabric hinge or other hinge-like device. The pivoting interface may include friction enhancing features, lateral stability member and/or shaping to fit the operator's body, as mentioned elsewhere.

Figure 13C:
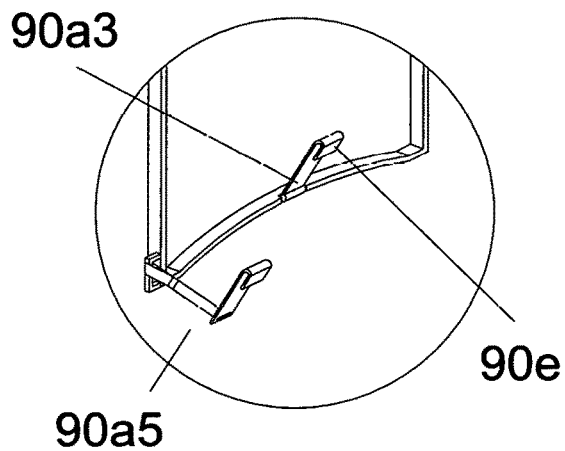
FIG. 13C This is a magnification of the operator body interface area of FIG. 13A showing details of an operator body interface operator linking attachment configured as a hook for operator apparel.

FIG. 13C, a magnified view of the circled area of FIG. 13A, shows that the operator body interface may be or include an operator linking attachment $90a3$ for the purpose of temporarily adhering or holding the apparatus to the operator and provide sliding or tipping stability. This operator linking attachment, such as or including (but not limited to) a hook $90e$, a clip, a clasp or a gripping device, may be designed to attach to some incidental object or attachable site on the operator's clothes (e.g. pocket, opening between buttons, button hole, belt). The attachment may match an intentional complimentary attachment positioned on the operator clothing. The attachment may be pivotally attached to the operator body prop for a more natural alignment between the operator and the apparatus. Also shown is one side of a belt adapted operator linking attachments for an existing belt $90a5$ using an attachment (for example, the hook shown here) attached to the prop using a strap or lanyard to extend the attachment reach and adjust its angle of attachment to the operator (right and left attachment units may be normal). (For more examples of operator linking attachments see FIGS. 26A, 26C and 26D).

Figure 13D:
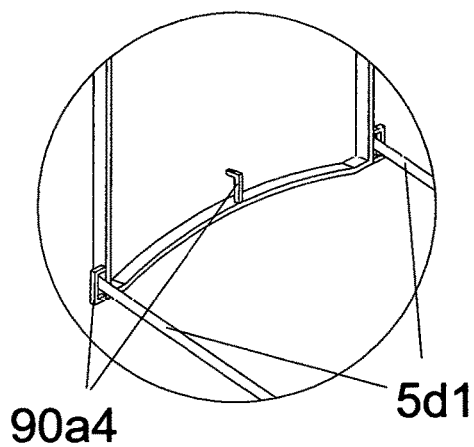
FIG. 13D This is a magnification of the operator body interface area of FIG. 13A showing details of an operator body interface belt adapted operator linking attachment configured to hold a belt wearable by the operator.

FIG. 13D, a magnified view of the circled area of FIG. 13A, shows that the operator body interface may be one or more belt adapted operator linking attachments $90a4$ configured to attach to the ends of or to a section of a loop in an operator linking attachment belt $5d1$ or lanyard and to lead the operator linking attachment belt to the right and left of the operator body prop near its bottom end. The belt may further lead around the operator's waist for holding the apparatus to the operator. The belt adapted operator linking attachments and/or the operator linking attachment belt may be adapted to attach to an existing belt on the operator's clothing using, for example, belt hooks (see $90a5$, FIG. 13C). One or more belt adapted operator linking attachments may be attached to the operator body prop right side edge, left side edge, front side or back side.

Figure 13E:
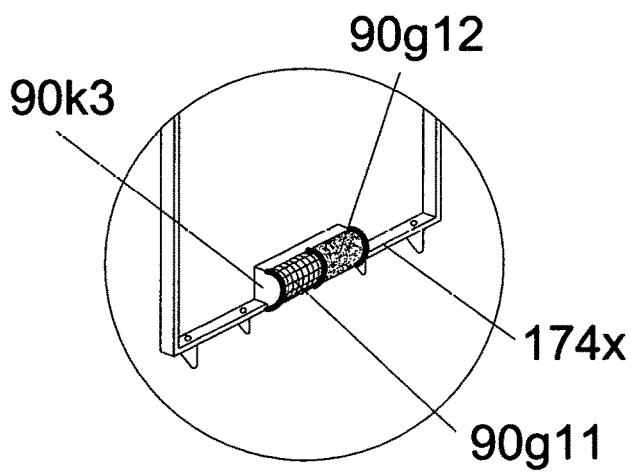
FIG. 13E This is a magnification of the operator body interface area of FIG. 13A showing details of an operator body interface semi-cylindrical or rounded contact surface and including a sticking material and a sticking pattern.

FIG. 13E, a magnified view of the circled area of FIG. 13A, shows that the operator body interface may be a pivot drum $90k3$ including a rounded or semi-cylindrical surface with an axis along the lateral pivot axis (see $90z$, FIG. 64B) to maintain a constant surface contact and traction with the operator's body as the operator body prop may pivot on the operator's body front surface in a toward/away direction from his face. The operator body interface may include a gripping surface with material such as (but not limited to) a sticking pattern (a grid is shown) $90g11$, an elastomeric material or sticking material (an abrasive surface is shown) $90g12$ (e.g. sandpaper-like surface). As seen in this drawing, the operator body prop bottom end 174$x$ may be shaped straight in a lateral direction (right/left).

Figure 13F:
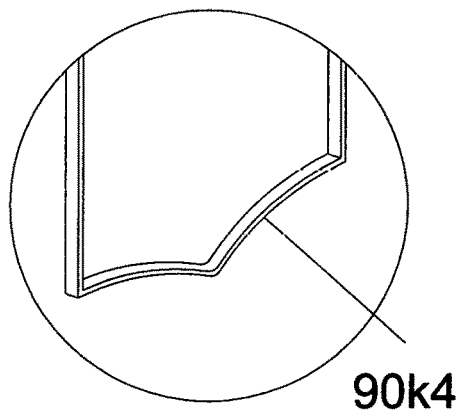
FIG. 13F This is a magnification of the operator body interface area of FIG. 13A showing details of an operator body interface including specialty shaping for special surfaces on the operator's body.

FIG. 13F, a magnified view of the circled area of FIG. 13A, shows that the operator body interface may include specialty shaping $90k4$, for example, bosom shaped to fit a female chest. Specialty shapes may be included in one or more supplementary or removable operator body interfaces (see $90y1$, FIG. 12F) made to removably attach to the operator body prop and/or any operator body interface attached to it.

The operator body prop may be of a variety of shapes, structures and materials in order to serve to support and push the display panel away from the operators body and into his comfortable view. The operator body prop may be one or more prop panels.

As shown in FIG. 1, the operator body prop may be a prop panel and this panel may be pivotally attached to the display panel so that the display panel and body operator prop panel may fold alongside each other with the display panel front side (with display) adjacent to the operator body prop panel front side (see FIGS. 1, 2, 3, 63C and 64). The operator body prop may provide protection for the display in this way.

As an alternative, the operator body prop panel may be slidably attached to the display panel so that the operator body prop may be deployed from a storage position to an operating position with a sliding motion.

FIG. 14A shows the separated components of a wearable propping display apparatus embodiment where the operator body prop is a prop panel 174$p2$ and the display panel is slidable into, alternatively, a storage position or an operating position. The components include a display panel 13 including an electronic display 45, a display panel proximal edge 42, a suspension device 5 and/or suspension device attachments 5*a*, one or more operator body props 174*p*2 (prop panel) and one or more matching operator body prop holders 174*r*8 (box-like) on the display panel and designed to hold the operator body prop to the display panel. The prop holder suspension device attachment 5*a*7 may be attached to the operator body prop holder (a part of the operator body prop. In this figure, the operator body prop holder is a thin box 174*r*8 open on the edge nearest the display panel proximal edge 42 that allows the prop panel to slide parallel to the display panel into the holder for storage position or out of the holder for the operating position. Alternatively, the operator body prop holder may be guides (see 174*r*9, FIG. 15A) or other way to slidable hold the operator body prop panel to the display panel. The prop panel operator body prop may include an operator body interface 90 positioned near its bottom end 174*x*, the interface including features such as (but not limited to) shaping and/or one or more gripping, friction enhancing or operator linking attachment features, as previously described, to assist in holding the prop bottom end to the operator's body. A locking mechanism may be included on the operator body prop and/or operator body prop holder to hold the prop in a storage position and one or more operating positions (see 181*a* (FIG. 14D) and 181*b* (FIG. 14C))

FIG. 14B shows a display panel parallel plane 45*e* oriented to be parallel to the plane of the display panel as shown in FIG. 14A to 14D. Included for reference is a plane 45*g* perpendicular to and extending in a direction back from the top end of the display panel plane. This is the plane of up/down sliding movement 131*a* that the operator body prop uses relative to the display panel in moving from a storage position to an operating position. Other types of sliding operator body props (for example, a prop rod) may use this same plane of movement for deployment from storage position to operating position.

In FIG. 14C the components of FIG. 14A are assembled and in an operating position with the operator body prop (prop panel) 174*p*2 extended out of the operator body prop holder 174*r*8 and ready to prop against the operator's body. The amount of extension may be variable and adjustable to fit operator's viewing requirements. This figure shows that the length of the operator body prop may be further adjusted with one or more operator body prop length adjusters 174*s* which may, for example, pivot on a hinge 54 (a type of operator body prop length adjuster holder) from a retracted position alongside the sliding operator body prop to an extended position in order to lengthen the operator body prop if desired by the operator. In this figure the operator body prop holder is located on the back side of the display panel and this is where the operator body prop stores. In this figure the operator body prop includes an add-on electrical device prop attachment feature 89*h*, such as (but not limited to) one or more holes, a magnet, a matching shape, a bracket, a hanger or other attachment feature, configured to attach an electronic tool, such as (but not limited to) a keyboard, musical keyboard or write pad, to the prop.

In FIG. 14D the operator body prop (prop panel) 174*p*2 has been stored to a storage position using the operator body prop holder 174*r*8 (box-like) for storage alongside the display panel back side. In this figure, the suspension device has been removed but a suspension device attachment 5*a* is shown attached to the operator body prop holder instead of to the display panel or operator body prop. In this example, the storing is done with a sliding motion in a direction upward 131 and parallel to the display panel. The sliding storage of the operator body prop reduces the size of the apparatus for storage. Also shown is operator body prop holder to prop locking mechanism 181*a* which engages the operator body prop and holds it alternatively in a storage position or in one or more operating positions.

FIG. 15A shows the display panel and body operator prop (prop panel) 174*p*2 assembled and in an operating position with the prop moved with a sliding motion downward 139 and parallel to the display panel 13 and exposing the display 45 for use. In this figure the operator body prop and holder are mounted on the front side of the display panel. The operator body prop holder includes or may be one or more prop guides 174*r*9 (one near the display panel right side edge and one near the display panel left side edge, in this case) designed to hold the operator body prop panel to the display panel without blocking the operator's view of the display while in an operating position. The operator body prop holder to prop locking mechanism 181*a* can hold the operator body prop in an operating position relative to the display panel.

FIG. 15B shows the apparatus of FIG. 15A but with the operator body prop (prop panel) 174*p*2 moved with a sliding motion upward 131 along the prop guides (operator body prop holder) into a storage position adjacent to and parallel to the display panel 13 while covering and protecting the display (now hidden). An advantage of locating the operator body prop panel on the front side of the display panel is that it serves to protect the display while the prop is in a storage position.

FIG. 16 shows a type of wearable propping display apparatus that may be viewed in a mobile environment without using the hands. In this case, the display panel 13 is slidably attached to a prop panel operator body prop 174*p*2 that also serves as a display panel protector (e.g. container or partial container) including guides to accommodate the display panel. The display panel may be slid into or alongside the operator body prop and the display may be protected during storage. This embodiment of the wearable propping display apparatus includes one or more suspension devices 5 (e.g. a strap) and/or suspension device attachments 5*a*. The operator body prop may be deployed from a storage position with the display panel extracted from the interior of or from alongside the operator body prop using an upward movement 131. This figure shows the apparatus in an operating position. The display panel may include a handle 60 to assist in deploying the operator body prop from the display panel. Once the operator body prop is deployed, the display panel may then be pivoted 139*g* to adjust the viewing angle of the display 45 to the operator requirements (the pivotally adjusted display panel position is shown in dashed lines). The operator body prop also includes an operator body interface which may assist in temporarily holding the operator body prop bottom end to the operator and may be or include a feature such as (but not limited to) an operator linking attachment 90*a*3 for connection to the operator or his apparel, shaping 90*k*, one or more legs 90*j*, friction enhancing feature or other feature for facilitating temporary holding of the prop to the operator. The operator body prop 174*p*2 (prop panel) may include an operator body prop length adjuster 174*s* to adjust the length of the operator body prop and adjust the viewing position of the display to best suit the operator (see FIGS. 36A and 36B). Shown in this figure, the operator body interface includes an operator body prop length adjuster that is rod-like, bar-like or tube-like (an adjustment rod) and extends to or retracts from an extended position with an up/down sliding motion. The operator body prop includes an operator body prop length adjuster holder 174*r* to slidably hold the adjuster to the operator body prop and shown as tube-like in this figure. However, any type of length adjuster and/or length adjuster holder adapted to adjust the operator body prop length is suitable.

FIG. 17A shows detail of the parts of the wearable propping display apparatus of FIG. 16. The display panel 13 and operator body prop have been separated. The display panel includes an electronic display 45 and may include computing equipment and/or one or more a transmitters and/or receivers 52.

The operator body prop may be shaped to be a holder or container, also 174*p*2, and this holder may be comprised of a holder front wall 18*a*, a holder back wall 76, a holder right side 17*a*, a holder left side 17*b*, a holder bottom wall 174*x* (hidden but shown in dashed lines) and form a holder interior 11*c* which may hold and protect the display panel and display. The holder top area is open to allow the display panel to enter/exit. One or more of the holder walls may be missing (e.g. the back wall) while still providing protection for the display. The operator body prop may or may not include computer equipment.

For the purpose of deploying the operator body prop from the display panel with a sliding motion from a storage position to an operating position, the operator body prop may include one or more guides shown here comprised of one or more guide rail parts 79*a* on the operator body prop that are designed to match one or more guide traveler parts 79*b* (for example but not limited to peg, wheel or knob) on the display panel. Alternatively, the traveler parts may be located on the operator body prop and the rail parts located on the display panel to serve the same function. The display panel guide traveler parts and the guide rail parts form a guide that directs the motion of the display panel upward or downward, out of or into the container-like operator body prop 174*p*2.

FIG. 17B shows the operator body prop including one or more operator body prop holder guide parts 174*r*9 that have been separated from the operator body prop in this figure. The display panel guide traveler part 79*b* is shown separated from the display panel and in two different positions in the holder (operator body prop) guide rail part 79*a* (two rails) to show two of many different positions the traveler may be in while sliding 131*a* up and down the rail. The guide rail part may include a sliding guide stop 181*f* at the top of the rails to keep the display panel connected to the operator body prop. The sliding guide stop may be located in the top pivot area of the guide rail part.

The wearable propping display apparatus may include one or more mechanisms to hold the display panel in a position outside the holder and/or to hold the display panel at an angle relative to the holder (operator body prop).

FIG. 17C is a magnification of the top pivot area 144*d* of the display panel guide where the guide rail part 79*a* meets the stop. The stop may be or include two jaws 100 (also forms the stop) to clamp the display panel guide traveler part 79*b* into the stop and pivot area when it is in an operating position. The pivoting area may further include an angle holding mechanism such as (but not limited to) a friction grip or one or more angle holding notches 167*a* on the guide rail part near the sliding guide stop which matches one or more angle holding keys 167*b* on the guide traveler part 79*b*. The sliding guide stop may include a bottom stop 181*e* for the purpose of holding the display panel in an operating position without the display panel sliding unintentionally back into the operator body prop. Other arrangements for holding the display panel outside the operator body prop and/or at one or more angles relative to the operator body prop may be imagined.

Shown in FIG. 18A (left) is an embodiment where the wearable propping display apparatus includes an operator body prop 174*p* comprised of one rigid prop rod attached to the display panel 13 and configured to push the display panel away from the operator's body and locate the display 45 into a comfortable operator's view line of sight. To suspend the display panel and operator body prop in the operator's view, a suspension device 5 may be attached to suspension device attachments 5*a* found either on the operator body prop or on the display panel. Attached to the operator body prop and positioned near the operator body prop bottom end 174*x* is an operator body interface that includes a lateral stability member 90*k*5 that has width 174*x*1 and two laterally separated surfaces (right laterally separated surface 90*k*6 and left laterally separated surface 90*k*7) which provides lateral tipping stability to resist tipping to the right and to the left. The body operator interface may be relatively thin in a front to back (profile) direction (see FIG. 30C and FIG. 64). This reduces the apparatus size for storage and allows the display panel and prop operator body to pivot on the operator's body so the display can be adjusted to the wanted distance from the operator's face by shortening or lengthening the suspension device length. The operator body interface may further include one or more operator body interface legs (for example, a right interface leg and a left interface leg) or friction enhancing features to add sliding stability and resisting sliding of the interface in any direction on the operator's body.

FIG. 18B shows the apparatus of FIG. 18A but this figure shows that the display panel 13, operator body prop 174*p* and operator body interface 90 may, optionally, be removable from each other to assist in storage. The display panel may have a display panel to operator body prop attachment 174*m*4 matching an operator body prop to display panel attachment 174*m*3 on the operator body prop, the two attachments joining the display panel proximal edge 42 to the operator body prop top end 174*z*. The operator body interface may have an operator body interface to operator body prop attachment 901 matching an operator body prop to operator body interface attachment 174*j* on the bottom end of the operator body prop, the two attachments joining the body operator interface to the body operator prop bottom end 174*x*. The suspension device or the suspension device attachment(s) 5*a* may be located on either the display panel or the operator body prop. The operator body interface may further include one or more gripping or friction enhancing features 90*g* or shaping 90*k* or interface legs 90*j*4 or an operator linking attachment 90*a*3 designed to increase display panel and operator body prop stability and resist sliding and/or tipping of the apparatus. The operator body interface may further include one or more storage attachments 90*m* to hold apparatus parts together while in storage.

FIG. 19A shows an embodiment where the operator body prop is two (or more) prop rods 174*p*1. The prop rods attach to the display panel 13, for example, on the proximal edge 42, back side or side edges to extend the length of the display panel. The operator body prop (prop rods) is configured to push the display panel away from the operator's body and locate the display 45 into the comfortable operator's view (line of sight). The configuration of the two prop rods (acting as both operator body prop and operator body interface) enables the prop rods to also be an operator body interface 90. The operator body interface has width 174*x*1 (see FIG. 19B), laterally one prop rod to the other prop rod, which forms a lateral stability member, laterally separated surfaces and provides lateral tipping stability to resist tipping to the right and to the left. The body operator interface may be relatively thin in a front to back (profile) direction (see FIGS. 6, 30C and 64). This thinness reduces the apparatus size for storage and allows the operator body interface and prop to pivot (using the lateral pivot axis) in a toward/away direction on the operator's body so the display can be adjusted in a toward/away direction to the wanted distance from the operator's face. The prop rods may additionally serve as an operator body interface by providing sliding stability, temporarily adhering to the operator and resisting any sliding of the interface on the operator's body. The prop rods, especially at their bottom end 174x, may further include a friction enhancing feature 90g, such as (but not limited to) rubber-like (elastomeric) or rigid ridges (shown), points or projections. The prop rods may include one or more operator linking attachments 90a3. A suspension device attachment 5a may be located on either the display panel or the operator body prop (prop rods). The suspension device, shown detached from the remainder of the apparatus, is in the form of a suspension device loop 5s intended to surround the operator's neck and the apparatus. The suspension device loop includes a suspension device length adjuster 5r.

FIG. 19B shows the apparatus of FIG. 19A but with the suspension device 5 attached to the rest of the apparatus (display panel 13 and operator body prop as prop rods including the right prop rod 174p1a and the left prop rod 174p1b) and ready for operation. It can be seen that the prop rods, operating as an operator body interface, have width 174x1 that provides lateral (right/left) tipping stability but are thin relative to display panel width to form a lateral pivot axis and allow pivoting (tipping instability) of the apparatus in a toward/away direction from the operator's face. Also shown in this figure are accessories including a touch screen control 130 (for example a touch screen pointing device) (shown as a stylus touching the display), one or more wireless transmitters and/or receivers 52 (three shown) and one or more electrical connections 64g (shown as sockets) suitable to connect to removable transmitters and/or receivers (two shown).

FIG. 20A shows the separated components of an embodiment of the wearable propping display apparatus. It includes a display panel 13 including a front side 40 with an electronic display 45, a suspension device 5 and/or suspension device attachments 5a, one or more operator body props 174p1 (two prop rods in this case), a proximal edge 42 and one or more operator body prop holders 174r10 (tube-like holders) on the display panel. The figure shows that the suspension device attachment 5a may be attached to either the display panel or to the operator body prop holder. The operator body prop holder is part of the operator body prop. In this embodiment the holders are (but not limited to) tube-like, pocket-like or ring-like and allow the rod-like props to slide with an up/down motion longitudinally into the prop holder for storage or out the prop holder for operating. The operator body props 174p1 and the operator body prop holders 174r10 may include interacting stopping/locking mechanism parts which may include (but not limited to) friction, matching ratcheting, matching screw threads, matching ridges and/or notches, matching buttons and/or holes (181a and 181b) or other feature to hold the operator body prop in a desired relative position in order to prop the display panel in an operating position or to store the props. As in the apparatus of FIGS. 19A and 19B, the configuration of the prop rods (also operator body prop) enables the prop rods to also be a operator body interface. Additionally, the bottom end of prop rods may include one or more operator body interfaces 90, such as (but not limited to) shaping, gripping points or gripping rod ends 90g6c or other friction enhancing feature or surface to assist in holding the props to the operator's body.

In FIG. 20B the components are assembled and in an operating position with the operator body prop 174p1 (two prop rods) deployed out of the operator body prop holder 174r10 and ready to propping against an operator's body. This figure shows that a the operator body prop holder may be located on the display panel right side edge and on the display panel left side edge to widen the operator body interface and to use the holders as handles. The operator body prop holders (a part of the operator body prop shown here as a prop holder tube but any type of prop holder is applicable) may include one or more operator body prop holder suspension device attachments 5a7 to hold the suspension device 5 to the display panel. The amount of deployment may be variable and adjustable to fit operator viewing requirements. The length of the operator body prop may be further adjusted with one or more operator body prop length adjusters 174s which may (but not limited to) slide along the sliding operator body prop side or inside in a "telescoping" manner (e.g. a rod or tube inside a larger tube) back and forth between a retracted position and an extended position. The sliding of these prop rods may be on a display panel parallel plane (see 45e, FIG. 14B). In this case, operator body prop may also serve as a length adjuster holder (see FIG. 35). This figure also shows that the electronic display may include touch screen controls 130 (indicated by stylus drawing). Whatever the embodiment, the display panel may include a wireless transmitter and/or receiver 52 (three shown) and these may be removably installed to electrical connections 64g (two shown) in the display panel. An operator body prop bottom end 174x4 is shown.

In FIG. 20C the operator body prop 174p1 (two prop rods) have been stored into the operator body prop holder 174r10 (right and left) for storage (the suspension device has been removed).

It is noteworthy that the operator body prop 174p1 (a prop rod) and operator body prop holder 174r10 (a tube) shown here are analogous to the operator body prop length adjuster 174s and the operator body prop length adjuster holder 174r shown in other figures (for example, FIG. 12A, FIG. 15B, FIG. 18, FIG. 19 or FIG. 31) where it is mounted to a separate operator body prop 174p, such as (but not limited to) a prop panel or prop rod or bag).

FIG. 21A shows the components of another embodiment of the wearable propping display apparatus. It includes a display panel 13 including an electronic display 45, a suspension device 5 and/or suspension device attachments 5a, one or more operator body props 174p1 (two prop rods shown), a proximal edge 42 and one or more operator body prop holders 174r10 (right and left tubes are shown) on the display panel. Shown here, the holders may be tube-like, pocket-like or ring-like and allow the prop rods to slide longitudinally into the holder for storage or out the holder for operating. This figure shows two operator body props with their bottom ends 174x attached together with an operator body interface, such as (but not limited to) a contact band 90t, which may assist in holding the props to the operator body, may increase operator comfort and may be used as a handle to move the props between the storage position and the operating position. The contact band may be rigid or flexible, large or small and may include tipping stability and/or sliding stability components. Locking mechanism parts may be included on the operator body prop and/or operator body prop holder to hold the prop in a storage position and one or more operating positions.

In FIG. 21B the components are assembled and in an operating position with the operator body prop 174p1 (prop rods) deployed out of the operator body prop holder 174r10 (right and left tubes shown) and ready to propping against an operator's body. The amount of deployment may be variable and adjustable to fit operator viewing requirements. In this figure the operator body prop includes an add-on electrical device attachment prop feature 89h, such as (but not limited to) one or more holes, magnet, bracket or other attachment, configured to attach a supplementary electrical device, such as (but not limited to) a keyboard or write pad, to the props. The operator body interface (contact band, for example) may include a handle 60a for deploying and storing the operator body props.

In FIG. 21C the operator body props 174p1 have been stored into the operator body prop holder 174r10 for storage (the suspension device has been removed).

FIG. 22A shows the components of another embodiment of the wearable display apparatus. It includes a display panel 13 including an electronic display 45, a suspension device 5 and/or suspension device attachments 5a and a display panel proximal edge 42. The operator body prop 174p1 is a single leg matching and slidably attached to an operator body prop holder 174r located on the display panel (shown here on the display panel back side). Shown here, the holder is a box-like tube but may be (but not limited to) some other ring-like, rail-like or pocket-like guide that allows the prop rods to slide longitudinally into the holder for storage or out of the holder for operation. Attached to the operator body prop and positioned near the operator body prop bottom end 174x is an operator body interface which may be or include a friction enhancing feature such as (but not limited to) a friction enhancing feature 90g and/or a rubber blade 90g4 with projections. In this case, the projection distance 139h of the lateral stability member's laterally separated surfaces is in a direction away from 139j the operator body prop front side thus favoring stability in operation position that are more vertical. This interface may assist in holding the prop to the operator's body, add tipping or sliding stability to apparatus, increase operator comfort and may be used as a handle to move the props between the storage position and the operating position. Locking mechanism parts may be included on the operator body prop and/or operator body prop holder to hold the prop in a storage position and/or one or more operating positions. In this figure the operator body prop includes an add-on electrical device attachment prop feature 89h, such as (but not limited to) one or more holes, magnet, bracket or other attachment, configured to attach a supplementary electrical device, such as a keyboard or write pad, to the prop.

In FIG. 22B the components are assembled and in an operating position with the operator body prop 174p1 deployed out of the operator body prop holder 174r and ready to propping against an operator's body. The amount of deployment may be variable and adjustable to fit operator viewing requirements. The operator body prop holder is attached to the display panel 13 and allows prop movement in an up/down sliding motion 131a. The suspension device 5 is attached to the display panel and the operator body interface 90 is positioned at the prop bottom end for contact with the operator.

In FIG. 22C the operator body prop has been stored into the operator body prop holder on the display panel 13 for storage (the suspension device has been removed). This figure shows that the operator body interface includes sufficient width 174x1 to provide a lateral stability member with two laterally separated surfaces that give lateral tipping stability to the prop and apparatus. The operator body interface 90 is still available for use in the storage position.

FIG. 23A shows the separated components of another embodiment of the wearable propping display apparatus. It includes a display panel 13 including an electronic display 45, a suspension device 5 and/or suspension device attachments 5a, a proximal edge 42, an operator body prop 174p1 (right and left legs) and a matching operator body prop holders 174r11 (right and left pivoting holders) on the display panel. As shown in this figure, the prop holder is a bearing or axle to pivotally hold the axle or bearing of a shaped, possibly wire, prop so it can pivot from a storage position alongside the display panel to an operating position propping the display panel against the operator's body. A locking mechanism may be included on the operator body prop and/or operator body prop holder to hold the prop in a storage position and one or more operating positions. The suspension device 5a may alternatively be attached to the operator body prop. Attached to the operator body prop and positioned near the operator body prop bottom end 174x may be included one or more operator body interfaces, such as (but not limited to) a contact band 90t and/or an friction enhancing feature such as a gripping surface 90g13, to assist in holding the props to the operator body. The operator body prop top end 174z1 (prop rod) is positioned to attach to the display panel near its proximal edge.

In FIG. 23B the components are assembled and in an operating position with the operator body prop 174p1 pivoted on the display's 13 operator body prop holder with a pivoting motion 139g into an operating position and ready for propping against an operator's body. The suspension device 5 is attached to the display panel and ready to suspend the apparatus from the operator's neck/shoulder area. The length of the operator body prop may be further lengthened or adjusted with one or more operator body prop length adjusters 174s which may be extended with a pivoting motion using a hinge 54 (a type of operator body prop length adjuster holder) from a retracted position alongside the pivoting operator body prop to an extended position (shown in this figure) further lengthening the operator body prop.

In FIG. 23C the operator body prop 174p1 is pivoted using the operator body prop pivoting holder 174r11 into a storage position alongside the display panel 13 (the suspension device has been removed). The suspension device 5a may alternatively be attached to the operator body prop.

FIG. 24A shows the disassembled parts of an embodiment of the apparatus that uses a prop panel as an operator body prop 174p. The operator body prop is pivotally attached to the display panel 13 using an operator body prop pivoting holder, shown as a part on the display panel and a part on the operator body prop, both labeled 174r11. The pivoting holder is located to attach the display panel proximal edge 42 (at or near the boundary of the display panel indicated) to the operator body prop top end 174z (at or near the boundary of the operator body prop indicated). The suspension device 5 and the suspension device attachment 5a on the display panel are shown. There is an operator body interface 90 (shaping to compliment the operator's body) positioned at the bottom end of the operator body prop.

In FIG. 24B the operator body prop 174p2 (prop panel) and display panel 13 are pivotally attached with the operator body prop pivoting holder oriented to pivot on an axis 54j perpendicular to the display panel front side. In this case the operator body prop may swing from an operating position (shown in this figure) into a storage position (FIG. 24C) with a movement to the right and around the pivoting holder to cover the display panel's display 45. During movement, the operator body prop remains parallel to the plane of the display panel (see FIG. 14B).

In FIG. 24C the operator body prop 174*p*2 (prop panel) is pivoted on the operator body prop pivoting holder 174*r*11 into a storage position covering the display panel's 13 display. The operator body prop has turned 180 degrees from the operating position.

In another embodiment of the wearable propping display apparatus (shown in FIGS. 25 to 27E) the operator body prop may be a bag used to prop the display panel away from the operator's body and into the view of the operator. Such a bag may be made of flexible bag material with sufficient bulk to push the display panel away from the body or may be a bag treated with a stiffening agent or be a bag including stiffening members to assist in the propping function. For example, a part of the bag (for example the back, side or front wall) may be supplemented with one or more bag stiffening members 1*a* (FIG. 25) such as (but not limited to) a rigid panel, rigid computing unit panel, a rigid rod, rigid bar, rigid tube or a rigid operator body prop length adjuster holder. To improve operator (bag wearer) viewing and positioning of a display panel attached to the top end area of a bag, an operator body interface may be included near the bottom end area of the bag and/or as part of operator apparel. In comparing the bag embodiment of the wearable propping display apparatus with other embodiments there are analogous components: the bag 1=the operator body prop 174*p*: the bag bottom end area 147*a*=the operator body prop bottom end 174*x*; the bag top end area 3*c*=the operator body prop top end 174*z*.

As shown in FIG. 25, a display panel 13, including an electronic display 45, may be mounted near the top end area (see 3*c*, FIG. 27A) of the bag 1. The display panel may be attached to the bag using an operator body prop holder 174*r*11 (pivoting holder in this case). This figure shows a pivoting holder but the holder may alternatively attach the display panel with (but not limited to) sliding (see FIG. 43A to 43C), fixing or other attachment which holds the display panel in a vertical operating position. For removability, the operator body prop holder may include matching bag parts and display panel parts for this attachment (see FIGS. 27A and 27B). The figure shows the display panel in several optional operating positions and the storage position including a vertical operating position 182*c* (shown in solid lines). In the vertical operating position (the figure shows display panel back side 41 in this position) the apparatus operator (and bag wearer) 73 may view 183*a* the display from in back of the bag and looking forward (back to front) over the top end area (see 3*c*, FIG. 27A) of the bag. The display panel may be movable and storable on or in the bag by (but not limited to) removal, pivoting, sliding or other way of moving the display panel into and out of a storage position on or in the bag.

For example (but not limited to), the display panel may be pivotally attached to the top end area of the bag near the top edge 14 of the front wall 2 (outside surface is shown) of the outside surface of a bag 1. The bag may include a pivoting cover 8 (e.g. hingedly 54 attached at the bottom 9 of the display panel (or computer equipment) storage area) to cover the display panel when it is in a storage position 182*a* (shown in dashed lines) in a display panel (or computer equipment) storage area 71 (see FIG. 27A) on the outside surface of the bag's front wall. The display panel may be pivotally or slidably mounted to the bag so it may be moved from a storage position to one or more operating positions, for example 182*b* (shown in dashed lines with the display panel front side and display 45 visible), and including a vertical operating position 182*c* (shown in solid lines) which allows the operator 73 to view 183*a* the display panel's display in a forward looking direction (back to front) from in back of the bag and over the top of the bag's top wall 3 (or top end area see 3*c*, FIG. 27A). The bag may have a right side and a left side (indicated by the top wall right side 3*d* and the top wall left side 3*e*). The bag top end area may include a top end opening (and, possibly, a closure (e.g. zipper)) providing access to the bag's interior 87. The display panel may be removable from the bag and the bag may include one or more fixtures for mounting the display panel to the bag for operation. The bag's bottom end area 147*a* includes the bag bottom wall, the junction of the back wall and bottom wall (see 148*e*, FIG. 44A) and the adjacent sections of walls which may be involved in holding the bag to the operator's front stomach/chest surface area while the bag is propped in a vertical operating position.

FIG. 26A shows a side view (profile) of the operator 73 (bag wearer) wearing, viewing and controlling the display panel 13 mounted to the top end area of the bag and viewable from in back of the bag and looking forward (back to front) over the top end area of the bag (see 3*c*, FIG. 27A) while in a vertical operating position. The bag and display panel are shown in a vertical operating position. The operator is manipulating display panel manual controls with his hands 142. The display panel 13 is in a vertical operating position and the bottom end area of the bag 1 is supported by the operator's (bag wearer's) body front surface area. The bag may include an operator linking attachment on or near the bag bottom and configured to temporarily join to an intentional or incidental attachable object on the operator's body or clothing, in this case his belt 184, to position the display panel further from the operator's body but closer to his face and/or more in line with the comfortable operator's view line of sight thus making the display more easily viewed 183*a* from the back of the bag and over the top end area of the bag.

FIG. 26B is the same view as FIG. 26A but showing that the display panel 13 and bag may be supported by the operator's body (front stomach/chest surface area 73*c*) with the suspension device 5 (shown here as a strap) suspending the apparatus from the operator's neck 73*b* or shoulder 73*d* area without the operator using his hands 142 and without using any operator linking attachment between the bag and the operator. The apparatus may pivot (tip) on the operator's body at a lateral pivot axis (a part of the operator body interface) by adjusting the suspension device length 5*t* to optimize the distance between the operator's face and the display. The operator 73 is viewing the display from in back of the bag with the bag's back wall 148 closest to him. The bag's front wall 2 is on the bag side opposite the back side and further away from the operator. The bag bottom end area 147*a* may include an operator body interface 90 to help support, stabilize and position the bag on the operator body front surface area to improve the operator's viewing of the bag's display panel while in a vertical operating position. The operator body interface may do this without an operator linking attachment by substituting a friction enhancing feature (see FIGS. 12, 13 and 27E)) to increase the friction between the bag bottom end area and the operator's body front stomach/chest surface area and stop bag sliding in any direction. Thus, the bag's bottom end area and junction area of the back and bottom walls 148e1, using the operator body interface, temporarily adheres to the operator's front stomach/chest surface area (sliding stability) and provides lateral tipping stability while the suspension device suspends the bag from the operator's neck/shoulder area and the bag (prop) pushes the display into the comfortable operator's view line of sight over the top end of the bag without the need for him to use his hands, FIG. 27A shows the bag of FIG. 25 from a viewpoint that makes the bag bottom end area more visible. It can be seen that the bag 1 may include a bottom wall 147 and one or more side walls (right side wall 4b shown) and a front wall with a display panel (or computer equipment) storage area 71 (for the display panel in storage position). The bag may include one or more suspension device attachments 5a and these may be located in a distal direction from the operator body interface in the bag bottom end area toward the top end area of the bag and toward the right side and left side of the bag, for example, near the top wall right side and near the top wall left side (see 3d and 3e, FIG. 25). The bag may include a suspension device 5, such as (but not limited to) a strap or line, and this may be attached directly to the bag or may be attached to the bag via the suspension device attachments. FIGS. 27A and 27B (a view of the display panel separated from the bag) show that the display panel 13 may be removably attached to the bag (pivoting attachment is this figure). The bag (top end area) may have a bag part display panel mount 144b and the display panel may have a matching display panel part display panel mount 144c located, for example, near the display panel proximal edge 42. These display panel mount parts may include (but not limited to) hinge parts, clamp for fabric hinge, guides for sliding, traveler, track, socket, pin or other matching features for the purpose of mounting the display panel to the bag near the top end area 3c (in a vertical operating position) so the display is viewable by the operator (bag wearer) from in back of the bag and looking forward (back to front) over the top end area of the bag. As an alternative type of bag part display panel mount, a flexible fabric hinge 144d is shown for attaching to the jaws of the display panel part display panel mount. Collectively, this attachment (of any type) may be seen as the operator body prop holder (see 174r7, FIG. 3 and FIG. 1).

FIGS. 27A, 27C, 27D and 27E show the outside surface of the bag's bottom end area and bag 1 bottom wall 147 four times. The bag bottom wall is a major component of the bag bottom end area. Shown are some various types of bag bottom operator body interfaces (for example, 90a to 90g, 90j and 90k) configured to temporarily hold the bottom end area of the bag to the operator so that the bag will not slide up or down or to the right side or to the left side and the bag's display may be viewed in a vertical operating position over the top of the bag's top wall from the back of the bag. Lateral tipping resistance may also be included because of the width of the bag's bottom wall provides for a lateral stability member with two laterally separated surfaces. Bag bottom operator body interface features may be intended to temporarily attach the bag bottom end area to the operator and include one or more operator linking attachment such as (but not limited to) "D" rings 90a, loops 90b, straps 90c, buttons 90d, hooks 90e or pockets (of metal, plastic or cloth), tabs and button holes 90f, snaps, belt adapted operator linking attachment, clips, ties, hooks and loops, magnets or other attachments attachable to matching features or attachable to some incidental features on the operator's clothes (for example but not limited to a button, button hold, pocket or belt). The interface 90h may be located on a nearby adjacent wall (side, front, back) of the bag, the bag bottom or anywhere on the bag so that the bottom end area of the bag may be temporarily held to the operator.

The operator body interface makes the bag resist slipping in any direction. The interface and/or bag may resist tipping of the bag and display panel to the right or to the left of the operator and the display may be viewed in a more comfortable operator's view line of sight with the display panel in the vertical operating position in the bag top end area.

The bag bottom operator body interface may include stabilizing features intended to temporarily hold and stabilize the bag bottom end area to the operator. These stabilizing features may include (but not limited to) friction enhancing feature or gripping surfaces 90g13 (FIG. 27C), legs 90j or shaping 90k (FIG. 27A) to compliment the operator's body to aid in temporarily adhering the bag bottom end area to the operator or to his clothing without the use of any attachment. A gripping surface may include materials that stick (such as (but not limited to) some sticky materials, elastomeric materials, sandpaper-like or abrasive coated materials), patterns that stick (such as (but not limited to) knurling, knobs, ribs, lugs, a grid and the like), rubber, elastomeric projections or rigid projections. Shaping or legs may increase lateral tipping stability and sliding stability by resisting lateral (right/left) tipping and sliding in all directions. Shaping may be in a concave way (see FIG. 27E) to help the operator body interface compliment the operator's front body surface and facilitate to contact of the friction enhancing feature to the operator.

FIG. 27E shows a section of the bag of FIG. 27A near the bag's bottom end area to make clear a possible change in shaping of the bag's bottom area. It shows that the operator body interface may include shaping 90k1 of the bag 1 bottom end area 147a to better compliment the operator's body front stomach/chest surface area and resist slipping or tipping. The shaping of the bag bottom end area or the operator body interface may be concave 90k2 to match the shape of the operator stomach/check front area and resist lateral sliding and tipping. The bag bottom end area may include other operator body interface features such as (but not limited to) rigid shaping 90k8 intended to hold the interface shape even with bag deformation from sagging or large load and may include width to serves as a lateral stability member; friction enhancing feature, gripping surfaces and/or gripping projections 90g7 which may be of rigid or rubber-like (elastomeric) material and designed to use the bag's weight to enhance the friction between the bag bottom end area and the operator's body front stomach/chest surface area as the suspension device stays or suspends the bag and causes the bag bottom end area to push against and stick to the operator. These features may be located on back wall or bottom wall in the junction area (see 148e1, FIG. 26B) of the back and bottom walls near the junction of the back and bottom walls (see 148e, FIG. 44A). A friction enhancing feature or gripping surface may further include (but not limited to) materials that stick (such as (but not limited to) some sticky materials, elastomeric materials, sandpaper-like or abrasive coated materials), patterns that stick (such as (but not limited to) knurling, knobs, ribs, lugs, a grid and the like), rubber, rubber projections or rigid projections 90g7. The operator body interface and/or bag bottom end area include lateral width 174x1 to act as a lateral stability member 90k5 with two laterally separated surfaces (90k6 and 90k7) to resist tipping of the bag and display panel to the right and to the left of the operator. The operator body interface and/or lateral stability member may form a lateral pivot axis 90z which may be located near the junction of the bag's back and bottom walls. Because of the flexible nature of the bag material, even a rigid operator body interface may pivot enough to adjust the interface to bag angle for good temporary adhesion to the operator yet to allow for pivoting (tipping) the bag and display panel in a toward/away direction to optimize the display distance from the operator's face. See FIG. 12A to 12F and FIG. 13A to 13F for additional samples of operator body interfaces that may be used on the bag's bottom area.

FIG. 28A to FIG. 32B shows the wearable propping display apparatus embodiment with another different type of operator body prop. Shown is a display panel with an operator body prop fixed to the display panel. Along with the suspension device, the apparatus is adapted to be worn by an operator with the display 45 readily visible in an operating position without using hands and also easily manipulated even when the operator has dirty hand, as in the case of cooking. This embodiment of the apparatus may be washable and may include batteries, wireless battery charging equipment, wireless communication such as (but not limited to) a radio (electromagnetic wave) remote control transmitter 52$q$1 and/or video/sound receiver 52$q$2 to wirelessly communicate data with a remote computer. This embodiment may be a system by including the apparatus with one or more transmitters and/or receivers, a separate computer and/or including wireless battery charging equipment.

Figure 28A:
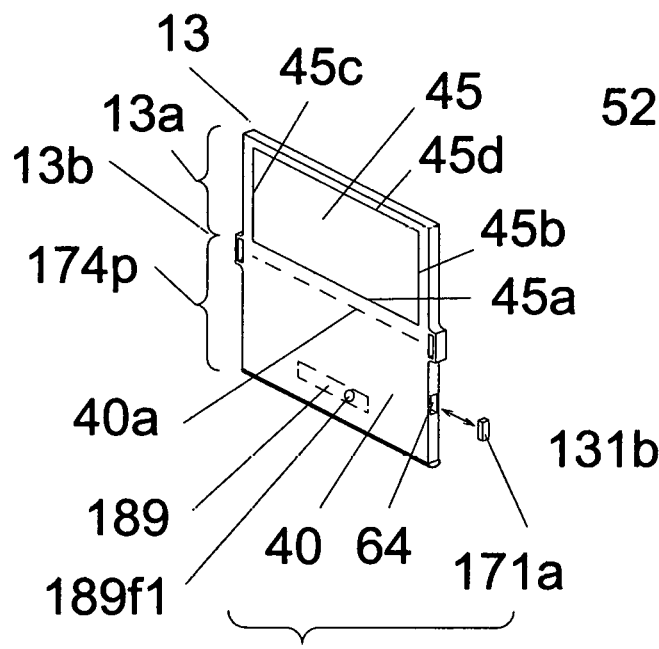
FIG. 28A This is the front side of a wearable propping display apparatus including an operator body prop fixed to the display panel.
Figure 28B:
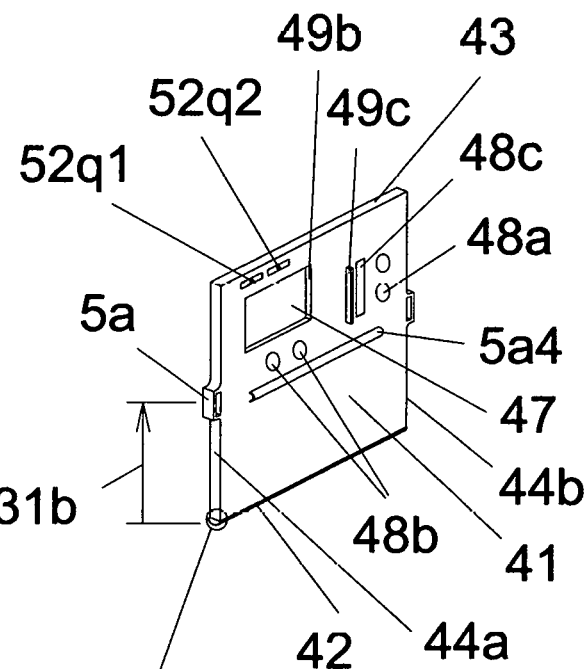
FIG. 28B This is the back side of a wearable propping display apparatus of FIG. 28A.
Figure 28C:
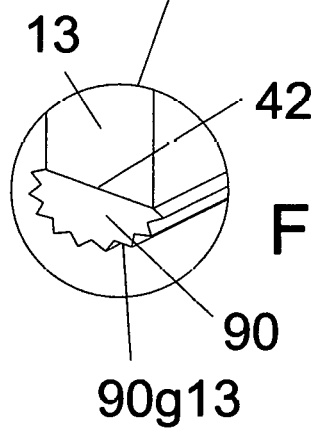
FIG. 28C This is a magnification of the bottom edge of the operator body prop showing one possible type of operator body interface.

The wearable apparatus is shown in FIG. 28A front view, FIG. 28B back view and FIG. 28C a magnified view of the proximal edge area. Shown in FIG. 28A, the wearable propping display apparatus is comprised of a single display panel 13 having a front side 40 which may be divided into a display portion 13$a$, including the display 45, and an operator body prop portion 174$p$, the two portions meeting and fixing together at a junction 13$b$. The display may have a right side border 45$b$, a left side border 45$c$, a bottom border 45$a$ and a top border 45$d$. The display panel length is the sum of the lengths of the display portion and operator body prop portion (13$a$+174$p$) as shown with the braces. Shown as a dashed rectangle is a rechargeable battery 189 which may be found inside the display panel and may be positioned for recharging with a wireless electromagnetic battery recharging device. Associated with the battery may be wireless electromagnetic battery recharging device receiver 189/1 configured to receive an electromagnetic field from a separate wireless electromagnetic battery recharging device transmitter and convert this field into an electric charge and current capable of recharging the display panel's battery. The apparatus may include a computing unit and may be capable of operating without wireless communication.

As an alternative to or in addition to wireless communication and recharging, the wearable apparatus may include an electrical connection 64, shown here as (but not limited to) a socket, for recharging and programming from an external electricity source. This electrical connection may be configured to be waterproof using, for example, a waterproof seal 171$a$ such as (but not limited to) a waterproof plug or cap.

FIG. 27B shows that the side opposite the front side is the back side 41 which may include one or more manual controls. This control may be or include a pointing device 47 and one or more pointing device clicker button 48$a$, a scrolling slide 48$c$, one or more display magnification and/or demagnification buttons 48$b$.

The controls may be recessed controls 49$b$ for guiding fingers to a control or may have raised finger guides 49$c$ for finding controls with the operators fingers on the back side of the display panel. The display panel and the equipment on it may be waterproof so it may be cleaned, for example, by submerging in water or washing in a dish washing machine. Controls on the display panel back side offer the advantages of not touching and smudging the display and better simulating the operation of the mouse and display cursor pointing device arrangement found on desktop computers.

The display panel may have side edges, for example a right side edge 44$a$ and a left side edge 44$b$ (seen reversed from front view), and may include one or more suspension device attachments 5$a$ on the display panel, on the side edges or back side 5$a$4, for example.

The suspension device attachment may be located on the display panel in a distal direction 131$b$ from the display panel proximal edge (see 90, FIG. 28C). The suspension device attachment may be located on the display panel about mid-way 40$a$ (dashed line in FIG. 28A) between the distal edge 43 and the proximal edge 42 of the display panel or near the junction 13$b$ of the display portion the operator body prop portion of the display panel. The suspension device attachment may attach to the display panel right side edge and left side edges. Optionally, the suspension device attachment may be attached to the display panel back side so the suspension device may be a line or loop of line leading around the right and left display panel side edges. In another alternative, the suspension device attachment may be attached to the center of the front side of the operator body prop portion of the display panel. (see 5$a$3, FIG. 30) (see FIGS. 1, 56, and 33 for comments about the location of suspension device attachment).

Shown in FIG. 28C, a magnification of the circled area of FIG. 28B, the proximal edge 42 of the display panel 13 may include a display panel bottom operator body interface 90 adapted to temporarily hold the display panel proximal edge to the operator. Examples of this interface may include (but not limited to) a friction enhancing feature or gripping surface 90$g$13, a lateral stability member, one or more legs or shaping, as previously described. The operator body interface may be removably attached to the display panel and positioned near the proximal edge (see FIG. 12F and FIG. 62). Other examples of this interface may include operator linking attachments such as (but not limited to) a bar or hole, hook, clip, "D" ring, strap, snap, magnet or other means to temporarily join the proximal edge to the operator's body (for other examples, see FIG. 27A to 27E, FIGS. 12A to 12F and 13A to 13F). The display panel may Include an operator body prop length adjuster to increase display panel length and better position the display in the operator's view.

Figure 29:
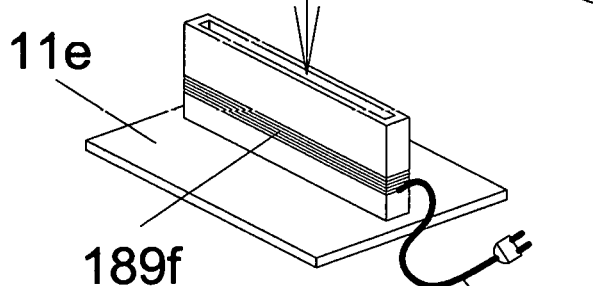
FIG. 29 This is a holder to stand the wearable propping display apparatus of FIG. 28A on a table. It may include a wireless charger for the apparatus.

FIG. 29 shows a storage holder and stand for the wearable propping display apparatus of FIG. 28A to 28C. Because this apparatus may be used in wet or dirty environments, compete sealing (waterproofing or water resisting) of the display panel is an advantage. The use of a wireless communication transmitter and/or receiver eliminates the need for a data transfer electrical connection. Further, the need for a battery recharge electrical connection on the wearable propping display apparatus may be eliminated by recharging the battery using a wireless electromagnetic battery recharging device transmitter 189$f$ adapted to create a magnetic field capable of charging the battery (see FIG. 28A) while it is inside the apparatus and the apparatus is positioned inside the storage holder 11$d$ which is designed to fit and charge the apparatus (arrow shows one of many possible directions of entry of the apparatus of FIG. 28A into the holder). The storage holder may be attached to a storage stand 11$e$ for convenient use of the battery recharge device. Thus adapted, the apparatus may have no openings for water or extraneous material to enter the display panel. The wireless electromagnetic battery recharging device transmitter may receive its power from an electrical connection 64v to an external power source. The wearable propping display apparatus together with the matching recharging stand may form a system aimed at waterproof and wearable computer use in a dirty environment.

Shown in FIG. 30, the front side of the display panel may include structures to protect the display 45 such as (but not limited to) one or more thumb guards 49a near the display right side border and/or near the display left side border of the display to keep dirty thumbs or fingers from smearing the display and reducing its visibility. The display panel may include a display top border spacer 43a (near the top border of the display) and/or a display bottom border spacer 43b (near a bottom border of the display) to hold the display away from the operator's front body stomach/chest surface area when the display panel front side is pressed toward the operator's body when the display is not in use and the apparatus is in a temporary storage position (see FIG. 31B and FIG. 31C) because the operator wants to maximize his view of the work area (e.g. a counter) in front of him. The various guards and spacers around the display may join to form a continuous border protecting the display. The guards, along with the display, may define the display portion of the display panel.

The proximal edge of the display panel may include an operator body interface 90 which may be in the form of shaping 90k to better contact an operator's body and resist sliding or tipping. The operator body interface may include (but not limited to) one or more legs 90j (one shown but a leg or rod to each of the two sides would be more normal), a friction enhancing feature, projections 90g7 and/or may include other types of display panel proximal edge tipping stabilizing or sliding stabilizing operator body interfaces such as one or more operator linking attachments 90a3 to attach to an incidental attachment or purposefully matching attachment on the operator. The operator body interface includes width to form a lateral stability member and laterally separated surfaces to resist tipping in a lateral (right/left) direction but is relatively thin in a front to back (profile) direction to form a lateral pivot axis that allows adjustment of the display in a direction toward or away from the operator's face.

The operator body interface may include one or more friction enhancing features such as a gripping surface 90g13 or materials that enhance the friction between the apparatus and the operator such as materials that stick (such as (but not limited to) or example, some sticky materials, elastomeric materials, sandpaper-like or abrasive coated materials), patterns that stick (such as (but not limited to) knurling, knobs, ridges, ribs, lugs, a grid and the like), rubber, rubber projections or rigid projections. Shaping, legs or rods may be especially good at resisting lateral (right left) tipping and sliding. Shaping may be in a concave way (see FIGS. 12B and 12E) to help fit the operator body interface to the operator's front body surface and facilitate the contact of the friction enhancing feature to the operator. One or more suspension device attachments 5a may be located on the display panel right side edge, left side edge, on the back side or front side so as to locate the suspension device near the right and left side edges of the display panel. Alternatively, the suspension device attachment may be located about half way between the right edge and left edge on the front side of the operator body prop portion for a center point suspension device attachment 5a3.

An operator 73 (wearer) is shown using the wearable propping display apparatus in side views FIG. 31A, 31B and FIG. 31C and front views FIG. 32A and FIG. 32B.

FIG. 31A shows that, in an operating position, the display panel 13 is worn using a suspension device 5 suspending the display panel from the operator's head/neck/shoulder area. The suspension device suspends the display panel while the display panel's proximal edge and operator body interface 90 contacts and temporarily adhere to the operator's body front stomach/chest area and push the display away from the operator's body and into his view. The operator body prop portion extends to the display portion and pushes the display panel into an operating position with the display in the view of the operator. The display panel 13 is in operating position with the display 45 in the view 183 of the operator and the operator body interface of the display panel against his front stomach/chest area. The distance between the operator's face and the display panel may be adjusted by pivoting in a toward/away direction because the operator body interface may be adapted (i.e. relatively thin in a front to back (profile) direction) to form a lateral pivot axis 90z. His view is not blocked by any guard or spacer (e.g. top border spacer 43a).

In FIG. 31B and magnified in FIG. 31C, the operator has moved the display panel 13 to a temporary storage position against his front stomach/chest surface area 73c to increase his vision in his work space in front of him. A guard or spacer (for example, top border spacer 43a) keeps the display from touching the operator's body or apparel and prevents the display 45 from being obscured by smudging. The operator body interface 90 is in contact with the operator's body and can be seen to be thin 174x2 (arrows show thin profile) in a front to back (profile) direction relative to the operator body interface width to allow pivoting adjustment of the display in a direction toward or away from the operator's face (a lateral pivot axis). In other cases, the operator body interface may include a lateral pivot axis formed by (but not limited to) a corner of a box-like prop (see FIG. 63B) or may be flexibly (see bag FIG. 27A to 27E) or may be pivotally attached (see 90y2, FIG. 13B) to the operator body prop to allow pivoting of the prop and display panel in a toward/away direction from the operator's face. In the temporary storage position the apparatus is suspended by the suspension device 5.

In front view FIG. 32A the operator 73 is using the display panel 13 in operating position. The suspension device 5 is suspending the display panel in an operating position. In FIG. 32B the apparatus is removed showing that the operator 73 may wear apparel 73a, such as (but not limited to) an apron, coveralls, shirt or smock, specifically to match the operator body interface. In this case, the apparel is an apron with one or more attachable objects 901, such as (but not limited to) a hook, a pocket, a loop or a button, intended to match the operator linking attachment (e.g. 90a3) of the display panel's operator body interface.

The operator of the wearable propping display apparatus may want to have the operator body prop longer and/or adjustable in length to meet the viewing requirements of different positions or situations the operator may be in. These situations may include sitting, standing, semi-reclining, reclining, or wanting the display to be at a higher or lower viewing angle or wanting the display nearer or farther from the operator's face. The operator may want to position the operator body prop for easier typing, for example, when a removable add-on electrical device (e.g. keyboard) is attached to the prop.

To address these operator requirements, an operator body prop length adjuster may be included as a part of the apparatus. An operator body prop length adjuster is a type of or optional component of the operator body interface and is meant to further supplement the interface's characteristics by controllably pushing the display panel further from the operator's body front and repositioning the display panel. In some case the operator body prop length adjuster may include other operator body interface stability components (for example, to providing tipping stability and/or sliding stability). Other cases the operator body prop length adjuster may simply extend the existing operator body interface farther from the operator body prop bottom end and acting to lengthen the operator body prop.

The operator body prop length adjuster (174s) attaches to the operator body prop and may be (but not limited to) an adjustment panel (174s4) or an adjustment rod (174s3) such as (but not limited to) a rod, a bar, a leg, a pole, a rod-like or bar-like tube or pipe or other columnar structure capable of extending the length of the operator body prop.

The operator body prop length adjuster may be held to the operator body prop using an operator body prop length adjuster holder (174r) which, in various forms, may be indicated by (but not limited to) 174r2 (box-like), 174r3 (guides), 174r5 (tube-like) or 174r6 (pivoting holder). The operator body prop length adjuster holder is a part of the operator body prop and may be molded into or be a part of the operator body prop and may include other operator body prop parts such as one or more suspension device attachments.

Shown in FIG. 33A is a wearable propping display apparatus 200 including a display panel 13 pivotally attached to a prop panel operator body prop 174p so that the two panels can fold in a book-like fashion onto each other for storage (see FIG. 1 and FIG. 3). The operator body prop includes a top end 174z next to and pivotally attached to the display panel, and an opposite bottom end 174x. Attached to the operator body prop and positioned near the operator body prop bottom end 174x is an operator body interface which, in this case, includes shaping and a friction enhancing feature 90g including projections, possibly made of a rigid and/or flexible and/or friction enhancing (elastomeric) material. The apparatus includes one or more suspension device attachments 5a and/or suspension device 5 for the purpose of suspending the apparatus from the operator's upper body. The attachment of the suspension device to the display panel or to the operator body prop may be in the central attachment zone 144a1 near the junction of the display panel and operator body prop. Shown in the figure, the suspension device attachment 5a may be attached to the operator body prop length adjuster holder 174r.

This figure shows the apparatus including one or more operator body prop length adjusters 174s which may be held to the operator body prop (prop panel) with one or more operator body prop length adjuster holders 174r. The operator body prop length adjuster may be (but not limited to) leg-like, rod-like, panel-like or bracket-like or may be a combination of several of these forms. The operator body prop length adjuster holder may be (but not limited to) a tube, guides, rings, tracks, box-like for sliding extension or may be (but not limited to) a pivoting point, flexible fabric, axis, axle, bearing or hinge where the length adjuster may be held and pivoted from a retracted position to an operating position for use. In this figure, the operator body prop length adjusters are adjustment rods and designed to slide with an up/down motion 131a into or out of the holder parts which are tube-like. The operator body prop length adjuster (shown as adjustment rods) contact end 174s2 may be shaped or capped or include a leg end feature 90j2 to add sliding stability and resist sliding on the operator's body. The operator body prop length adjuster may be attached to the operator body prop using operator body prop length adjuster holder 174r which may be located on the operator body prop right side edge and on the operator body prop left side edge to widen the operator body interface formed by the two laterally separated surfaces contactable with the operator. The holders may be used as handles. The length adjuster holder may be located elsewhere on the operator body prop such as the bottom edge, back side or front side. This figure shows the operator body prop length adjuster in an extended position and ready for use.

The operator body prop length adjuster 174s and the operator body prop length adjuster holders 174r may include interacting stopping/locking mechanism parts which may include (but not limited to) friction, matching ratcheting, matching screw threads, matching ridges and/or notches, matching buttons and/or holes (181a on the length adjuster holder and 181b on the length adjuster) or other feature to hold the operator body prop in a desired relative position in order to prop the display panel in an operating position or to retract the props. The operator body prop length adjuster holder may include an add-on electrical device prop attachment feature 89h adapted to hold an add-on electrical device to the apparatus.

FIG. 33B shows an operator body prop parallel plane 45f oriented to be parallel to the plane of the operator body prop as shown in FIG. 33A. This is the plane of up/down sliding movement 131a that the operator body prop length adjuster in FIG. 33A uses relative to the operator body prop in moving between a retracted position and an extended position. Other types of sliding length adjusters (for example, a prop panel (FIG. 38A)) may use this same plane of movement for extension from the retracted position to the extended position. In the case that the operator body prop is two prop rods, the parallel plane is formed by the two prop rods, the lateral pivot axis formed by their ends and the plane formed between them.

The operator body prop length adjuster may be used with an operator body prop comprised of prop rods. Shown in FIG. 34 is a wearable propping display apparatus with a display panel 13 including two operator body prop holders 174r10 (tube-like). The operator body props 174pr also serve as operator body prop length adjuster holders for the two (right and left) operator body prop length adjusters 174s3 (adjustment rods). Both the operator body props and the length adjusters retract (store) with an upward motion and extend (deploy) with a downward motion (up/down motion 131a). Whether the operator body prop rods are fixed or movable, the operator body prop length adjuster can help to position the display panel in the best location for operator viewing. In this case, the two operator body props and/or two operator body prop length adjuster form a width and serve also as the operator body interface 90, a lateral stability member with two laterally separated surfaces to stabilize the apparatus in a lateral direction (right/left—both tipping and sliding). The leg bottom ends may be shaped or may include one or more leg end features to resist sliding in any direction on the operator's front body surface area. Also shown in this figure is the display panel 45, a portion of the suspension device 5 and a suspension device attachment 5a. This figure shows the operator body prop length adjuster in an extended position and ready for use.

FIG. 35 shows the apparatus of FIG. 34 with display panel removed and the operator body prop holder, operator body prop and length adjuster separated from one another. They fit each other for operation in a "telescoping" manner. The operator body prop holder 174*r*10 is, in this case, tube-like and sized to accommodate the operator body prop inside. The operator body prop doubles as a length adjuster holder part 174*pr*. It is also tube-like in this figure with an outside diameter fitting the operator body prop holder and an inside diameter fitting the operator body prop length adjuster 174*s*3 (adjustment rods). The contact end 174*s*2 of the operator body prop length adjuster (i.e. the part furthest from the display panel) may include or be an operator body interface stability component and be configured to temporarily adhere to the operator's body front and may include shaping or a leg end feature 90*j*2, such as (but not limited to) a comfortable friction enhancing rubber cup or a removable operator body interface. For sliding retraction and extension, alternative sliding guide-like, ring-like, band-like, pocket-like or other arrangements to slidingly hold the operator body prop length adjuster (adjustment rods) may be envisioned.

Comparing FIG. 33A to FIG. 35, the pivoting operator body prop panel (174*p*) in FIG. 33A is replaced by the tube-like operator body prop rod (174*r*10) of FIGS. 34 and 35.

Figure 36A:
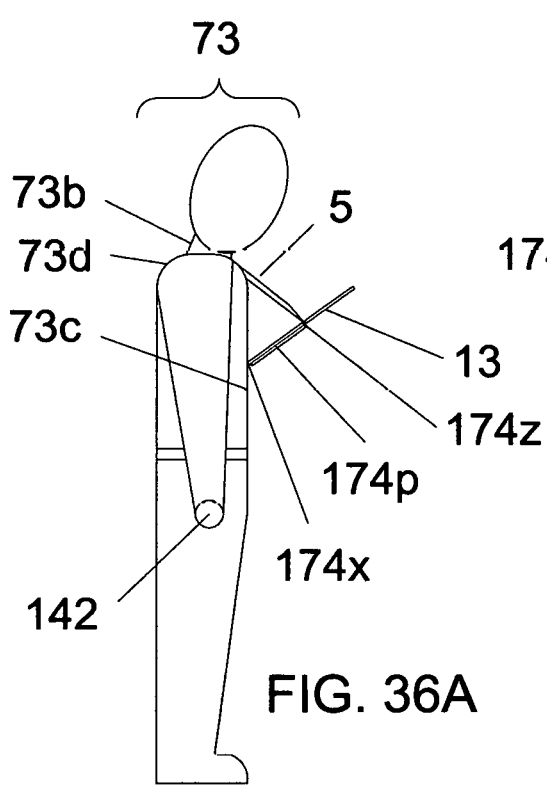
FIG. 36A This shows a profile view of an operator wearing the apparatus of FIG. 33 with the operator body prop length adjuster retracted in the operator body prop length adjuster holder and in a retracted position.
Figure 36B:
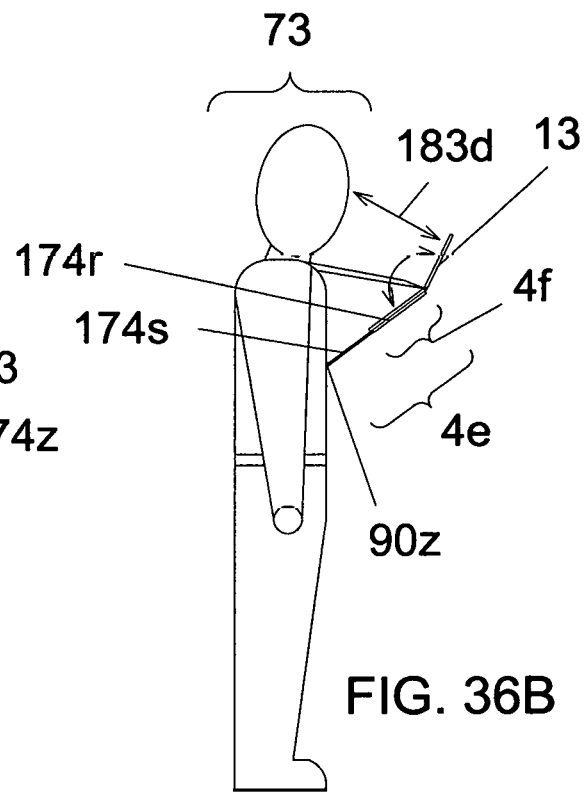
FIG. 36B This shows a profile view of an operator wearing the apparatus of FIG. 33 with the operator body prop length adjuster deployed in an operating position.

FIG. 36A and FIG. 36B show an operator (apparatus wearer) wearing and using the wearable propping display apparatus. In FIG. 36A, the operator 73 (wearer) is shown in profile with the apparatus of FIG. 33 in an operating position with the operator body prop 174*p* bottom end 174*x* (with operator body interface) pushing against the operator's front stomach/chest surface area 73*c*. The display panel 13 is pivotally attached to the operator body prop's top end 174*z*. The suspension device 5 suspends the apparatus from the operator's neck 73*b* and/or shoulder 73*d* area. The operator body prop includes an operator body prop length adjuster that is retracted into the operator body prop length adjuster holder. The display is in the view of the operator without him using his hands 142.

In FIG. 36B, the operator 73 is again holding the apparatus of FIG. 33 in an operating position. The operator body prop length adjuster 174*s* is extended from the operator body prop length adjuster holder 174*r* for use. The contact ends of the length adjusters (two adjustment rods) form an operator body interface adapted to resist lateral tipping and sliding in any direction because of the interface's lateral stability member width and interface friction enhancing quality. The operator body interface formed by the contact ends of the length adjusters also forms a lateral pivot axis 90*z* for adjusting the distance between the operator's face and the display panel. The length of the operator body prop has been effectively increased from a length adjuster retracted for storage length 4*f* to a length adjuster extended for use length 4*e*. The display on the display panel 13 is positioned higher and in a more comfortable operator's view 183*d* (line of sight) of the operator.

Figure 37A:
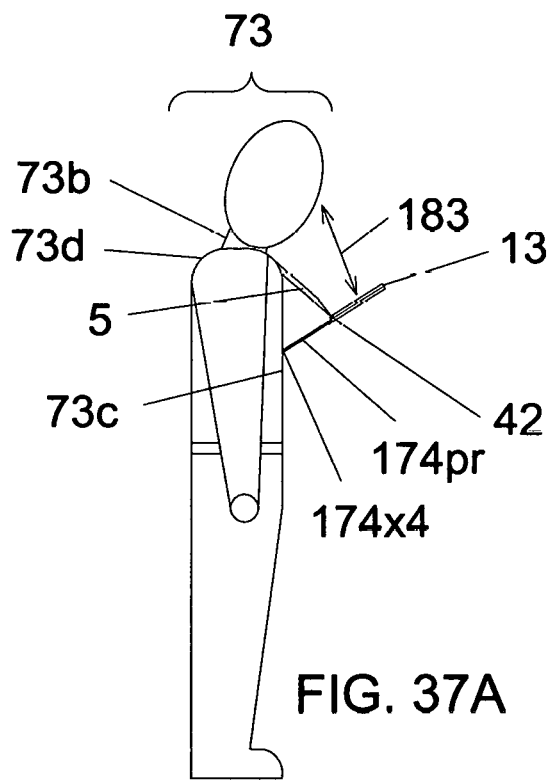
FIG. 37A This shows a profile view of an operator wearing the apparatus of FIG. 34 with the operator body prop length adjuster retracted in the operator body prop length adjuster holder and in a retracted position.
Figure 37B:
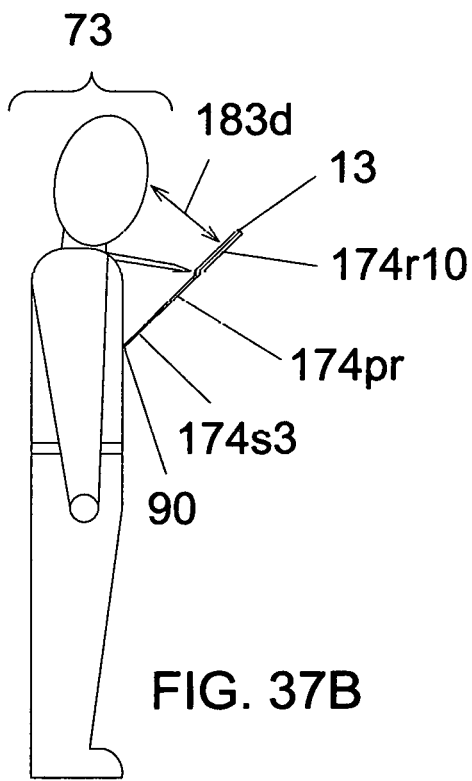
FIG. 37B This shows a profile view of an operator wearing the apparatus of FIG. 34 with the operator body prop length adjuster deployed in an operating position.

FIG. 37A and FIG. 37B show an operator (apparatus wearer) wearing and using the wearable propping display apparatus. In FIG. 37A the operator 73 (wearer) is shown in profile with the apparatus of FIG. 34 in an operating position with the operator body prop 174*pr* (prop rods) including bottom ends 174*x*4 (forming the equivalent of an operator body interface) deployed and pushing against the operator's front stomach/chest surface area 73*c*. The display panel 13 includes a proximal edge 42 and is attached to the operator body prop using operator body prop holders. The suspension device 5 suspends the apparatus from the operator's neck 73*b* and/or shoulder 73*d* area and adjusts and stabilizes the apparatus in a tipping direction toward or away from the operator's face. The operator body props include operator body prop length adjusters but they are retracted into or alongside the body operator props (e.g. prop rod tubes). The display is in the view 183 (line of sight) of the operator without him using his hands.

In FIG. 37B, the operator 73 is again holding the apparatus of FIG. 34 in an operating position. The operator body props 174*pr* (rod like tubes in this case) are deployed out of their storage position places in the operator body prop holder 174*r*10 (tube-like) attached to the right and left sides of the display panel. Further, the operator body prop length adjusters 174*s*3 (adjustment rod) are extended from their retracted position in the operator body props 174*pr* and into their extended position for use. The two operator body prop length adjuster form an operator body interface 90 contacting the operator and suitable for stabilizing the apparatus against tipping to the right and left and against sliding in any direction. The display on the display panel 13 is positioned higher and in a more comfortable operator's view 183*d* (line of sight) in the view of the operator. (Compare the line of sight view and head angle of the operator in FIG. 37A versus FIG. 37B).

In FIG. 38A the wearable propping display apparatus 200 includes an operator body prop length adjuster 174*s* shown extended from the operator body prop length adjuster holder 174*r* and in an extended position ready for use. In FIG. 38 to FIG. 41, the operator body prop length adjuster is an adjustment panel and slidingly retractable into the length adjuster holder (an operator body prop component) may be (but not limited to) guides or a box-like structure with a bottom end opening for the length adjuster to slidingly retract or extend from near the operator body prop bottom end. In this figure the operator body prop length adjuster is shown as a panel including legs 90*j* shaped into the panel. The panel legs are shown including an operator linking attachment 90*a*3 for attaching the apparatus to the operator if desired.

In this figure, the purpose of the operator body prop length adjuster (an operator body interface component) is to use the operator body interface to adjust the operator body prop 174*p* length 4*g* (indicated by solid lines and arrows) to/from an extended position length 4*h* (indicated by dashed lines and arrows) to better position the display 45 in the view of the operator. In this figure, there is an operator body interface 90 attached to the operator body prop and positioned near its bottom end.

FIG. 38B shows that the operator body interface may be a supplementary or removable operator body interface 90*y*1 which may include a removable interface attachment 89*j* which may be suited to removably hold the interface to an operator body prop (for example, but not limited to, a prop panel or prop rod) or an operator body prop length adjuster (for example, but not limited to, an adjustment panel or adjustment rod). This supplementary or removable operator body interface is shown with a removable interface attachment removably attachable to the operator body prop length adjuster contact end of FIG. 38A or FIG. 39.

FIG. 39 shows the apparatus of FIG. 38 (without legs shaped into the panel) exploded into separate pieces (the operator body interface sliding stability components have been moved to the operator body prop length adjuster). The operator body prop length adjuster 174*s*4, in this case an adjustment panel, is a separate and movable part slidably attached to the operator body prop 174*p* using an operator body prop length adjuster holder 174*r*2 that is (in this figure) box-like with a bottom end opening 174*r*4 for the length adjuster to slidingly extend or retract with an up/down motion. The length adjuster holder may include one or more suspension device attachments 5*a*8. In this figure, the operator body interface 90 stability component is now located on the length adjuster, also a part of the operator body interface (instead of directly to the operator body prop). The operator body interface may include stability components, features and/or shaping where it contacts the operator's body (for example near the length adjuster contact end 174s2) and this shaping may include (but not limited to) concave 90k2 shaping and the features may include friction enhancing features such as (but not limited to) projecting bumps or points 90g6. The operator body prop may include a bottom end 174x and an opposite top end attached to the display panel 13 (proximal edge) by pivoting (pivoting holder hinge 54 shown), sliding or other attachment.

FIG. 40 shows an alternative operator body prop length adjuster holder 174r3 (two guides positioned, for example, near the operator body prop right and left side edges and substituting for the box-like structure in FIG. 39) where the holder is one or more guides to guide the sliding operator body prop length adjuster in an up/down motion into and out of the retracted position. These guides may be used in conjunction with length adjuster mounted suspension device attachment 5a9 shown (see FIG. 39) as lanyard tubes attached to the back side of the length adjuster. The guides leave the length adjuster mounted suspension device attachment exposed for connecting the suspension device. The suspension device attachments along with suspension device may slide with an up/down motion along the length adjuster holder guides 174r3 between a retracted position and an extended position. Alternatively, the length adjuster holder guides may be adapted to hold an adjustment rod with one or more length adjuster mounted suspension device attachments exposed for connecting the suspension device.

FIG. 41 is the assembled apparatus of FIG. 39. The operator body prop length adjuster 174s4 (adjustment panel) is in the retracted position but the operator body interface 90 (in the form of tipping stability and sliding stability components attached to the length adjuster adjustment panel contact end) is designed to remain outside the length adjuster holder 174r2 (*box*). As a result, there may be one operator body interface available for operator use whether the operator body prop length adjuster is extended or retracted. The operator body interface is attached to the operator body prop and positioned near the operator body prop bottom edge; the operator body interface may be or include an operator body prop length adjuster. The tipping stability and sliding stability components may be attached to the operator body prop or to the operator body prop length adjuster. The length adjuster holder (shown as box-like but any type of length adjuster holder is applicable) is shown including one or more suspension device attachments 5a8.

FIGS. 42A, 42B, 42C, 43A, 436 and 43C show details of the parts and operation of an operator body prop length adjuster 174s attached to a bag so that the bag length can be extended for better viewing in the vertical operating position. In this situation, the bag 1 is a substitute for the operator body prop, elsewhere indicated by 174p.

Shown in FIG. 42A, partially disassembled, the bag 1 (also the operator body prop) includes or is configured to hold a display panel 13 in a vertical operating position 182c (shown in this figure) (the back side of the display panel is visible in this figure, the display is on the display panel front side opposite the back side) at the top end area (see 3c, FIG. 42B) of the bag so that an operator 73 may view the display panel's display from in back of the bag and looking forward (back to front) 183a over the top end area of the bag. The bag may have a front wall 2 with a bottom wall 147, a right side (wall) 4b and a left side (wall) 4c connecting the front wall to a back wall (see 148, FIG. 26B and FIG. 44B). The bag includes one or more (two in this case) operator body prop length adjusters 174s which may be held to the bag using one or more operator body prop length adjuster holders 174r. In this figure, the operator body prop length adjusters are straight adjustment rods and are shown separated from the operator body prop length adjuster holders which are tube-like but may alternatively be guides of another sort such as (but not limited to) tracks, rings, fabric pockets, sleeves, or other holders configured to slidably hold the one or more length adjusters to the bag. The length adjuster holders may be attached to the bag near the bag's back wall so that they are on the part of the bag closest to the operator's body when in the vertical operating position (for example, near the junction of the bottom wall and the back wall) and they may be rigid to serve as stiffening members to maintain a bag shape suitable for propping. The holders may be attached to the right side 4b and left side 4c of the bag to increase the width of the operator body interface 90 lateral stability member formed by the operator body prop length adjuster adjustment rods and to increase lateral tipping stability in a vertical operating position by resisting lateral tipping of the apparatus. The length adjuster holders may be located in the interior of the bag so that nothing protrudes from the normal shape of the bag. The operator body prop length adjuster may include a stop/lock mechanism which may include friction, ratchet, matching screw threads, matching ridges and/or notches, matching buttons and/or holes or other feature to hold the operator body prop length adjuster in the desired position (amount of extension) relative to the bag bottom end area. The length adjuster may include a length adjuster lock 181b designed to match a complimentary length adjuster holder lock 181a on the length adjuster holder and hold the length adjuster in place relative to the length adjuster holder.

FIG. 42B shows the parts of the bag 1 of FIG. 42A assembled and in an operating position (the display panel 13 is in a vertical operating position) and the operator body prop length adjuster in an extended position. The bag 1 is a container with walls and including an interior and may be made primarily of light to heavy cloth but may include rigid components. The operator body prop length adjuster and display panel are attached to the bag. The operator body prop length adjuster 174s is extended and increases the length of the bag (operator body prop). The operator body prop length adjuster may be slidably moved into or out of (extended or retracted) the operator body prop length adjuster holder 174r with an up/down motion 131a. Also shown is an optional supplementary or removable operator body interface, in this case a contact band 90t, which may include friction enhancing features 90g such as (but not limited to) projections which may be made of rigid material or flexible or elastomeric material or other stability components or features previously described (see FIGS. 12B to 12F and 13A to 13F). The contact band may be removable and may be a supplementary or removable operator body interface as may be used for any type of operator body prop or operator body prop length adjuster to adapt the interface to the operator's needs (see FIGS. 13F, 61 and 62). It can be seen in FIGS. 42A, 42B and 42C that the bag bottom end area includes its own operator body interface, in this case including at least shaping and a friction enhancing feature 90g (projections).

FIG. 42C shows the bag 1 with the operator body prop length adjuster 174s slid into a retracted position in the operator body prop length adjuster holder 174r. The bottom end area 147a of the bag is clear to use for propping without using the operator body prop length adjuster.

FIG. 43A shows the bag 1 (also operator body prop) with the display panel 13 deployed from its sliding holder on the bag and in a vertical operating position. The bag is positioned so that the bottom end area, bottom wall 147 and front wall 2 are visible. The operator body prop length adjuster 174s and length adjuster holder 174r are separated from the bag. The operator body prop length adjuster is part of the operator body interface and the length adjuster holder is part of the operator body prop (the bag). In this figure the length adjuster is a panel which may include stability components near its contact end 174s2. The display panel may be removable (see FIGS. 27A and 27B) using complimentary attachments. The operator body prop length adjuster may be held to the bag using one or more operator body prop length adjuster holders. In this case, there is a single operator body prop length adjuster (an adjustment panel) held to the bag with a box-like operator body prop length adjuster holder including a length adjuster holder opening 174r4 at its bottom for slidably extending or retracting the operator body prop length adjuster into the length adjuster holder. The length adjuster holder may be attached to the outside surface or inside surface of the bag's back wall. The length adjuster holder may be located in the interior of the bag so that nothing protrudes from the normal shape of the bag. The length adjuster holder may be comprised of guides of another sort such as (but not limited to) tracks, rings, fabric pockets, or other holders configured to slidably hold the operator body prop length adjuster to the bag. The operator body prop length adjuster may include a stop/lock mechanism which may include (but not limited to) friction, ratchet, matching screw threads, matching ridges and/or notches, matching buttons and/or holes, straps, bands or other feature to hold the operator body prop length adjuster in the desired position relative to the bag bottom end area. The length adjuster may include a length adjuster lock 181b designed to match a complimentary length adjuster holder lock 181a on the length adjuster holder and hold the operator body prop length adjuster in place relative to the length adjuster holder. In FIGS. 43A, 43B and 43C the display panel is configured to deploy and store to and from the vertical operating position with a sliding up/down motion 131a into a display panel holder 11 attached to the bag.

In FIG. 43B the components of FIG. 43A are assembled and the operator body prop length adjuster 174s is attached to the bag using the operator body prop length adjuster holder 174r and in an extended position and extending (increasing) the length of the bag 1. In this figure, the operator body prop length adjuster includes a contact band 90t, including one or more tipping stability and/or sliding stability components such as a friction enhancement features 90g, attached along the contact end of the adjustment panel and this may be used to stabilize the bag whether the length adjuster is in an extended position (FIG. 43B) or in a retracted position (FIG. 43C). In this figure the display panel 13 (back side visible) is about half slid (stored) into its holder on the bag.

In FIG. 43C, the operator body prop length adjuster 174s4 (adjustment panel) is slidably retracted into the operator body prop length adjuster holder 174r and in a retracted position on the bag 1. The operator body interface 90 (including the contact band or length adjuster contact ends) may include stability components such as (but not limited to) a friction enhancing feature which may include shaping, surfaces, materials or projections which may be rigid or made of flexible or rubber-like (elastomeric) material. The operator body interface may include an operator linking attachment and/or may include a lateral stability member with laterally separated surfaces. In this figure the display panel has been completely slid (stored) into its holder and is not visible.

FIG. 44A shows a display panel 13 in a vertical operating position on a bag 1 positioned so that the bottom end area, right side wall, bottom wall 147, front walls 2 and the junction of the back wall and bottom wall 148e are visible. In this case, the operator body prop length adjuster is a pivoting bracket-like structure comprised of two connected adjustment rods pivotally attached to the bag. The operator body prop length adjuster 174s is in a retracted position. The operator body prop length adjuster holder 174r, in this case, is one or more pivot attachments (right side and left side in this figure) attached to the bag and holding one or more length adjuster proximal ends 174s5 so the length adjuster can pivotally extend from a retracted position (shown in this figure) to an extended position. The operator body prop length adjuster may be adapted in shape or features to make it include an operator body interface stability component.

In FIG. 44B, the operator body prop length adjuster of FIG. 44A has been pivoted into an extended position extending (increasing) the length of the bag (operator body prop). It can be seen here that the length adjuster is comprised of two adjustment rods 174s3 (right side and left side) pivotally attached to the bag and attached to each other with a contact band 90t connecting them near their contact ends 174s2. The operator body prop length adjuster holder 174r6 (a pivoting holder) may include a stop/lock to hold the length adjuster in place. The stop/lock mechanism 181a may include (but not limited to) friction, ratchet, clamp, abutment or other feature to hold the operator body prop length adjuster in the desired position relative to the bag's 1 bottom end area. The operator body prop length adjuster may include a friction enhancing feature stability component such as a gripping surface 90g13 or an operator linking attachment. The bottom wall of the bag has been removed in this figure to show the inside of the bag including a back wall 148 (inside surface), an inside surface 85 of one of the several bag walls (in this case the left side wall 4c) and a bag stiffening member 1a (for example, a stiffening rod) installed inside the bag. The stiffening member may also serve as an operator body prop length adjuster holder (for example, sliding holder). The stiffening member may also serve as a lateral stability member (for example, as a rigid back wall) or as a component of a lateral stability member (for example, stiffening rods forming or supporting laterally separated surfaces).

FIG. 45 is a side (profile) view of an operator 73 (wearer) of a bag 1 with a display panel 13 in a vertical operating position mounted to the top end area of the bag and viewable looking from the back side of the bag forward (back wall 148f to front wall 2) and over the top end area 3c of the bag while the operator body interface 90 stability component on the contact end (see 174s2, FIG. 46) of the operator body prop length adjuster 174s (extended) presses against and provides traction against the operator's front stomach/chest surface area 73c and the suspension device 5 suspends the bag and display panel from the operator's neck area 73b and/or shoulder area. The operator may view 183 the display on the display panel and may adjust the distance of this view in a direction toward or away from the operator's face by adjusting the length of the suspension device and pivoting the apparatus on the operator body interface (lateral pivot axis) touching his body. The operator body prop length adjuster may adjusts the length of the bag from its normal length 4f to its extended (increased) length 4e. It can be seen that, in this case, the bag back wall may be a rigid back wall 148f.

Alternatively, the operator body interface may include one or more operator linking attachments (see 90a3 FIG. 47) designed to attach to some intentional or incidental feature on the operator's body or clothes.

A pivoting operator body prop length adjuster may be used with a display panel attached to a prop panel operator body prop instead of a bag. FIG. 46 shows that an operator body prop length adjuster with a pivoting motion 139g may be attached to and used with a prop panel operator body prop 174p that is attached to a display panel 13, also with a pivoting motion 139g. To show the pivoting extension movement of the operator body prop length adjuster, this figure shows three images of it; near retracted position (dashed lines); moving into extended position (dashed lines) and; in extended position (solid lines). The wearable propping display apparatus in this figure is essentially the same as the apparatus of FIG. 1 but with the operator body prop length adjuster added. The operator body prop length adjuster is in the form of an adjustment panel 174s4 pivotally attached near the bottom end of the operator body prop using a pivoting length adjuster holder 174r6. The contact end 174s2 of the operator body prop length adjuster may include an operator body interface 90 stability component, in this case a concave shaped friction material to compliment the operator's front body surface area. The operator body prop length adjuster may include a length adjuster mounted suspension device attachment 5a9 to hold a suspension device to a pivoting length adjuster and suspend the apparatus.

FIG. 47 shows a pivoting 139g operator body prop length adjuster attached to and used with an operator body prop 174p that is slidably 131a deployable from a display panel 13. The wearable propping display apparatus in this figure is essentially the same as the apparatus of FIG. 16 but with the pivoting operator body prop length adjuster added. The operator body prop length adjuster is in the form of two adjustment rods 174s3 which may be fashioned into or combined with a wire or plastic frame, bracket, band or other structure pivotally attached near the bottom end of the operator body prop with a pivoting operator body prop length adjuster holder 174r6. The contact ends of the operator body prop length adjuster adjustment rods may include an operator body interface stability component such as (but not limited to) a contact band 90t connecting the two adjustment rods, a friction enhancing feature such as a gripping surface 90g13 and/or one or more operator linking attachments 90a3 designed to attach to some intentional or incidental feature on the operator's body or clothes. To show the pivoting extension movement of the operator body prop length adjuster this figure shows three images of it; near retracted position (dashed lines); moving into extended position (dashed lines) and; in extended position (solid lines).

Another way to reposition the display panel while in an operating position is to change the length of the operator body prop within its length or at its top end. FIG. 48 shows another embodiment of the wearable propping display apparatus with display panel, operator body prop. It shows the disassembled parts of an example where the operator body prop 174p includes an operator body prop length expansion mechanism. The operator body prop length expansion mechanism may be comprised of an operator body prop length expander 174s6 and an operator body prop length expander holder 174r12. The operator body prop length expansion mechanism is a part of the operator body prop and may be located anywhere on or in the operator body prop, shown in this figure adjustably extending the top end 174z of the operator body prop 174p to the display panel 13. Extension between portions of the operator body prop or from the bottom end of the operator body prop is also possible.

In FIG. 48, shown on the left side of the apparatus, the length expander holder 174r12 may be attached to the operator body prop 174p and the length expander 174s6 is attached to and extends downward from the display panel (possibly attached to the display panel proximal edge 42, back side or side edges). In this figure the length expander slidably extends or retracts to/from the length expander holder.

To show an alternative placement of the operator body prop length expansion mechanism parts, the right side of the apparatus shows the length expander holder 174r12 attached to the display panel and the length expander 174s6 attached to and extending upward from the operator body prop. The length expander 174s6 may retract and store in the length expander holder 174r12, in this case using (but not limited to) an up/down sliding motion for extension/retraction. Equipment for other modes of extension/retraction is possible (for example, pivoting) and described elsewhere in this application. The operator body prop includes an operator body interface 90, in this a case a blade shaped for the operator's body. This figure also shows that the display panel includes a display 45 and that the suspension device attachment 5a may be attached to the operator body prop length expander and/or to the operator body prop length expander holder. The operator body prop includes a top end 174z closest to the display panel.

FIG. 49 shows the parts of FIG. 48 assembled and with the operator body prop length expansion mechanism 174q1 in an extended position using a sliding motion 131a. The operator body prop length expansion mechanism 174q1, including one or more length expansion mechanism length expanders 174s6 and length expansion mechanism length expander holders 174r12, expands the length of the operator body prop. In this case, the length expansion mechanism also connects the operator body prop 174p to the display panel 13. The length of the operator body prop may be adjusted (expanded/extended/increased) from a mechanism retracted length 4g (indicated by solid line arrows) to or back from a mechanism extended for use length 4h (indicated by dashed line arrows). The bottom end of the operator body prop includes an operator body interface, in this case shaping to compliment the operator's body and a serrated elastomeric blade 90g4. This figure shows that one or more suspension device attachment 5a10 (for expansion mechanism) may be attached to the length expansion mechanism of the operator body prop, either to the length expander or to the length expander holder.

The purpose of the length expansion mechanism is to adjust the operator body prop length between a mechanism retracted length and a mechanism extended for use length to adjust the operating position of the apparatus and display for better viewing by the operator.

Also shown in FIG. 49, the operator body prop length expansion mechanism may be adapted to pivotally attach to the display panel to the operator body prop using, for example, a hinge 54d so that the display panel may pivot on an angle 110d with an axis parallel to the display panel proximal edge and operator body prop top end. This adaption may be located on the length expanders or on the length expander holders or on both. This figure shows an example with the pivoting adaptation between the length expanders and the display panel.

FIG. 50 shows the apparatus of FIG. 48 and FIG. 49 with the operator body prop length expansion mechanism in a retracted position. The length expansion mechanism length expander holders 174*r*12 is attached to the operator body prop 174*p*. The length expansion mechanism length expanders 174*s*6 (barely visible) are attached to the display panel 13 (proximal edge) and retracted inside the holder part. In this figure, the suspension device attachment 5*a* is shown attached to expander holder part and the operator body prop. The operator body prop includes a bottom end 174*x*.

FIG. 51 shows the display panel 13 and operator body prop 174*p* attached together with the display panel proximal edge attached to the operator body prop top end. The display panel and operator body prop may be fixed or fused together, may be removable attached or may be pivotally attached using a hinge 54 (operator body prop pivoting holder). In this figure, the operator body prop includes one or more suspension device attachments 5*a*. The operator body prop (e.g. its bottom end 174*x*) may also include one or more bottom edge attachments 174*j*2 (for example, but not limited to, sockets in this case) meant to match and attach to removable extension attachments 174*j*3 (for example, but not limited to, pins in this case) found on a removable operator body prop length adjuster 174*s*. The operator body prop length adjuster and the removable extension attachments, in this situation, may alternatively be seen as a type of supplementary or removable operator body interface and removable interface attachment (see 90*y*1 and 89*j*, FIG. 12F). In this figure, one or more operator body interface stability components may be included on the operator body prop length adjuster contact end 174*s*2 and may be comprised of (but not limited to) a friction enhancing rubber blade 90*g*4 and/or points 90*g*6*a*.

As previously described, the wearable propping display apparatus includes a suspension device or suspension device attachments. FIG. 52 shows an example of the wearable propping display apparatus where the display panel 13 is pivotally attached to the operator body prop 174*p*. It shows that one or more suspension device attachments (generally 5*a* or adjustable types 5*i*1 and 5*i*2) may be located on either the display panel or the operator body prop. The suspension device attachment may alternatively be located on the back side (see FIG. 64C), side edges or, on some cases, the front side (see FIG. 30) of the display panel or prop. When an operator body prop length adjuster and/or adjuster holder is included, the suspension device attachment may be located on the holder (see FIG. 33A) or on the adjuster (see FIG. 39). One or more adjustable types of suspension device attachments may be used to adjust the length of the suspension device and the toward/away viewing distance between the display and the operator's face. The length of the suspension device may be defined as the distance from the apparatus to or around the operator's body (neck) and back to the apparatus. Thus, shortening the suspension device length using an adjustable suspension device attachment may bring the display closer to the operator's face and leave some excess line or belt hanging free while the line or belt itself may remain the same length.

The suspension device type and locations may vary and the various alternatives may be mixed and are not limited to the specific arrangements cited below.

The suspension device may be a section of line, filament or strap including a right end, a left end and a middle section between the ends. The right and left ends may attach, respectively, to the right and left side edges of either the display panel or operator body prop. The middle section between the ends is intended to extend to or around the operator's neck and/or shoulder area. For this purpose, the apparatus may include two suspension device attachments, one located on the display panel or operator body prop right side edge and the other located on the display panel or operator body prop left side edge. The right side edge and left side edge suspension device attachment location may alternatively be used with other suspension device arrangements (see below).

The suspension device may be a suspension device loop (see 5*s*, FIG. 19A) made of line, filament or strap and intended to pass around the back of the operator's neck (and/or shoulder) and around the back of the display panel or back of the operator body prop. In this case, the suspension device attachments may, alternatively, be one or more attachments located on the back side of the display panel or back side operator body prop (see 5*a*4, 5*a*5, FIG. 64C).

The suspension device attachment may be a tubular suspension device attachment 5*a*6 (FIG. 56) extending to near the right side edge and to near the left side edge of the display panel or operator body prop and intended to hold a section of the suspension device loop inside the tube. The tube may be located on the back side, front side or be included in (for example, but not limited to, molded into) either the operator body prop or display panel. A tubular suspension device attachment may be used with a suspension device loop.

The suspension device attachment may be located near the junction of the display panel and the operator body prop (see 13*b*, FIG. 1). This location provides good suspension support for the apparatus in the operating position, allows the display panel to move freely while in the operating position and assures that the apparatus hangs closed and straight against the operator's body front when in the storage position with the suspension device around the operator's neck.

The suspension device attachment may be located in the right central attachment zone (see 144*a*1, FIG. 56) and the left central attachment zone 144*a*2, these zones found near right and left side edges of the display panel and operator body prop and near the junction of the display panel and operator body prop. The suspension device attachment may be located near the display panel distal edge.

The suspension device attachment may be a single center point attachment (see 5*a*3, FIG. 30) located near the front side center (half way between the right side edge and the left side edge) of the operator body prop.

FIG. 53A shows that the suspension device may be a length of strap or length of belt 5*d* made of flexible material. The length of belt may include a feature to adjust its length, as common found on many straps or belts (see 5*r*, FIG. 19A). Alternatively or additionally, a suspension device attachment attached to the apparatus may be adapted to adjust the length of the strap or belt (see 5*i*1, FIG. 54). The suspension device strap or line may be in the form of a loop intended to pass in back of the operator's neck (or shoulder) and in back of the apparatus and holding the apparatus to the operator (see 5*s*, FIG. 19A).

FIG. 53B shows a suspension device may be a rigid "U" shaped neck piece 5*e* made of rigid material such as (but not limited to) rigid wire or plastic so that the suspension device may take a compression load as well and a tensile load. In this way, the distance between the operator's face and the display may be maintained and the display panel will not fall on his face even if the operator is in a prone position with the display panel leaning toward him. This suspension device may include a neck cross piece 5*f* crossing from a suspension device right cross piece attachment 5*f*1 to a suspension device left cross piece attachment 5*fp* to secure the suspension device to the operator's neck. The rigid suspension device may include one or more (probably two) hinges 54*g* to compensate for the angle between the apparatus and the operator. In this figure, one hinge is made of two movably linked rings.

FIG. 53C shows that the suspension device may be made of a length of line, cord or filament 5*c* made of flexible material. The line may include a feature to adjust its length, as common found on many lines. Alternatively or additionally, a suspension device attachment found on the apparatus may be adapted to adjust the length of the line (see FIG. 55, 5*i*2).

FIG. 54 shows a magnified view of an adjustable suspension device 5*i*1 attached to the apparatus and adapted for use with a belt (as in FIG. 53A). It has two moving parts which jam the belt between. Teeth may be includes. Other adjustable belt attachments are available.

FIG. 55 shows a magnified view of an adjustable suspension device 5*i*2 attached to the apparatus and adapted for use with a line (as in FIG. 53C). It has a body including an opening 5*h* for the line to pass through and a spring mounted piston 5*g* which pinches the line when the piston is not pressed. Other adjustable line attachments are available.

FIG. 56 shows the wearable propping display apparatus with a display panel 13 including a display panel proximal edge 42 and an operator body prop 174*p* including an operator body prop bottom end 174*x* and an operator body prop top end 174*z*. The display panel proximal edge and the operator body prop top end may be fixedly connected, may be pivotally connected with a hinge 54, may be slidably connected or may be connected in some other way or combination.

The suspension device attaches to the display panel or operator body prop. It may be attached directly or may be attached using a suspension device attachment. Described below, the place of attachment of the suspension device is synonymous with suspension device attachment 5*a*. In a lateral direction (right/left), one or more suspension device attachments may be located on the right side edge and the left side edge of either the display panel or the operator body prop (see FIGS. 1 and 2). Additionally or alternatively one or more suspension device attachments may be located on the back side of the display panel or operator body prop (see FIG. 64C) and designed to direct the suspension device around the right side edge and left side edge of the display panel or operator body prop. The suspension device attachment may alternatively be located on the front of the operator body prop (see FIG. 30).

In a vertical direction (up/down) one or more suspension device attachments 5*a* are located in a distal direction 131*b* from the operator body prop bottom end. The amount of the distance 131*c* in the distal direction is not fixed theoretically. However, the load on the suspension device (and operator neck) decreases as the distal distance increases. But attaching the suspension device attachments to the display panel at an increased distal distance from the bottom end tends to fold closed the display panel if the display panel and prop are pivotally attached and tends to interfere with holding the display panel and operating display panel back controls and can interfere with operator side vision. Overall, the optimal suspension device attachment location is somewhere in a central attachment zone 144*a*1 (the right central attachment zone is shown in this figure) near the right and left side edges of the display panel and operator body prop and near the junction of the display panel proximal edge and the operator body prop top end.

Figure 57:
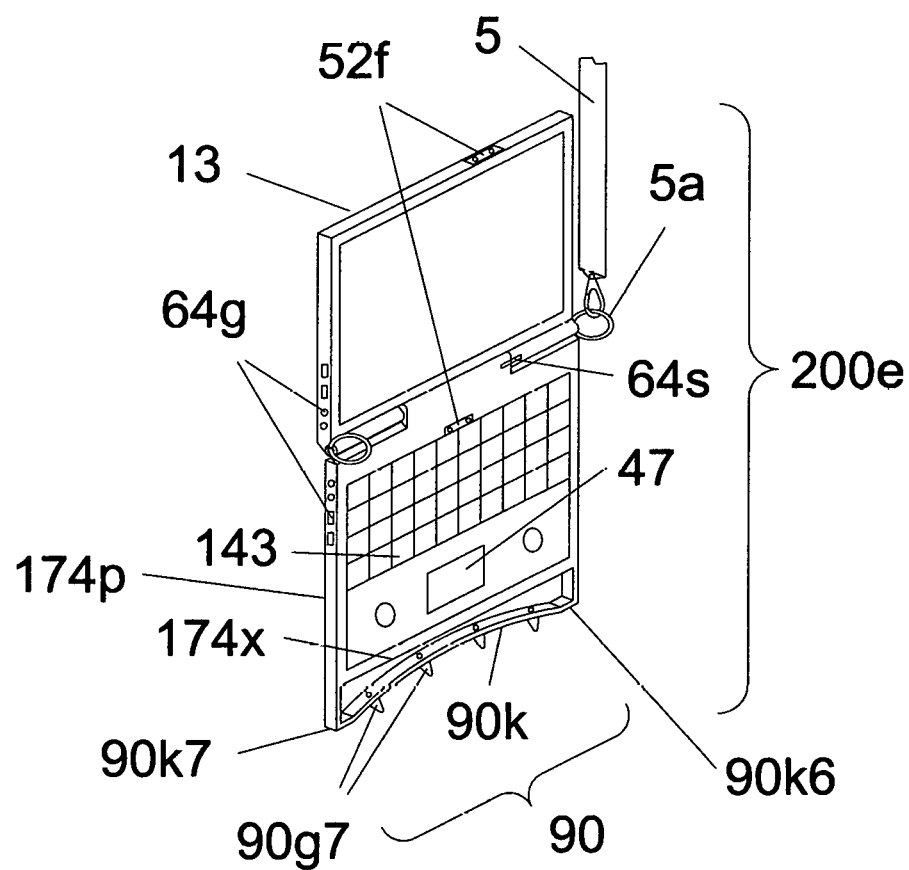
FIG. 57 This figure shows that the wearable propping display apparatus may be a portable computer.

FIG. 57 shows that the wearable propping display apparatus may include computer equipment and be a computer 200*e*. The display panel 13 and/or operator body prop 174*p* may include computing equipment and this may include (but not limited to) computing unit, memory, battery, sound equipment, compact disc or DVD player, electromagnetic radiation telecommunication wireless communication 52*f* equipment (transmitter and/or receiver here shown as a combined unit), cellular radiotelephone, input/output equipment such as keyboard 143, manual controls such as (but not limited to) a pointing device 47 and/or other features commonly found on computers. Electrical equipment on the operator body prop may be electrically connected to the display panel's electrical equipment with an electrical connection 64*s*, for example, through the hinge or hinge area. Other provisions for electrical connections 64*g*, for example, but not limited to, electrical sockets, may be included on either the display panel or operator body prop for connection of external computer peripherals such as (but not limited to) recharging, sound input/output, equipment with Universal Serial Bus (USB) connection, or other devices. This computer may include an operator body interface 90 including stability component and/or features which may provide tipping stability and/or slipping stability. These features may include (but not limited to) shaping 90*k*, lateral stability member, right laterally separated surface 90*k*6, left laterally separated surface 90*k*7 or one or more friction enhancing features such as projections 90*g*7 (made of, for example, flexible rubber-like (elastomeric) or rigid material). The operator body interface may be designed to enhance the friction between the computer and the operator to help the computer bottom end 174*x* cling to the operator front body stomach/chest surface area without attachments while the operator body prop pushed the display panel away from the operator's body into the operator view while the suspension device 5 and suspension device attachments 5*a* suspend the operator body prop and display panel from the operator's body (e.g. neck or shoulder area) so the wearer can comfortably view the display without holding it in his hands. An operator body interface using one or more operator linking attachments is a possible alternative (see FIGS. 13C and 13D).

The wearable propping display apparatus may be configured to wirelessly receive, transmit and/or control remote images, sound and data to and from a variety of external telecommunication sources (for example 52*h*, 52*o*, 52*p*, 52*j*, 52*m*, 52*e*, 200*b*, 200*d*). The external telecommunication source may be (but not limited to) local computers or computer equipment, communication connection housing, public telecommunications network, radiotelephone, cellular radiotelephone network, television broadcasts, satellite communications or broadcasts, wirelessly (radio) linked cable (land line) communications or wireless (radio) linked internet. The external telecommunication source may be an information exchanger and both send and receive information to and from the wearable propping display apparatus.

Communication between the wearable propping display apparatus and the external telecommunication source may be directly by electromagnetic radiation between the apparatus and the external telecommunication source. Alternatively, a communication connection housing may intermediate these communications by connecting the wireless wearable propping display apparatus electromagnetic radiation communications the housing receives to and from the variety of external telecommunication sources.

FIG. 58A and FIG. 58B show a schematic representation of the wearable propping display apparatus 200 shown here as a wireless remote controller and display for one or more separate computers 200*b* and 200*d* (two different types of computers shown) using local (for example, (but not limited to) wireless personal area network (WPAN) and/or wireless local area network (WLAN)) electromagnetic wave communication. The wearable propping display apparatus includes a display panel 13, an operator body prop 174*p* and suspension device attachment 5*a* for wearable attachment to the operator. As a communication example, the wearable propping display apparatus may wirelessly (electromagnetic radiation) receive sound and video images from a separate computer and wirelessly (electromagnetic radiation) transmit back to the computer control information generated from one or more manual controls on the wearable propping display apparatus (e.g. on the display panel display (touch screen) or back side) such as (but not limited to) graphical user interface, user interface, slides, buttons, touch pads, touch screens, keyboards or function buttons. The control information may manage the external telecommunication source (e.g. the computer) and influence its further transmissions to the wearable propping display apparatus.

The wireless communication by the wearable propping display apparatus may be done by one or more (electromagnetic radiation) first transmitters and/or first receivers 52*f* (see also 52*q*1 and 52*q*2, FIG. 1) located on the wearable propping display apparatus (here shown located on the display panel 13 but may be on the operator body prop).

The wearable propping display apparatus may wirelessly communicate directly via electromagnetic radiation with external telecommunication sources. One or more electromagnetic radiation first transmitters (52*q*1, FIG. 1) may wirelessly transmit information, including control information, to one or more wireless electromagnetic radiation second receivers 52*g*2 (FIG. 586) located on an external telecommunication source, such as (but not limited to) the communication connection housing 52*e* or a separate computer 200*b*. In this figure, the wireless first transmitter's electromagnetic radiation signal 53*i*2 (for example, (but not limited to) frequencies assigned to wireless personal area network (WPAN) and/or wireless local area network (WLAN)) (including control information) from the apparatus to an external telecommunication source is indicated by a thunderbolt arm pointing toward the external telecommunication source. This thunderbolt arm also represents the electromagnetic radiation signal received by the external telecommunication source (second receiver).

One or more electromagnetic radiation first receivers (52*q*2, FIG. 1) may wirelessly receive information, including video and/or sound information, from one or more wireless electromagnetic radiation second transmitter 52*g*1 (FIG. 58B) located on an external telecommunication source, such as (but not limited to) the communication connection housing 52*e* or a separate computer 200*b*. In this figure, the wireless first receiver's electromagnetic radiation signal 53*i*1 (for example, (but not limited to) frequencies assigned to wireless personal area network (WPAN) and/or wireless local area network (WLAN)) (including video and/or sound information) from an external telecommunication source to the apparatus is indicated by a thunderbolt arm pointing toward the apparatus. This thunderbolt arm also represents the electromagnetic radiation signal transmitted by the external telecommunication source (second transmitter).

Alternatively, the one or more first transmitter and/or first receiver 52*f* may transmit/receive electromagnetic radiation to one or more second transmitter and/or second receiver 52*g*1/52*g*2 (FIG. 58B) located in a communication connection housing 52*e* with the information, from there, further electrically connected to one or more further external telecommunication sources, in this case a separate computer 200*b*, using one or more electrical connections, for example (but not limited to) an electrical wire 68, to one or more electrical connections 64*g* (e.g. sockets)(FIG. 58B) on the external telecommunication source (for example, a separate computer 200*b*). In addition to wireless transmission/reception equipment to communicate with the wearable propping display apparatus, the communication connection housing 52*e* may include one or more computers 200*d*, a electronic reception and routing electronics units 52*i* (see FIG. 60), a power supply 64*v* and one or more wire or wireless electrical connections to the variety external telecommunication sources. The reception and routing electronics unit 52*i* (see FIG. 60) may receive information from and/or transmit information to one or more external telecommunication sources and route (i.e. electrically connect) that information to/from one or more wearable propping display apparatus units. The reception and routing electronics unit may include or work with a computer 200*d* to do this and may conduct routing according to operator originated control information.

For the purpose of serving more than one wearable propping display apparatus or external telecommunication sources, the computer equipment 200*d* and/or reception and routing electronics unit 52*i* (see FIG. 60) may include routing electronics or time sharing software recognizing and serving the various wire or wireless inputs/outputs and connecting them as needed or specified by the operator. Alternatively, the communication connection housing may include more than one computer or a computer with multiprocessor capability for the purpose of recognizing and serving the various inputs and outputs. One or more reception and routing electronics unit may serve or assist in serving this purpose.

The transmitters and/or receivers may be removable with, for example, the one or more removable transmitter and/or receiver 52*d* fitting an electrical connection 64*g*, for example a Universal Serial Bus (USB) connection, socket or plug, on the wearable propping display apparatus. These removable transmitters and/or receivers match and communicate with one or more transmitters and/or receivers on the external telecommunication source 200*b* (e.g. separate computer) or on a communication connection housing 52*e*. The transmitters and/or receivers on the external telecommunication source or on the communication connection housing may be removable transmitters and/or receivers 52*c* with, for example, the removable transmitter and/or receiver fitting an electrical connection 64*g*, for example a Universal Serial Bus (USB) connection, on the external telecommunication source or the communication connection housing.

FIG. 58B is a magnification of the circled area of FIG. 58A and shows details of the removable transmitters and/or receivers 52*c* which may be connected to an external telecommunication source (the separate computer) using an electrical connection. 64*g*. The figure also shows details of transmitters and/or receivers 52*c* which may be removably connected to the communication connection housing using an electrical connection 64*g* for further connection to an external telecommunication source (separate computer) via (for example) a wire 68 and the external telecommunication source's electrical connection 64*g*. This figure also shows that the one or more second transmitters and/or second receivers 52*g* may be fixed to the external telecommunication source or that one or more second transmitters 52*g*1 and/or second receivers 52*g*2 may be fixed to the communication connection housing.

The wearable propping display apparatus along with its wireless transmission and reception equipment for linking to external telecommunication sources using electromagnetic radiation represents a system aimed at inexpensively facilitating operator communication with external telecommunication sources (computer, internet, etc.) and the easy movement of the operator in a variety of operator positions as the operator uses the wearable propping display apparatus.

FIG. 59 shows that the operator body prop 174p may be pivotally attached to the display panel 13 using a hinge 54 designed to pivot to an angle 110d of more than 270 degrees (to about 290 degrees or more) to become a table stand for the wearable propping display apparatus so it can be, alternatively, mounted on a table or counter with the display panel 13 in an approximately upright position and the display 45 visible. Also show is a section of the suspension device 5.

FIG. 60 shows a schematic representation of the wearable propping display apparatus 200 and communication system. It elaborates on the equipment in FIGS. 58A and 58B. In this figure the wearable propping display apparatus is configured to wirelessly receive distant images and/or sound from and transmit control information to a variety of electromagnetic radiation external telecommunication sources.

For example, cellular radiotelephone communication may be connected to the apparatus using wireless electromagnetic radiation signal 53i6 between a first transmitter and/or first receiver on the apparatus to/from the cellular telephone network 52p (tower).

The apparatus may include standard commercial television reception electronics 52k configured to receive wireless electromagnetic radiation signal 53i3 (indicated by thunderbolt arm pointing toward the apparatus) of video and sound from a television broadcaster 52h (tower) (for example, standard commercial television broadcasts (normally defined as electromagnetic radiation between 54 MHz and 806 MHz)) as well as from satellite or closed circuit broadcasts. Alternatively, the television wireless video and sound broadcasts may be first received by a standard television 52j which may be electrically connected 68 to a communication connection housing 52e, which may include a computer and/or a reception and routing electronics unit 52i, and again wirelessly transmitted by electromagnetic radiation signal 53i (indicated by thunderbolt) generated by a second transmitter 52g on the housing to be received by a first receiver 52f (and/or first receiver) on the wearable propping display apparatus.

A communication connection housing 52e, which may include a computer and/or a reception and routing electronics unit 52i, may intermediate the wire or wireless receipt or transmission of information from more distant external telecommunication sources by first preparing it for wireless exchange with the wearable propping display apparatus.

Examples of wire 68 connected external telecommunication sources may include (but not limited to) a public telecommunication network 52m, cable broadcasts, internet connection, local TV, local area networks, personal area network, computer equipment or peripherals and/or other equipment that may communicate wirelessly with other external telecommunication sources.

Examples of wireless connected external telecommunication sources, connected to the housing using one or more electromagnetic radiation third transmitters and/or electromagnetic radiation third receivers 52h1 on the housing, may include (but not limited to) electromagnetic wave communication equipment 52h (e.g. television or radio broadcasts), satellite 52o, wireless radiotelephone and/or local wireless equipment.

These wire and/or wireless connections to the communication connection housing 52e (and/or reception and routing electronics unit 52i and/or computer) may be connected wirelessly via the housing's second transmitter and/or second receiver 52g to a first transmitter and/or first receiver 52f on the wearable propping display apparatus.

The wearable propping display apparatus may remotely command reception and transmission parameters with the operator's manual control (e.g. front or back side display panel manual controls) generated control information signals being communicated via the transmitters and/or receivers 52f and 52g with the communication connection housing 52e and its equipment.

Also shown in this figure is the display panel 13 including a sound volume control 155b and wireless receiver and/or transmitter or television control frequency channel selector 52l, the operator body prop 174p, the suspension device attachment 5a and a transmission on/off privacy switch 132 (for example, on the housing) to stop/start transmissions from the communication connection housing. The wearable propping display apparatus may directly receive or transmit wireless transmission to/from various generic transmitters and/or receivers.

Figure 61A:
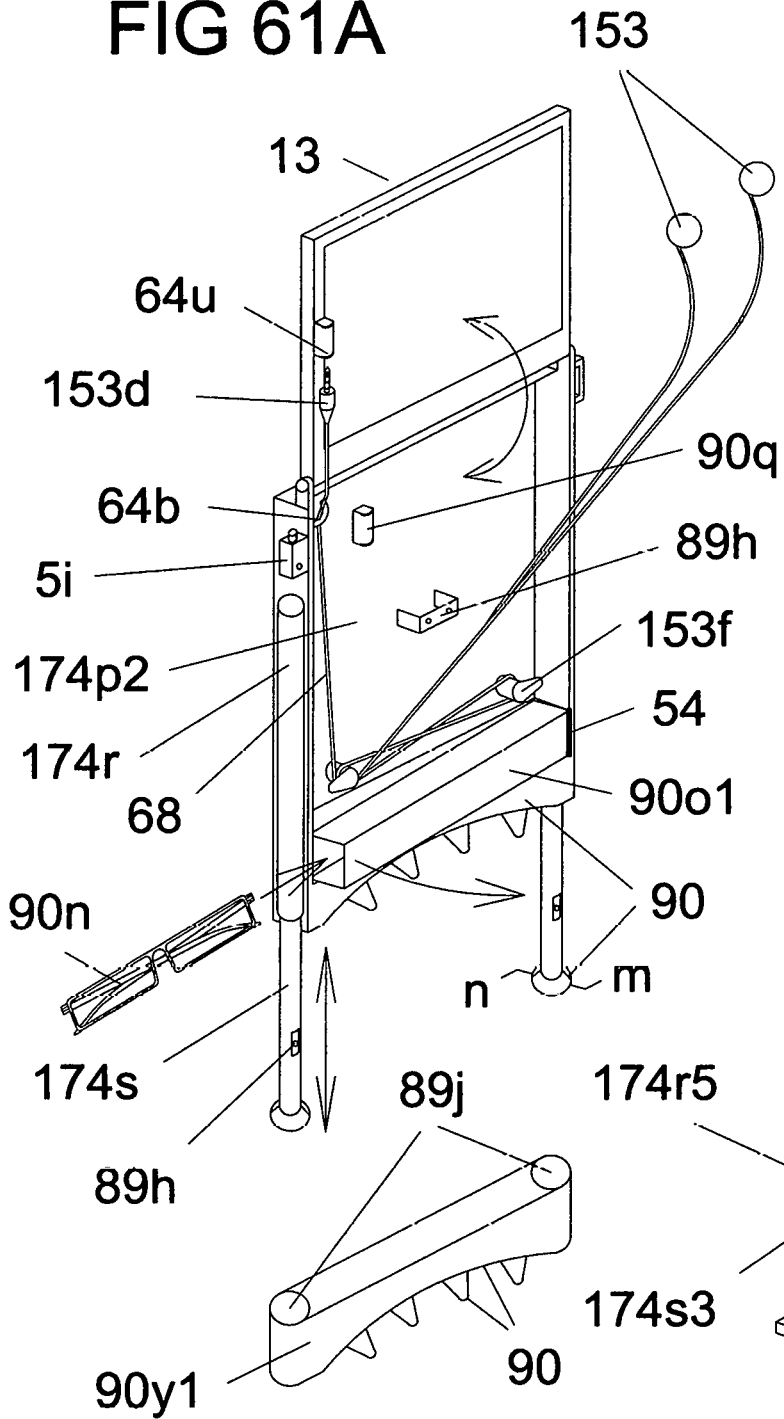
FIG. 61A This is a wearable propping display apparatus including accessories such as earphone wire storage device and eyeglass holder.

FIG. 61A shows the wearable propping display apparatus with the display panel and operator body prop (prop panel) pivotally attached and pivoted into an open operating position and including additional optional components. The operator body prop 174p2 (prop panel) may be or include one or more container-like parts, holders, brackets or other structures to hold or enclose accessories. This accessory holder may be (but not limited to) an eyeglass holder 90o1 to hold eyeglasses 90n or an eyeglass container (e.g. tube). The accessory holder may be pivotally attached to the operator body prop using a hinge 54 (pivot axis) and this may be made of a thin section of plastic material. The display panel 13 may include an electrical connection for sound 64u meant to connect with a sound connection 153d attached to a wire 68 leading to the sound input/output device 153 (e.g. speaker, earphone or microphone). To store the sound wire and to assure it does not bind between, be damaged by or inhibit the movement of the display panel and operator body prop, a fairlead 64b may be included on the display panel and/or operator body prop and positioned to assure the wire is not damaged and does not interfere with the movement of the display panel and operator body prop. The excess sound wire may be wound on a sound wire storage device 153f (a type of accessory holder) such as (but not limited to) one or more winding posts, pair of cleats, reel or other device to compactly store the wire. The operator body prop may include one or more add-on electrical device prop attachment feature 89h and/or one or more simulated sound sockets 90q to hold a sound wire plug when not in use. The body operator prop may include one or more body operator interfaces 90. The body operator prop may be further supplied with one or more operator body prop length adjusters 174s which may be held to the operator body prop by one or more operator body prop length adjuster holders 174r. In this figure, there are two operator body prop length adjusters (adjustment rods) extending or retracting (shown in the extended position) with a sliding motion into its length adjuster holder and each having an operator body interface 90 stability components. The operator body prop length adjuster may include one or more add-on electrical device prop attachment feature 89h for attaching an add-on electrical device. The suspension device attachments may be adjustable suspension device attachments 5i.

Figure 61B:
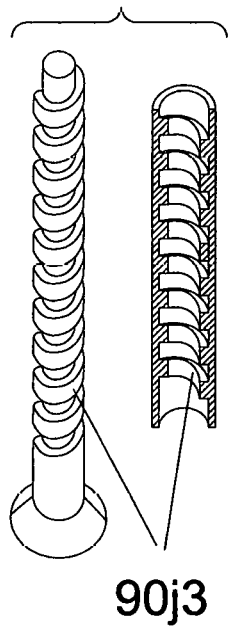
FIG. 61B This shows an enlarged view of the operator body prop length adjuster (rod or leg) and the operator body prop length adjuster holder (tube) shown in FIG. 61A but including screw threads to provide up/down extension/retraction sliding movement.

FIG. 61B shows (enlarged) the operator body prop length adjuster (left) of FIG. 61A (separated from the operator body prop and holder) and the matching operator body prop length adjuster holder (right) shown in cross section at m/n of FIG. 61A. It can be seen that either of these components may include one or more screw thread features 90j3 capable of generating (by twisting) the up/down extension and retraction motion required by a sliding operator body prop length adjuster. The screw thread feature may be screw threads or a feature, for example, but not limited to, a knob, a ridge, a notch, teeth or screw threads, to match screw threads. Length adjustment screw thread feature may alternatively be used with operator body prop (for example, a prop rod) and operator body prop holder (for example holder tube) to produce the sliding up/down motion for deployment and storage.

Figures 62, 63:
FIG. 62 This is a removable operator body prop interface.
FIG. 63 This is the wearable propping display apparatus of FIG. 60 (half size) with an operator body interface attached to the operator body prop length adjuster contact end.

FIG. 62 shows that the operator body prop bottom end or the operator body prop length adjuster contact end may be fitted with a supplementary or removable operator body interface 90y1 made to adapt and stabilize the operator body prop length adjuster on the operator's body. The supplementary or removable operator body interface may include operator body interface 90 stability components and/or features for friction enhancement, lateral tipping stability, sliding stability, comfort or attachment as described elsewhere in this application. The supplementary or removable operator body interface of this figure includes a removable interface attachment 89j suitable for attachment to the operator body prop length adjuster (contact ends) of the apparatus shown in FIG. 61A (two cylindrical holes to fit the length adjuster contact ends). The supplementary or removable operator body interface may be used with either an operator body prop length adjuster or an operator body prop (see FIG. 12F).

FIG. 63 shows a wearable propping display apparatus very similar to FIG. 61A but in half scale. In this figure, the operator body interface tipping stability and sliding stability components are attached to the operator body prop length adjuster 174s3 (adjustment rods) contact ends instead of to the bottom end of the operator body prop. Stability components, such as a lateral stability member, operator linking attachment or a friction enhancing feature 90g (see also FIGS. 12B to 12F and 13B to 13F), may be part of a contact band 90t connecting the adjustment rods. The operator body prop length adjuster (and the contact band) may be seen as part of (component of) the operator body interface. The length adjuster slidably retracts into the operator body prop length adjuster holder 174r5 (tube-like) a part of the operator body prop. The figure also shows a sound wire storage device 153a (unspecific type).

FIG. 64A shows the wearable propping display apparatus 200. This apparatus is comprised of a display panel 13 pivotally attached to an operator body prop 174p using an operator body prop pivoting holder 174r11 (hinge at pivot point between the display panel and operator body prop) and shown in this figure in an open operating position. The operator body prop serves to both prop the display panel in an operating position and to protect (cover) the display while the display and prop are in a closed storage position (FIG. 64B). The display panel includes an electronic display 45 on the display panel front side and may include further electronics (e.g. computer, display driver or transceiver) to drive the display. The operator body prop may include an operator body prop extension 174k fixed to the operator body prop and designed to increase the length of the operator body prop longer than that required to only cover and protect the display panel. The extension may position the display for better viewing and more comfortable hand access to manual controls found on the front side or back side of the display panel. This extension may also be used as a location for a storage compartment or accessory holder 90o or for holding accessories such as (but not limited to) those related to sound or eyeglasses. The operator body prop may have an original length 4g (indicated with solid line arrows) long enough to cover the display when the display panel is in a storage position. The operator body prop extension extends the prop to a fixed extended length 4h (indicated with dashed line arrows) in order to position the display panel better for viewing and/or manually controlling. The operator body prop extension may include an operator body interface such as (but not limited to) a friction enhancing surface or feature, one or more leg 90j, shaping, operator linking attachment or other feature to assist in holding and/or stabilizing the operator body prop on the body of the operator. The wearable propping display apparatus may include a suspension device or a suspension device attachment to attach the suspension device to the display panel or operator body prop. The suspension devise is intended to suspend the apparatus from the operator's neck or shoulder while the bottom end 174x of the operator body prop (with operator body interface) temporarily adheres to the operator's front stomach/chest surface area so the display is propped away from the operator's body and into the comfortable operator's view line of sight. The suspension device may be a strap, line, lanyard, rigid line or other line suspending the apparatus from the operator's neck/shoulder area. The apparatus may alternatively or additionally include a suspension device attachment 5a for attaching the suspension device to the apparatus. This attachment may be located in any suitable place on the display panel or operator body prop such as (but not limited to) the right and/or left side edge 44 (see also FIG. 1 and FIG. 2) of the display panel, the right and/or left side edge (174y, FIG. 2) of the operator body prop, in the pivot area 144a near the junction of the display panel and the operator body prop, near the top end (174z, FIG. 2) of the operator body prop, the junction of the operator body prop and its extension or a locations represented by a combination of these locations (e.g. right edge of the operator body prop near its top end in the pivot area).

FIG. 64B shows the wearable propping display apparatus of FIG. 64A with the display panel folded on its hinge 54 (pivoting operator body prop holder) into a closed storage position. The suspension device attachments on the display panel side edges have been removed but the suspension device attachments 5a on the operator body prop remain. All manual controls have been removed from the display panel back side 41 to simplify the figure. This figure also shows that the operator body prop extension may be fitted with one or more storage features, storage compartments or accessory holders 90o suitable for storage of related objected such as (but not limited to) earphones, microphone, sound wire, stylus, transmitter and/or receiver units (plugs), eyeglasses, lanyard, or other items. Added to this figure, the operator body prop accessory holder may include a closure 90o10 (e.g. door or cover). The accessory holder may alternatively be a stylus holder 90o2 for a stylus 90n2. The operator body interface (shown here as two legs) forms a lateral pivot axis 90z where they contact the operator thus allowing the display (when in operating position) to be pivoted closer or farther from the operator's face by, for example, lengthening or shortening the suspension device.

FIG. 64C is a view of the operator body prop back side 174b and display panel back side 41 of the wearable propping display apparatus shown in FIG. 64A. The display panel back side may include one or more computer user interfaces or manual controls 47a such as (but not limited to) one or more pointing devices, pointing device click buttons, touch pads, touch pad buttons, buttons, switches and sliding controls to mention a few. The display panel may include an electrical connection (e.g. socket) for other devices such as (but not limited to) a sound input/output 64u (speaker or microphone) electrical connection. The back side of the display panel may include one or more suspension device attachments 5a4 and/or the back side of the operator body prop and/or its extension may include one or more suspension device attachments 5a5. One or more hinges or the hinge area may include one or more angle holding mechanisms 192, such as (but not limited to) a friction hinge, ratchet hinge or friction device between the display panel and prop (e.g. a rubber), to temporarily hold the angle of the display panel relative to the operator body prop.

The back side or the front side of the operator body prop or its extension may include a sound wire storage device such as an automatic sound wire storage device 153e which may include an elastically rotated or elastically drawn sound wire dispenser and withdrawer and/or include a brake to facilitate automatic dispensing and withdrawing of a sound wire 68 of the sound input/output equipment 153 (e.g. earphones). The automatic sound wire storage device may be a reel type or may be a pulley type. The automatic sound wire storage device may be electrically connected to the display panel using a sound input/output equipment electrical connection 153d.

The back side or the front side of the operator body prop or its extension may include an eyeglass holder which may be in two parts, both including a socket. In a disassembled view of the eyeglass holder assembly 90o5, a pivoting socket part 90o6 of the eyeglass holder may be pivotally attached to the apparatus with a hinge 54. The eyeglasses 90n may be initially stored in a matching eyeglass tube 90n3 (two parts), as is commercially available. The tube, in turn, may be inserted into the socket of the holder's pivoting socket part which may include a holder socket spring 90o9 (seen mounted inside the socket of the transparent holder pivoting socket part). When the tube and pivoting socket part are pivoted against the apparatus the spring pushes the tube into the socket of the stationary socket part 90o7 of the holder and locks the eyeglass holder assembly in place (90o8 shows the eyeglass holder assembly assembled and in its storage position). The eyeglass holder stationary part may include a securing spring clip 90o11 as an alternative to the holder socket spring in the pivoting socket part. In a further simplification, an eyeglass holder stationary part with securing spring clip may be used with another eyeglass holder stationary part (with or without a securing spring clip) to secure the eyeglass tube to the apparatus.

FIG. 65 shows the wearable propping display apparatus 200 with the display panel 13 and operator body prop 174p pivotally attached by a hinge and in an open operating position. The display panel and prop are foldable against each other in book-like fashion. The wearable propping display apparatus includes one or more suspension devices 5 and/or suspension device attachments 5a attached in a way to suspend the apparatus in the view of the operator. The suspension device attachment may be located so the suspension device suspends the apparatus in or near the pivot area. The suspension device attachment may connect the suspension device to the display panel, the operator body prop or a hinge between them.

The display panel front side 40 includes an electronic display 45 which may be arranged, for display protection, to face toward the operator body prop front side 174f surface when the display panel is pivoted into its closed storage position approximately 180 degrees from its open operating position relative to the operator body prop.

The operator body prop 174p has a bottom end which may include an operator body interface 90 such as (but not limited to) one or more operator linking attachments, legs, and/or friction enhancing features. The operator body interface, the operator body prop and/or its bottom end may be configured to be thin 174x2 in a front to back (profile) direction relative to the their width (i.e. forming a lateral pivot axis) to allow pivoting in a direction toward or away from the operator's face while in an operating position and for storing compactly when the operator body prop is pivoted into a storage position next to the display panel. The operator body interface may be attached to the operator body prop or may be removable. The operator body prop may include one or more add-on electrical device prop attachment features 89h such as (but not limited to) shaping, prop edges or attachments meant to hold an add-on electrical device to the prop.

FIG. 66A (front side 151c) and FIG. 66B (back side 151d) show an add-on electrical device 151 that may be configured to removably attach to the wearable propping display apparatus (200 of FIG. 65). This add-on electrical device may be independent of the apparatus in terms of power supply, electrical equipment and some physical characteristics. However, it is adapted to fit and attach to the wearable propping display apparatus using matching attachments and/or some physical characteristics. It may contain electrical equipment such as (but not limited to) wireless transmitter and/or receiver, battery, recharging or other electrical connection 64g and attachments matching the wearable apparatus. Possible functions of the add-on electrical device may include (but not limited to) keyboard 143, sound facility (such as speaker, microphone and/or automatic sound wire winding mechanism), musical keyboard, touchpad or write pad, electrical connections, joystick control lever or other adapted equipment.

This add-on electrical device 151 is intended to wirelessly communicate (e.g. radio) with an external telecommunication source (e.g. a separate computer) using transmitter and/or receiver equipment 52f. On its back side 151d or edges 151e, the add-on electrical device may have one or more add-on electrical device attachment features 89i such as (but not limited to) shaping or attachments to fit and match one or more add-on electrical device prop attachment features (89h, FIG. 65) found on the operator body prop, for example, on its inside surface or edges, or to an add-on electrical device prop attachment features found on an operator body prop length adjuster or on an operator body prop length adjuster holder (see FIG. 61A). The matching attachment features on the prop and device may include (but not limited to) one or more holes, shaped edges or back, hooks, bails, snaps, hook and loop, magnets (and matching iron), matching parts or patterns or other feature to temporarily and physically hold the add-on electrical device to the operator body prop.

FIG. 67A (front side 151c) and FIG. 67B (back side 151d) show that the add-on electrical device 151 including one or more add-on electrical device attachment features 89i, such as (but not limited to) shaping and/or attachments, and the matching operator body prop's add-on electrical device prop attachment feature 89*h* (FIG. 65) may be larger than the operator body prop in some dimension 151*b*. In this way the wearable propping display apparatus may be quickly and temporarily augmented with additional input/output tools such as (but not limited to) a full size keyboard 143, writing pad or drawing pad, musical keyboard or other computer peripheral device of larger optimal size without increasing the size of the wearable propping display apparatus. The one or more add-on electrical device attachment features may be located on the back side 151*d* or edges 151*e* of the device. Again, the add-on electrical device may include electrical connection 64*g*, transmitter and/or receiver 52*f* equipment which may be a removable/replaceable transmitter and/or receiver 52*d* matching the electrical connection on the add-on electrical device. The add-on electrical device, along with its attachments on the device and the operator body prop, may be attached to an operator body prop of any sort including (but not limited to) a prop panel or a prop rod.

The invention claimed is:

1. A wearable display apparatus comprised of:
   a. a display panel comprised of a front side including an electronic display;
   b. a bag comprised of a top end area and a bottom end area, wherein the display panel is movably attached to the bag and the display panel is movable from a storage position to a vertical operating position with the electronic display viewable by an operator using a forward looking direction over the top end area of the baa while the operator is wearing the bag in the vertical operating position;
   c. an operator body interface comprised of a friction enhancing feature and a lateral stability member including at least two laterally separated surfaces, wherein the operator body interface is attached to the bag near the bottom end area, the operator body interface is contactable with a front stomach/chest surface area of the operator when the bag is in the vertical operating position, the friction enhancing feature provides sliding stability when the bag is in the vertical operating position and the lateral stability member provides lateral tipping stability when the bag is in the vertical operating position; and
   d. at least one of a suspension device and a suspension device attachment attached to the bag.

2. The apparatus of claim 1 wherein the bag is further comprised of a front wall including a top edge located in the top end area and the display panel is pivotably attached to the bag near the top edge of the front wall when in the vertical operating position.

3. The apparatus of claim 1 wherein the bag is further comprised of a front wall including a top edge located in the top end area and the display panel is slideably attached to the bag and is slidable from the storage position to the vertical operating position near the top edge of the front wall.

4. The apparatus of claim 1 wherein the display panel is further comprised of a proximal edge and the display panel is attached to the bag by the display panel proximal edge.

5. The apparatus of claim 1 wherein the bag is further comprised of a back wall and a bottom wall in the bottom end area and the operator body interface is attached to the bag near a junction of the back wall and the bottom wall.

6. The apparatus of claim 1 wherein the bag is further comprised of a stiffening member attached to the bag.

7. The apparatus of claim 6 wherein the stiffening member is a computing unit panel.

8. The apparatus of claim 7 wherein the bag is further comprised of a front wall including an inside surface and the computing unit panel is located on the inside surface of the bag front wall.

9. The apparatus of claim 1 wherein the bag is further comprised of a front wall including a computer equipment storage area located on an outside surface of the bag front wall and the display panel is storable in the computer equipment storage area when the display panel is in the storage position.

10. The apparatus of claim 1 wherein the suspension device is extendable to a neck/shoulder area of the operator and suspends the bag from the operator while the bag is in the vertical operating position and the operator body interface stabilizes the bag against the front stomach/chest surface area of the operator.

11. The apparatus of claim 1 wherein the bag is further comprised of a bag part display panel mount and the display panel is attached to the bag using a flexible fabric bag part display panel mount.

12. The apparatus of claim 1 wherein the lateral stability member of the operator body interface is further comprised of a structure selected from a group consisting of a right interface leg and left interface leg, a right prop rod and left prop rod, and a shaping to compliment the operator's body.

13. The apparatus of claim 1 wherein the friction enhancing feature is comprised of a structure selected from a group consisting of a leg, a blade, a point, a bump, a serration, a drum, a gripping projection, a elastomeric gripping projection, a rigid gripping projection, a ridge and a friction enhancing cup.

14. The apparatus of claim 1 wherein the friction enhancing feature is comprised of a material selected from a group consisting of a gripping surface, a sticking material, an abrasive surface, an elastomeric material and a sticking pattern.

15. A bag apparatus for holding an electronic display for wearable viewing, the apparatus comprised of:
   a. a bag comprised of a top end area, a bottom end area and a bag part display panel mount, wherein the bag part display panel mount is attached to the bag and is configured to movably attach a display panel to the bag so that the display panel is movable from a storage position to a vertical operating position with the electronic display of the display panel viewable by an operator in a forward looking direction over the top end area of the bag while the operator is wearing the bag in the vertical operating position;
   b. an operator body interface comprised of a friction enhancing feature and a lateral stability member including at least two laterally separated surfaces, wherein the operator body interface is attached to the bag near the bottom end area, the operator body interface is contactable with a front stomach/chest surface area of the operator when the bag is in the vertical operating position, the friction enhancing feature provides sliding stability when the bag is in the vertical operating position and the lateral stability member provides lateral tipping stability when the bag is in the vertical operating position; and
   c. at least one of a suspension device and a suspension device attachment attached to the bag.

16. The apparatus of claim 15 wherein the bag is further comprised of a front wall including a top edge located in the top end area and the bag part display panel mount is configured to pivotally attach the display panel to the bag near the top edge of the front wall when in the vertical operating position.

17. The apparatus of claim 15 wherein the bag is further comprised of a front wall including a top edge located in the top end area and the bag part display panel mount is configured to slidably attach the display panel to the bag and to slide the display panel from the storage position to the vertical operating position near the top edge of the front wall.

18. The apparatus of claim 15 wherein the bag part display panel mount is configured to attach to the display panel near a proximal edge of the display panel.

19. The apparatus of claim 15 wherein the bag is further comprised of a back wall and a bottom wall in the bottom end area and the operator body interface is attached to the bag near a junction of the back wall and the bottom wall.

20. The apparatus of claim 15 wherein the bag is further comprised of a stiffening member attached to the bag.

21. The apparatus of claim 20 wherein the stiffening member is a computing unit panel.

22. The apparatus of claim 21 wherein the bag is further comprised of a front wall including an inside surface and the computing unit panel is located on the inside surface of the bag front wall.

23. The apparatus of claim 15 wherein the bag is further comprised of a front wall including a computer equipment storage area located on an outside surface of the front wall and the display panel is storable in the computer equipment storage area when the display panel is in the storage position.

24. The apparatus of claim 15 wherein the suspension device is extendable to a neck/shoulder area of the operator and suspends the bag from the operator while the bag is in the vertical operating position and the operator body interface stabilizes the bag against the front stomach/chest surface area of the operator.

25. The apparatus of claim 15 wherein the bag part display panel mount is a flexible fabric bag part display panel mount.

26. The apparatus of claim 15 wherein the lateral stability member of the operator body interface is further comprised of a structure selected from a group consisting of a right interface leg and left interface leg, a right prop rod and left prop rod, and a shaping to compliment the operator's body.

27. The apparatus of claim 15 wherein the friction enhancing feature is comprised of a structure selected from a group consisting of a leg, a blade, a point, a bump, a serration, a drum, a gripping projection, a elastomeric gripping projection, a rigid gripping projection, a ridge and a friction enhancing cup.

28. The apparatus of claim 15 wherein the friction enhancing feature is comprised of a material selected from a group consisting of a gripping surface, a sticking material, an abrasive surface, an elastomeric material and a sticking pattern.

29. The apparatus of claim 15 wherein the bag is further comprised of a bag wall including an electrical access opening configured to pass an electrical connection from the display panel to an interior of the bag.

30. A wearable display system comprised of:
   a. a display panel comprised of a display panel part display panel mount and a front side including an electronic display;
   b. a bag comprised of a top end area, a bottom end area and a bag part display panel mount, wherein the bag part display panel mount is attached to the bag and is configured to removably attach to the display panel part display panel mount so that the display panel is movable from a storage position to a vertical operating position with the electronic display of the display panel viewable by an operator in a forward looking direction over the top end area of the bag while the operator is wearing the bag in the vertical operating position;
   c. an operator body interface comprised of a friction enhancing feature and a lateral stability member including at least two laterally separated surfaces, wherein the operator body interface is attached to the bag near the bottom end area, the operator body interface is contactable with a front stomach/chest surface area of the operator when the bag is in the vertical operating position, the friction enhancing feature provides sliding stability when the bag is in the vertical operating position and the lateral stability member provides lateral tipping stability when the bag is in the vertical operating position; and
   d. at least one of a suspension device and a suspension device attachment attached to the bag.

31. The system of claim 30 further comprised of a computing unit panel and at least one bag wall including an inside surface configured to hold the computing unit panel to the bag wall.

32. The system of claim 31 further comprised of an electrical connection and a bag wall electrical access opening configured to pass the electrical connection from the computing unit panel to the display panel.

33. The system of claim 30 wherein the display panel is further comprised of a proximal edge and the display panel part display panel mount is located on the display panel proximal edge.

34. The system-apparatus of claim 30 wherein the suspension device is extendable to a neck/shoulder area of the operator and suspends the bag from the operator while the bag is in the vertical operating position and the operator body interface stabilizes the bag against the front stomach/chest surface area of the operator.

* * * * *